(12) United States Patent
Kim et al.

(10) Patent No.: US 12,425,155 B2
(45) Date of Patent: Sep. 23, 2025

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Hyunsoo Ko, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 518 days.

(21) Appl. No.: 17/799,227

(22) PCT Filed: Feb. 15, 2021

(86) PCT No.: PCT/KR2021/001899
§ 371 (c)(1),
(2) Date: Aug. 11, 2022

(87) PCT Pub. No.: WO2021/162519
PCT Pub. Date: Aug. 19, 2021

(65) Prior Publication Data
US 2023/0071927 A1    Mar. 9, 2023

Related U.S. Application Data

(60) Provisional application No. 63/137,170, filed on Jan. 14, 2021.

(30) Foreign Application Priority Data

Feb. 13, 2020 (KR) .................. 10-2020-0017670
Aug. 4, 2020 (KR) .................. 10-2020-0097351

(51) Int. Cl.
*H04L 12/00* (2006.01)
*H04L 5/00* (2006.01)
*H04W 72/23* (2023.01)

(52) U.S. Cl.
CPC .......... *H04L 5/0048* (2013.01); *H04W 72/23* (2023.01)

(58) Field of Classification Search
CPC .... H04L 5/0048; H04L 5/0094; H04W 72/23; H04W 48/12
(Continued)

(56) References Cited

U.S. PATENT DOCUMENTS 9,312,997 B2 * 4/2016 Kim ...................... H04L 5/0037
9,532,353 B2 * 12/2016 Yang ..................... H04L 5/0007
(Continued)

FOREIGN PATENT DOCUMENTS

EP       2790335 A1 * 10/2014   ........ H04W 56/0025
KR       101999702 B1    7/2019
(Continued)

OTHER PUBLICATIONS

Nokia, Nokia Shanghai Bell, "Remaining details on NR-PBCH", 3GPP TSG-RAN WG1 NR AH#3, Sep. 18-21, 2017, R1-1716524.
(Continued)

*Primary Examiner* — Frantz Coby
(74) *Attorney, Agent, or Firm* — BRYAN CAVE LEIGHTON PAISNER LLP

(57) ABSTRACT

The present disclosure relates to a method and an apparatus therefor, the method comprising the steps of: receiving a synchronization signal/public broadcast channel (SS/PBCH) block within a plurality of SS/PBCH block candidates located on an unlicensed band; obtaining physical downlink control channel (PDCCH) configuration information for receiving system information on the basis of the SS/PBCH
(Continued)

block; receiving a PDCCH for scheduling a physical downlink shared channel (PDSCH) including system information on the basis of the PDCCH configuration information; and receiving the PDSCH scheduled by the PDCCH, wherein the PDCCH configuration information includes information on a subcarrier interval of a control resource set (CORESET) through which the PDCCH is transmitted, the CORESET is configured in a period of symbols consecutively located in front of a plurality of SS/PBCH block candidates, and the start symbol of CORESET is determined from between 1) the first symbol of slots included in the period of symbols, or 2) the first symbol of regions in which the period of symbols is divided by the number of SS/PBCH block candidates.

11 Claims, 43 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 9,794,052 | B2 * | 10/2017 | Yang | ..................... H04W 72/23 |
| 10,251,169 | B2 * | 4/2019 | Yang | ..................... H04L 1/0045 |
| 10,797,843 | B2 * | 10/2020 | Guan | ..................... H04L 5/0053 |
| 10,798,698 | B2 * | 10/2020 | Seo | ........................ H04W 72/23 |
| 11,743,905 | B2 * | 8/2023 | Ko | .......................... H04L 5/001 |
| | | | | 370/329 |
| 2020/0045708 | A1 * | 2/2020 | Hwang | ..................... H04L 5/10 |
| 2020/0267674 | A1 * | 8/2020 | Ji | ........................ H04W 56/001 |

FOREIGN PATENT DOCUMENTS

| | | | | | |
|---|---|---|---|---|---|
| WO | WO-2013028018 | A2 * | 2/2013 | ......... | H04L 27/2675 |
| WO | WO-2014069952 | A1 * | 5/2014 | ............... | H04B 1/38 |
| WO | WO-2017039397 | A1 * | 3/2017 | ......... | H04L 27/0014 |
| WO | WO-2017217636 | A1 * | 12/2017 | ............... | H04B 7/06 |
| WO | WO-2018062891 | A1 * | 4/2018 | ............. | H04J 11/00 |
| WO | WO-2018174602 | A1 * | 9/2018 | ............ | H04W 56/00 |
| WO | WO-2018236165 | A1 * | 12/2018 | ......... | H04J 11/0069 |
| WO | 2019099173 | A1 | 5/2019 | | |
| WO | WO-2019156472 | A1 * | 8/2019 | .......... | H04B 7/0408 |
| WO | 2019190251 | A1 | 10/2019 | | |
| WO | WO-2019221543 | A1 * | 11/2019 | ............. | H04B 7/086 |

OTHER PUBLICATIONS

NTT DoCoMo, Inc., "Discussion on remaining details on RMSI delivery", 3GPP TSG RAN WG1 Meeting 90bis, Oct. 9-13, 2017, R1-1718181.

* cited by examiner (a) Carrier aggregation between L-band and U-band (b) Standalone U-band(s)

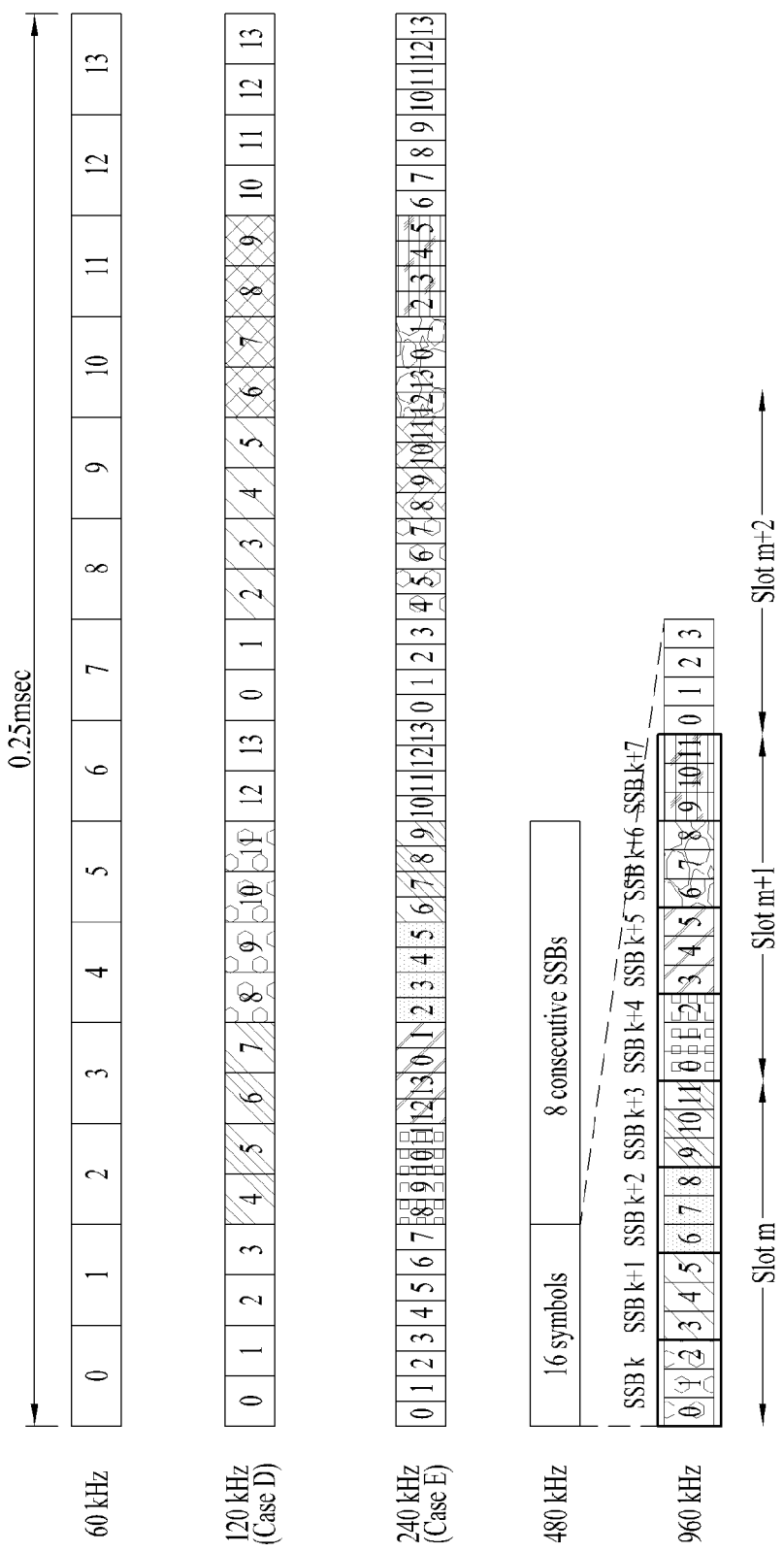

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2021/001899, filed on Feb. 15, 2021, which claims the benefit of Korean Application No. 10-2020-0017670, filed on Feb. 13, 2020, Korean Application No. 10-2020-0097351, filed Aug. 4, 2020, and U.S. Provisional Application No. 63/137,170, filed Jan. 14, 2021, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to a first aspect of the present disclosure, there is provided a method of receiving a downlink signal by a user equipment (UE) in a wireless communication system supporting unlicensed bands. The method may include: receiving a synchronization signal/physical broadcast channel (SS/PBCH) block in a plurality of SS/PBCH block candidates in an unlicensed band; obtaining physical downlink control channel (PDCCH) configuration information based on the SS/PBCH block; and receiving a PDCCH scheduling a physical downlink shared channel (PDSCH) carrying system information and the PDSCH scheduled by the PDCCH based on the PDCCH configuration information. The PDCCH configuration information may include information on a subcarrier spacing of a control resource set (CORESET) in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to a second aspect of the present disclosure, there is provided a UE configured to operate in a wireless communication system supporting unlicensed bands. The UE may include: at least one radio frequency (RF) unit; at least one processor; and at least one computer memory operably connected to the at least one processor and configured to, when executed, cause the at least one processor to perform operations. The operations may include: receiving an SS/PBCH block in a plurality of SS/PBCH block candidates in an unlicensed band; obtaining PDCCH configuration information based on the SS/PBCH block; and receiving a PDCCH scheduling a PDSCH carrying system information and the PDSCH scheduled by the PDCCH based on the PDCCH configuration information. The PDCCH configuration information may include information on a subcarrier spacing of a CORESET in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to a third aspect of the present disclosure, there is provided an apparatus for a UE. The apparatus may include: at least one processor; and at least one computer memory operably connected to the at least one processor and configured to, when executed, cause the at least one processor to perform operations. The operations may include: receiving an SS/PBCH block in a plurality of SS/PBCH block candidates in an unlicensed band; obtaining PDCCH configuration information based on the SS/PBCH block; and receiving a PDCCH scheduling a PDSCH carrying system information and the PDSCH scheduled by the PDCCH based on the PDCCH configuration information. The PDCCH configuration information may include information on a subcarrier spacing of a CORESET in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to a fourth aspect of the present disclosure, there is provided a computer-readable storage medium. The computer-readable storage medium may include at least one computer program configured to, when executed, cause at least one processor to perform operations. The operations may include: receiving an SS/PBCH block in a plurality of SS/PBCH block candidates in an unlicensed band; obtaining PDCCH configuration information based on the SS/PBCH block; and receiving a PDCCH scheduling a PDSCH carrying system information and the PDSCH scheduled by the PDCCH based on the PDCCH configuration information. The PDCCH configuration information may include information on a subcarrier spacing of a CORESET in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to a fifth aspect of the present disclosure, there is provided a method of transmitting a downlink signal by a base station in a wireless communication system supporting unlicensed bands. The method may include: transmitting an SS/PBCH block in a plurality of SS/PBCH block candidates in an unlicensed band; transmitting a PDCCH scheduling a PDSCH including system information; and transmitting the PDSCH scheduled by the PDCCH. The SS/PBCH block may include information on a subcarrier spacing of a CORESET in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to a sixth aspect of the present disclosure, there is provided a base station configured to operate in a wireless communication system supporting unlicensed bands. The base station may include: at least one RF unit; at least one processor; and at least one computer memory operably connected to the at least one processor and configured to, when executed, cause the at least one processor to perform operations. The operations may include: transmitting an SS/PBCH block in a plurality of SS/PBCH block candidates in an unlicensed band; transmitting a PDCCH scheduling a PDSCH including system information; and transmitting the PDSCH scheduled by the PDCCH. The SS/PBCH block may include information on a subcarrier spacing of a CORESET in which the PDCCH is transmitted. The CORESET may be configured in a duration of consecutive symbols located in front of the plurality of SS/PBCH block candidates. A starting symbol of the CORESET may be determined from among 1) first symbols of slots included in the symbol duration or 2) first symbols of regions obtained by dividing the symbol duration by a number of the SS/PBCH block candidates.

According to an embodiment, based on that a subcarrier spacing of the SS/PBCH block is set to 120 kHz and the subcarrier spacing of the CORESET is set to 960 kHz: the SS/PBCH block may be received in one of two SS/PBCH block candidates; the CORESET may be configured in a duration of consecutive 32 symbols having a subcarrier spacing of 960 kHz and located in front of the two SS/PBCH block candidates; and the starting symbol of the CORESET may be determined from among first symbols of slots included in the 32-symbol duration.

According to an embodiment, based on that a subcarrier spacing of the SS/PBCH block is set to 480 kHz and the subcarrier spacing of the CORESET is set to 960 kHz: the SS/PBCH block may be received in one of 8 SS/PBCH block candidates; the CORESET may be configured in a duration of consecutive 32 symbols having a subcarrier spacing of 960 kHz and located in front of the 8 SS/PBCH block candidates; and the starting symbol of the CORESET may be determined from among first symbols of regions obtained by dividing the 32-symbol duration into 8 equal parts.

According to an embodiment, based on that a subcarrier spacing of the SS/PBCH block is set to 960 kHz and the subcarrier spacing of the CORESET is set to 960 kHz: the SS/PBCH block may be received in one of 16 SS/PBCH block candidates; the CORESET may be configured in a duration of consecutive 32 symbols having a subcarrier spacing of 960 kHz and located in front of the 16 SS/PBCH block candidates; and the starting symbol of the CORESET may be determined from among first symbols of regions obtained by dividing the 32-symbol duration into 16 equal parts.

According to an embodiment, based on that a subcarrier spacing of the SS/PBCH block is set to 120 kHz and the subcarrier spacing of the CORESET is set to 480 kHz: the SS/PBCH block may be received in one of two SS/PBCH block candidates; the CORESET may be configured in a duration of consecutive 16 symbols having a subcarrier spacing of 480 kHz and located in front of the two SS/PBCH block candidates; and the starting symbol of the CORESET may be determined from among first symbols of slots or half-slots included in the 16-symbol duration.

According to an embodiment, the SS/PBCH block may indicate one of two values determined based on a subcarrier spacing of the SS/PBCH block as the subcarrier spacing of the CORESET.

Advantageous Effects

According to the present disclosure, a wireless signal may be transmitted and received efficiently in a wireless communication system.

According to the present disclosure, there is provided a method of configuring resources of control resource set (CORESET) #0 corresponding to a synchronization signal/physical broadcast channel (SS/PBCH) block and resources of a physical downlink shared channel (PDSCH) scheduled by a physical downlink control channel (PDCCH) transmitted in CORESET #0 when an increased subcarrier spacing is introduced for the PDCCH/PDSCH, thereby enabling a user equipment (UE) to receive the PDCCH and PDSCH effectively.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
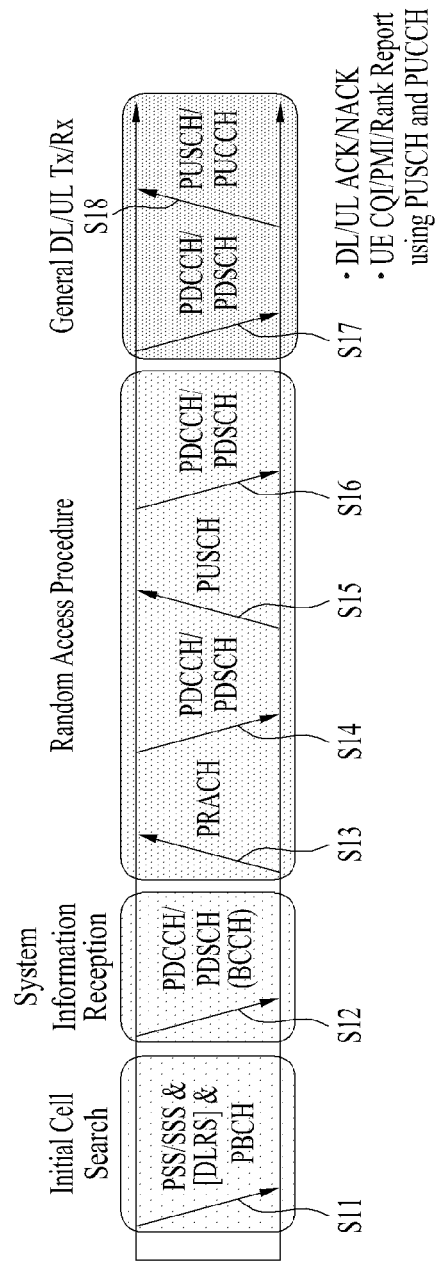
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
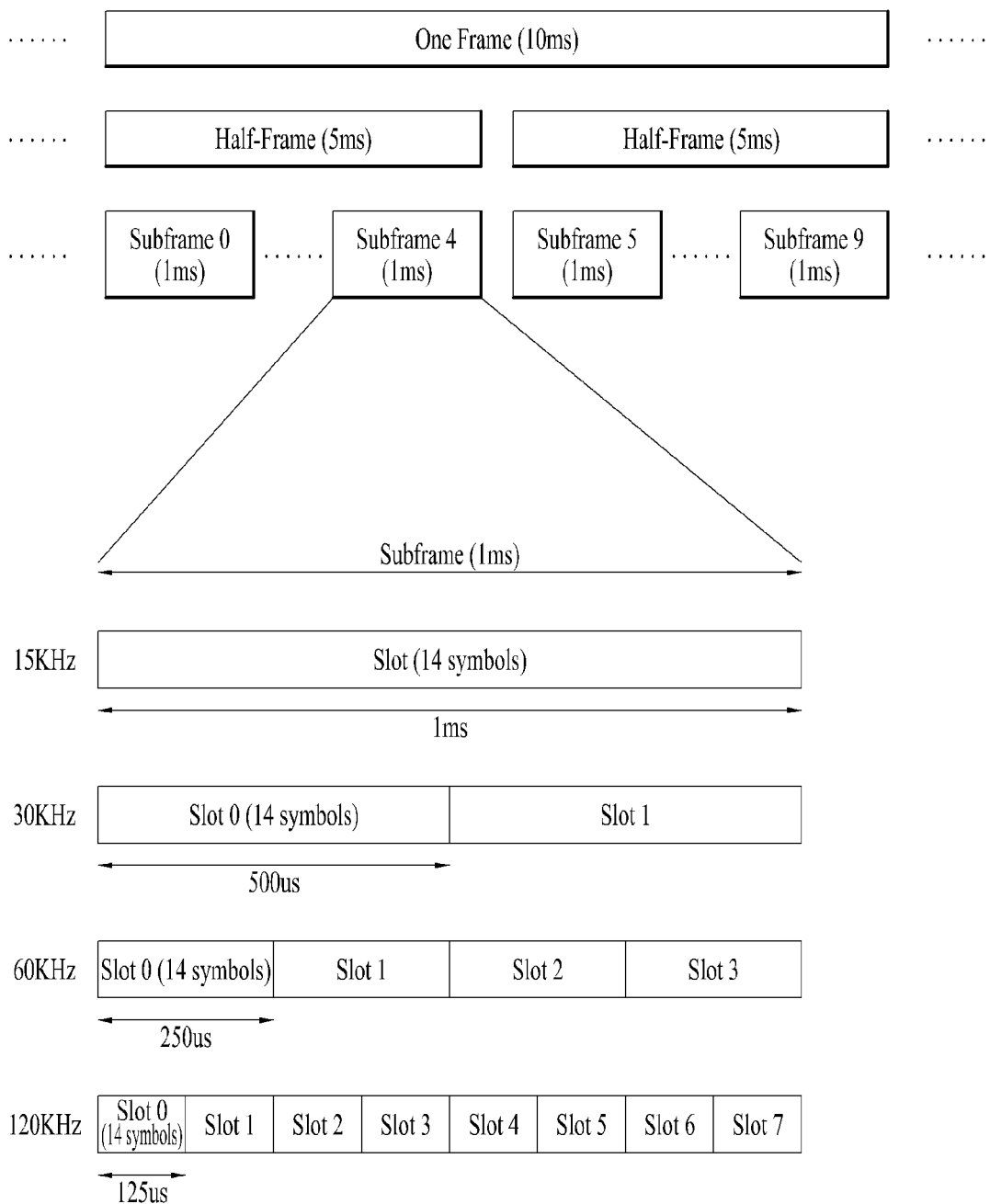
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

The frame structure is merely an example. The number of subframes, the number of slots, and the number of symbols in a frame may vary. In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol). In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise. An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
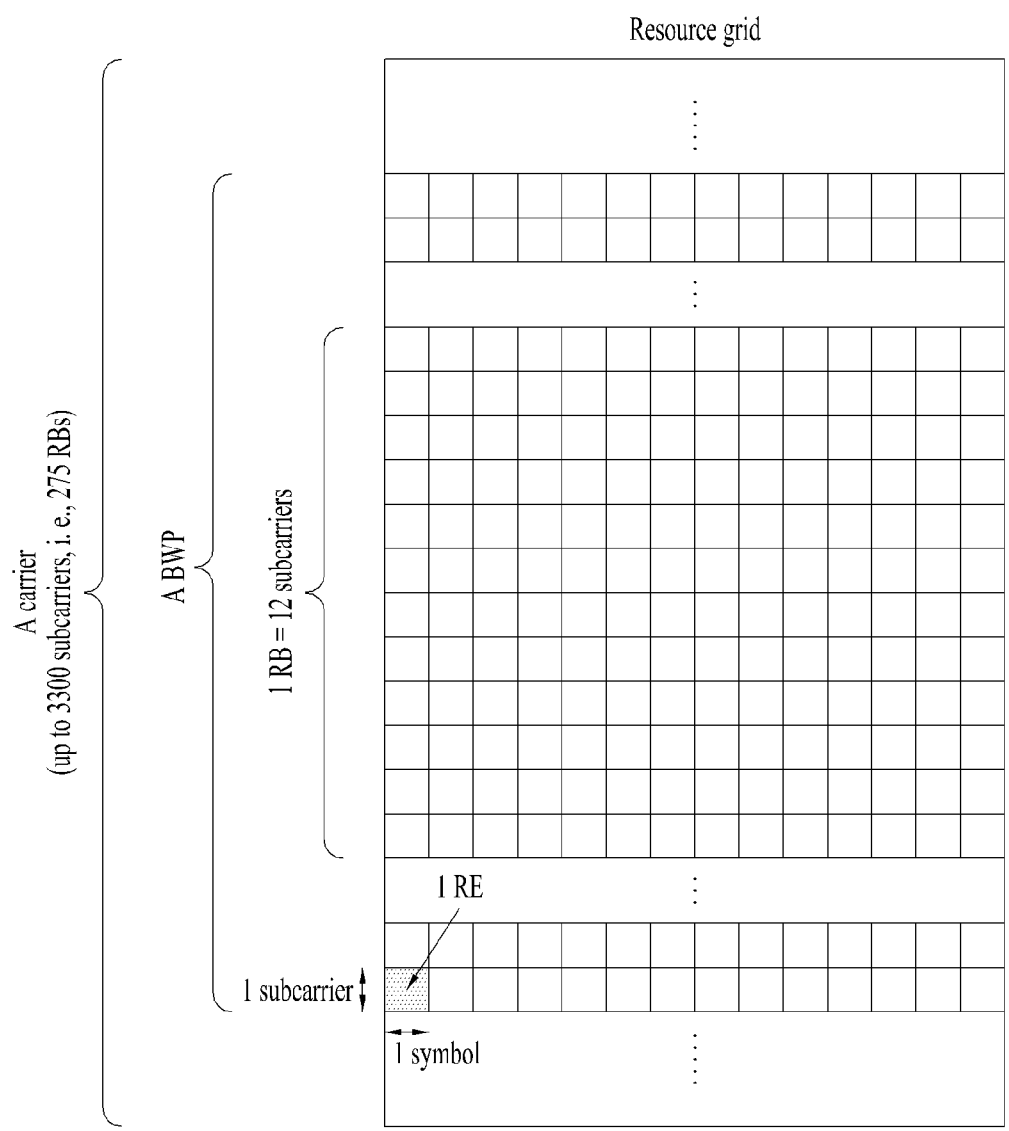
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols.

A carrier includes a plurality of subcarriers in the frequency domain. A resource block (RB) is defined as a plurality of consecutive subcarriers (e.g., 12 consecutive subcarriers) in the frequency domain A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
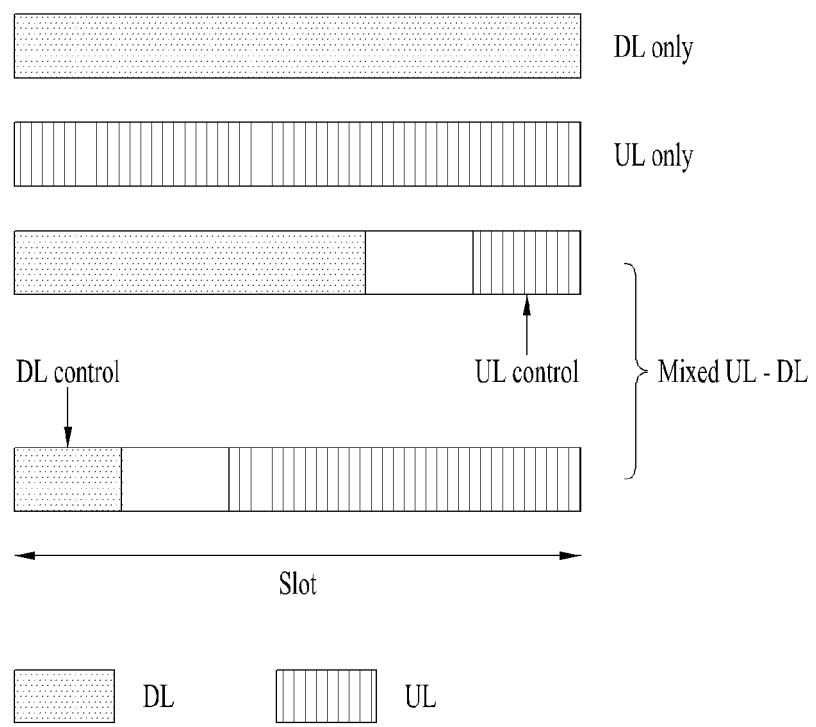
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Table 4 lists PDCCH usages and transport channels. The transport channels are related to data delivered on a PDSCH/PUSCH scheduled by a PDCCH.

TABLE 4

| RNTI | Usage | Transport Channel |
|---|---|---|
| P-RNTI | Paging and System Information change notification | PCH(Paging Channel) |
| SI-RNTI | Broadcast of System Information | DL-SCH |

TABLE 4-continued

| RNTI | Usage | Transport Channel |
|---|---|---|
| RA-RNTI | Random Access Response | DL-SCH |
| C-RNTI | Dynamically scheduled unicast transmission | UL-SCH, DL-SCH |
| SFI(Slot Format Indication)-RNTI | Slot Format Indication on the given cell | N/A |

The modulation scheme for the PDCCH is fixed (e.g., quadrature phase shift keying (QPSK), and one PDCCH includes 1, 2, 4, 8, or 16 control channel elements (CCEs). One CCE includes 6 resource element groups (REGs). One REG is defined by one OFDMA symbol and one (P)RB. The PDCCH is transmitted in a control resource set (CORESET). The CORESET corresponds to a physical resource/parameter set used to deliver the PDCCH/DCI in a BWP. For PDCCH reception, a UE may monitor (e.g., blind-decode) a set of PDCCH candidates in the CORESET. A PDCCH candidate is CCE(s) that the UE monitors for PDCCH reception/detection. PDCCH monitoring may be performed in one or more CORESETs of an active DL BWP in each active cell configured with PDCCH monitoring. A set of PDCCH candidates monitored by the UE is defined as a PDCCH search space (SS) set. The SS set may be a common search space (CSS) set or a UE-specific search space (USS) set. Table 5 lists PDCCH SSs.

TABLE 5

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | Group signaling |
| UE Specific | UE Specific | C-RNTI, or MCS-C-RNTI, or CS-RNTI(s) | UE signaling (e.g., PDSCH/PUSCH) |

Figure 5:
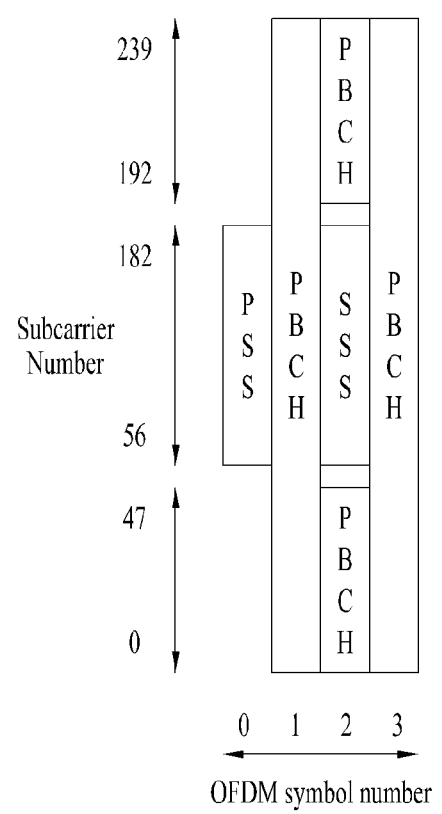
FIG. 5 illustrates the structure of a synchronization signal block (SSB)

FIG. 5 illustrates the structure of an SSB. A UE may perform cell search, system information acquisition, beam alignment for initial access, DL measurement, and so on based on an SSB. The term SSB is interchangeably used with an SS/PBCH block.

Referring to FIG. 5, the SSB is made up of four consecutive OFDM symbols, each carrying a PSS, a PBCH, an SSS/PBCH, or a PBCH. Each of the PSS and the SSS includes one OFDM symbol by 127 subcarriers, and the PBCH includes 3 OFDM symbols by 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, and three data REs exist between DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 6 below.

TABLE 6

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/Search space configuration |
| $5^{th}$ Step | PDCCH and PDSCH | Cell access information RACH configuration |

Figure 6:
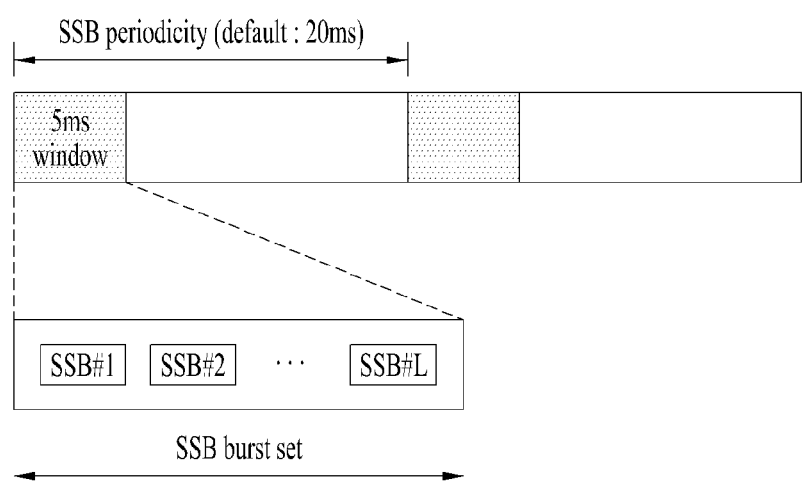
FIG. 6 illustrates exemplary SSB transmission.

FIG. 6 illustrates exemplary SSB transmission. Referring to FIG. 6, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L-1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 fora carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

During initial cell selection, the UE may assume that a half-frame including an SSB is repeated at a cycle of 20 ms. The UE may check the presence of a CORESET for a Type0-PDCCH CSS based on a master information block (MIB). The MIB includes information/parameters related to reception of SystemInformationBlockType1 (SIB1), and the MIB is transmitted over a PBCH of the SSB.

The Type0-PDCCH CSS is a kind of PDCCH search space and is used to transmit a PDCCH scheduling a system information (SI) message. When the Type0-PDCCH CSS exists, the UE may determine: (i) one or more consecutive symbols and a plurality of consecutive RBs included in a CORESET; and (ii) a PDCCH occasion (i.e., a time-domain location for PDCCH reception), based on information in the MIB (e.g., pdcch-ConfigSIB1). Specifically, pdcch-ConfigSIB1 is 8-bit information, (i) the one or more consecutive symbols and the plurality of consecutive RBs included in the CORESET are determined based on 4 most significant bits (MSBs) (see Tables 13-1 to 13-10 of 3GPP TS 38.213), and (ii) the PDCCH occasion is determined based on 4 least significant bits (LSBs) (see Tables 13-11 to 13-15 of 3 GPP TS 38.213).

Figure 7:
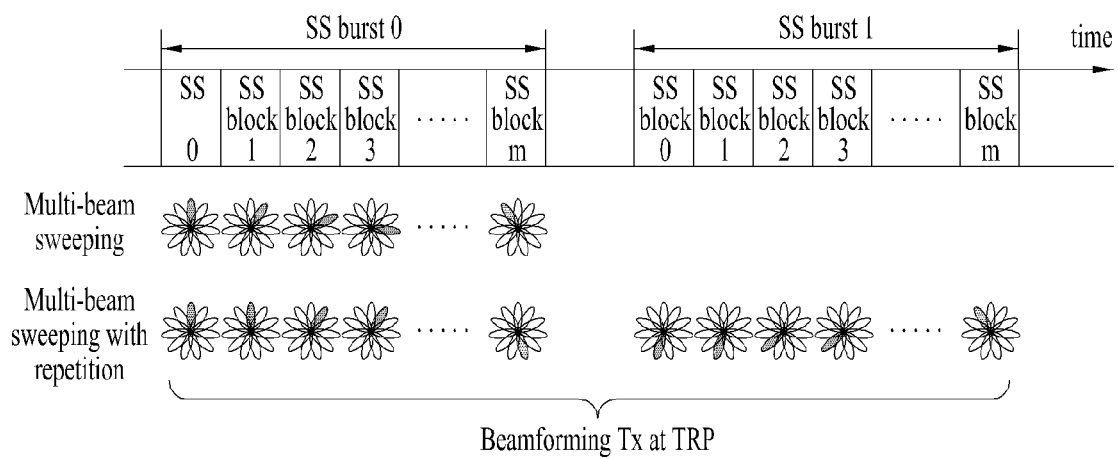
FIG. 7 illustrates exemplary multi-beam transmission of SSBs.

FIG. 7 illustrates exemplary multi-beam transmission of SSBs. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, Max number of beams=4

For frequency range from 3 GHz to 6 GHz, Max number of beams=8

For frequency range from 6 GHz to 52.6 GHz, Max number of beams=64

*Without multi-beam transmission, the number of SSB beams is 1.

Figure 8:
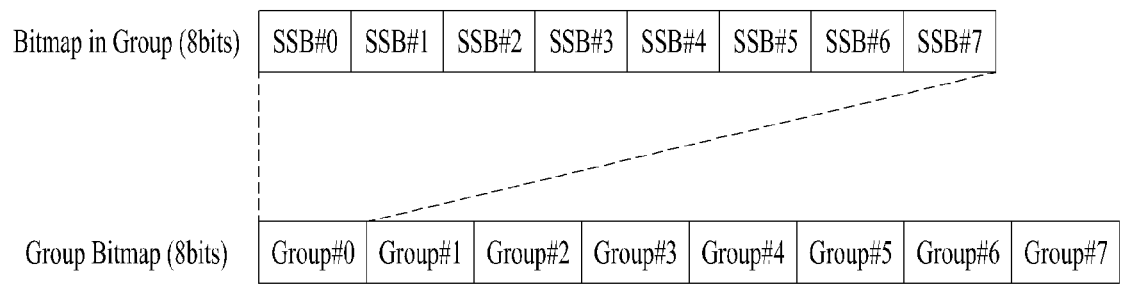
FIG. 8 illustrates an exemplary method of indicating an actually transmitted SSB.

FIG. 8 illustrates an exemplary method of indicating an actually transmitted SSB, SSB_tx. Up to L SSBs may be transmitted in an SSB burst set, and the number/positions of actually transmitted SSBs may be different for each BS/cell. The number/positions of actually transmitted SSBs are used for rate-matching and measurement, and information about actually transmitted SSBs is indicated as follows.

If the information is related to rate-matching, the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 7. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Figure 9:
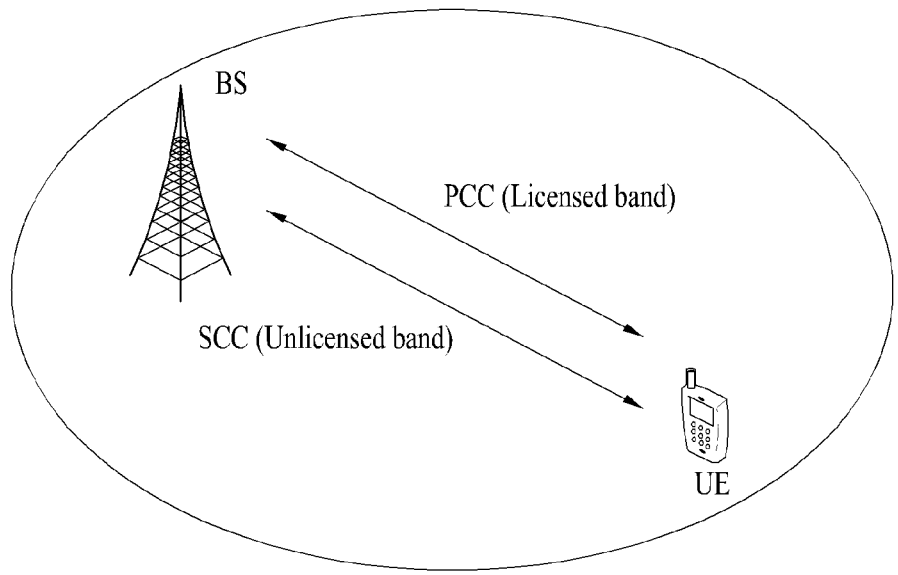
FIG. 9 illustrates a wireless communication system supporting an unlicensed band.
Figure 9:
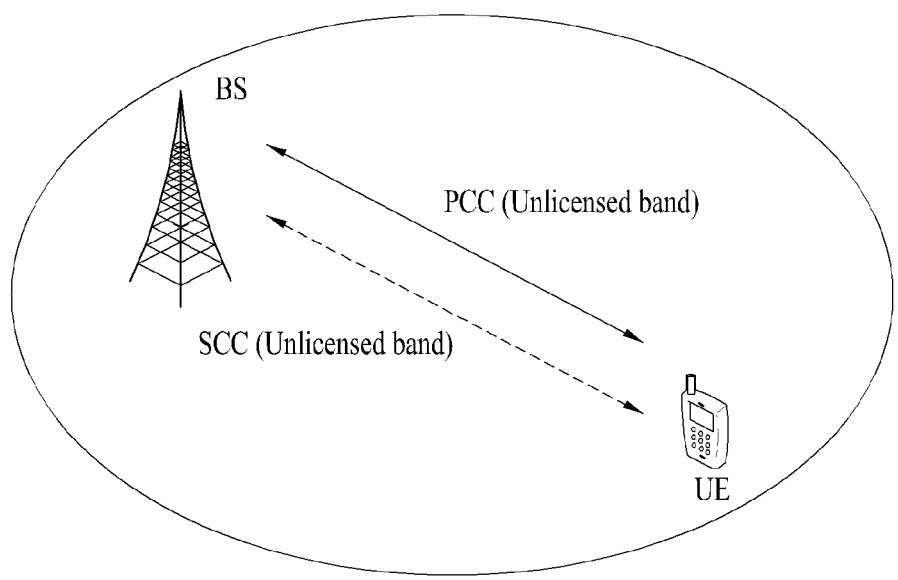

FIG. 9 illustrates a wireless communication system supporting an unlicensed band. For the convenience of description, a cell operating in a licensed band (hereinafter, referred to as L-band) is defined as an LCell, and a carrier of the LCell is defined as a (DL/UL) licensed component carrier (LCC). In addition, a cell operating in an unlicensed band (hereinafter, referred to as a U-band) is defined as a UCell, and a carrier of the UCell is defined as a (DL/UL) unlicensed component carrier (UCC). The carrier of a cell may refer to the operating frequency (e.g., center frequency) of the cell. A cell/carrier (e.g., CC) may be collectively referred to as a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 11(a) illustrates signal transmission and reception between a UE and a BS in an LCC and a UCC (non-standalone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 11(a) corresponds to LAA of a 3GPP LTE system. FIG. 11(b) illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system.

Figure 10:
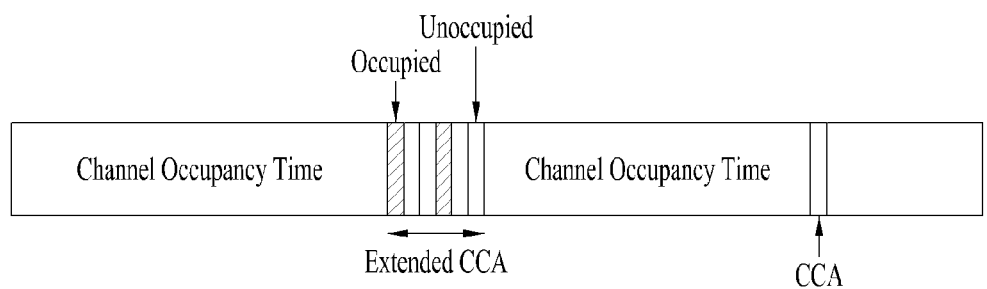
FIG. 10 illustrates a method of occupying resources in an unlicensed band.

FIG. 10 illustrates an exemplary method of occupying resources in an unlicensed band. According to regional regulations for an unlicensed band, a communication node should determine whether other communication node(s) is using a channel in the unlicensed band, before signal transmission. Specifically, the communication node may determine whether other communication node(s) is using a channel by performing carrier sensing (CS) before signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used.

EMBODIMENTS

The following symbols/abbreviations/terms are used in this document.
 PDCCH: Physical Downlink Control CHannel
 PDSCH: Physical Downlink Shared CHannel
 PUSCH: Physical Uplink Shared CHannel
 CSI Channel state information
 RRM: Radio resource management
 RLM: Radio link monitoring
 DCI: Downlink Control Information
 CAP Channel Access Procedure
 Ucell: Unlicensed cell
 TBS: Transport Block Size
 SLIV: Starting and Length Indicator Value (The SLIV is a field that indicates the starting symbol index and the number of symbols in a slot for a PDSCH and/or PUSCH, and the SLIV is carried on a PDCCH scheduling the corresponding PDSCH and/or PUSCH.)
 BWP: BandWidth Part (The BWP may be composed of consecutive RBs in the frequency domain and correspond to one numerology (e.g., SCS, CP length, slot/mini-slot duration). In addition, a plurality of BWPs may be configured on one carrier (the number of BWPs per carrier may also be limited), but the number of active BWPs (e.g., one) may be limited in some carriers.)
 CORESET: COntrol REsourse SET (The CORESET means a time frequency resource region capable of transmitting a PDCCH, and the number of CORESETs per BWP may be limited.)
 REG: Resource Element Group
 SFI: Slot Format Indicator (The SFI is an indicator that indicates the DL/UL direction at the symbol level in a specific slot(s), and the SFI is transmitted over a group-common PDCCH.)
 COT Channel Occupancy Time
 SPS: Semi-Persistent Scheduling
 ANR: automatic neighbour relation
 PLMN ID: Public Land Mobile Network identifier For 3 GPP Release-15 (Rel-15) NR systems, operations in a band below 52.6 GHz are defined. In a future release, a discussion is underway to operate the NR system in licensed and/or unlicensed bands of 60/70 GHz.

The present disclosure proposes a method of transmitting and receiving DL control and data channels in the corresponding frequency bands. Specifically, the UE needs to receive a DL control channel scheduling system information and a DL data channel including the system information in order obtain the system information. Hereinafter, a description will be given of a method of transmitting and receiving the corresponding DL control and data channels.

The methods proposed in this document will be described based on unlicensed band operation, but the methods may be applied to licensed band operation. Herein, the term unlicensed band may be interchangeably used with the term shared spectrum.

In the NR system, millimeter wave (mmWave) bands (e.g., above 7.125 or 24 MHz and up to 52.6 GHz) is defined as frequency range 2 (FR2), and the SCS of an SS/PBCH block in FR2 may be 120 or 240 kHz. In embodiments, the term SS/PBCH block may be interchangeably used with the term SSB. Hereinafter, these terms are collectively referred to as the SS/PBCH block for convenience.

Figure 11:
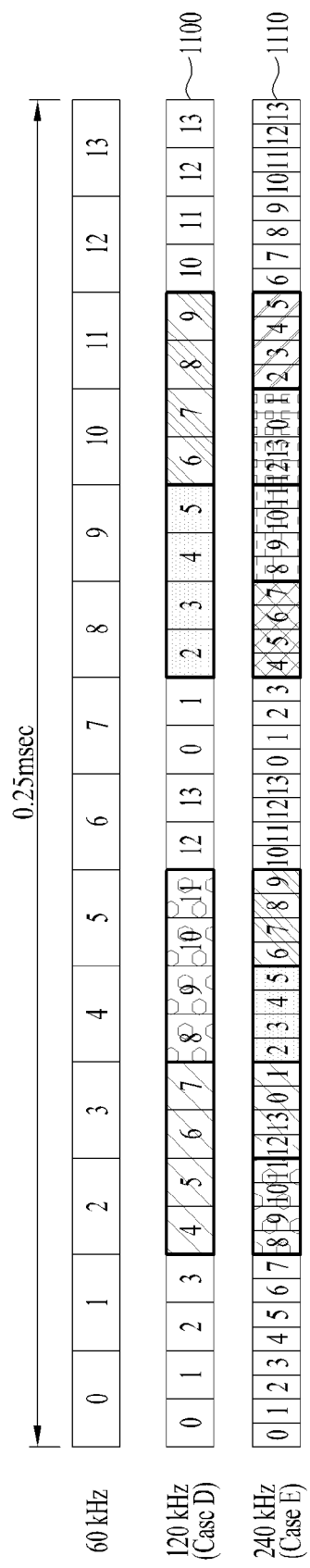
FIG. 11 and FIGS. 12(*a*) to 12(*c*) illustrate locations of synchronization signal/physical broadcast channel (SS/PBCH) block candidates when the subcarrier spacing (SCS) of an SS/PBCH block is set to 120 or 240 kHz.

FIG. 11 illustrates positions of SS/PBCH block candidates when the SCS of an SS/PBCH block is set to 120 or 240 kHz. According to embodiments, the term "SS/PBCH block candidate" may be interchanged with the following terms: candidate SS/PBCH block, SSB candidate, and candidate SSB.

Specifically, as shown in FIG. 11, up to 4 or 8 SS/PBCH blocks may be transmitted within 0.25 msec (e.g., two slots 1100 for the 120 kHz SCS or four slots 1110 for the 240 kHz SCS). For example, for the 120 kHz SCS, SS/PBCH block (candidate) index 'n' may be transmitted in symbol #4/5/6/7 of the first slot, and SS/PBCH block (candidate) index 'n+1' may be transmitted in symbol #8/9/10/11 of the first slot. SS/PBCH block (candidate) index 'n+2' may be transmitted in symbol #2/3/4/5 of the second slot, and SS/PBCH block (candidate) index 'n+3' may be transmitted in symbol #6/7/8/9 of the second slot. In this case, symbol #4/5/6/7 may mean symbols with symbol indices of 4/5/6/7 in a slot or fifth/sixth/seventh/eighth symbols in the slot. Herein, transmission of an SS/PBCH block (candidate) index may mean that an SS/PBCH block is transmitted in an SS/PBCH block candidate with the corresponding SS/PBCH block (candidate) index. For the SS/PBCH block, it is preferable that transmission is guaranteed at regular intervals. However, in U-band operation, since transmission is allowed only when the CAP is successful, a plurality of transmission candidates (e.g., a plurality of SS/PBCH block candidates) may be configured for one SS/PBCH block within a predefined window duration (hereinafter, S_window). Accordingly, even if the BS fails to transmit the SS/PBCH block in a specific SS/PBCH block candidate due to CAP failure, the BS may increase the transmission probability of the SS/PBCH block by performing the CAP in other SS/PBCH block candidates. Therefore, a plurality of SS/PBCH block candidates may have the same SS/PBCH block index. In the present disclosure, the term "SS/PBCH block candidate index" may be interchanged with the term "SS/PBCH block index" according to the context.

For the 240 kHz SCS, SS/PBCH block (candidate) index 'n' may be transmitted in symbol #8/9/10/11 of the first slot, SS/PBCH block (candidate) index 'n+1' may be transmitted in symbol #12/13 of the first slot and symbol #0/1 of the second slot, SS/PBCH block (candidate) index 'n+2' may be transmitted in symbol #2/3/4/5 of the second slot, and SS/PBCH block (candidate) index 'n+3' may be transmitted in symbol #6/7/8/9 of the second slot. SS/PBCH block (candidate) index 'n+4' may be transmitted in symbol #4/5/6/7 of the third slot, SS/PBCH block (candidate) index 'n+5' may be transmitted in symbol #8/9/10/11 of the third slot, SS/PBCH block (candidate) index 'n+6' may be transmitted in symbol #12/13 of the third slot and symbol #0/1 of the fourth slot, and SS/PBCH block (candidate) index 'n+7' may be transmitted in symbol #2/3/4/5 of the fourth slot.

Figure 12A:
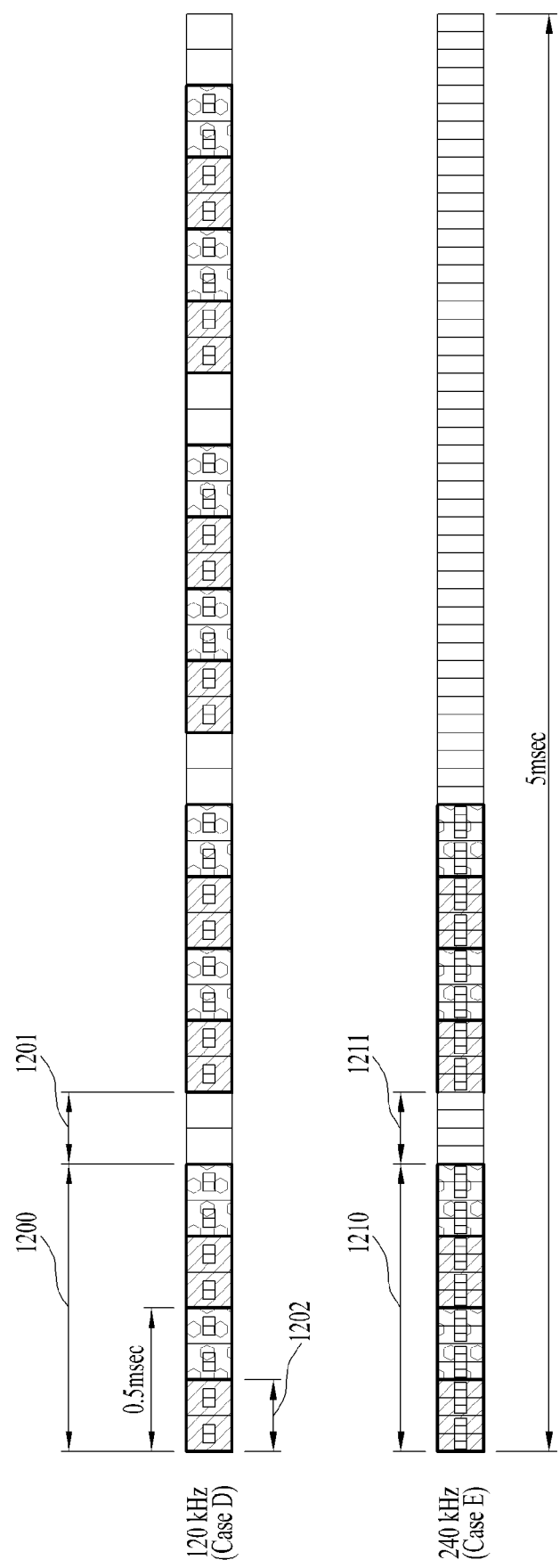
Figure 12B:
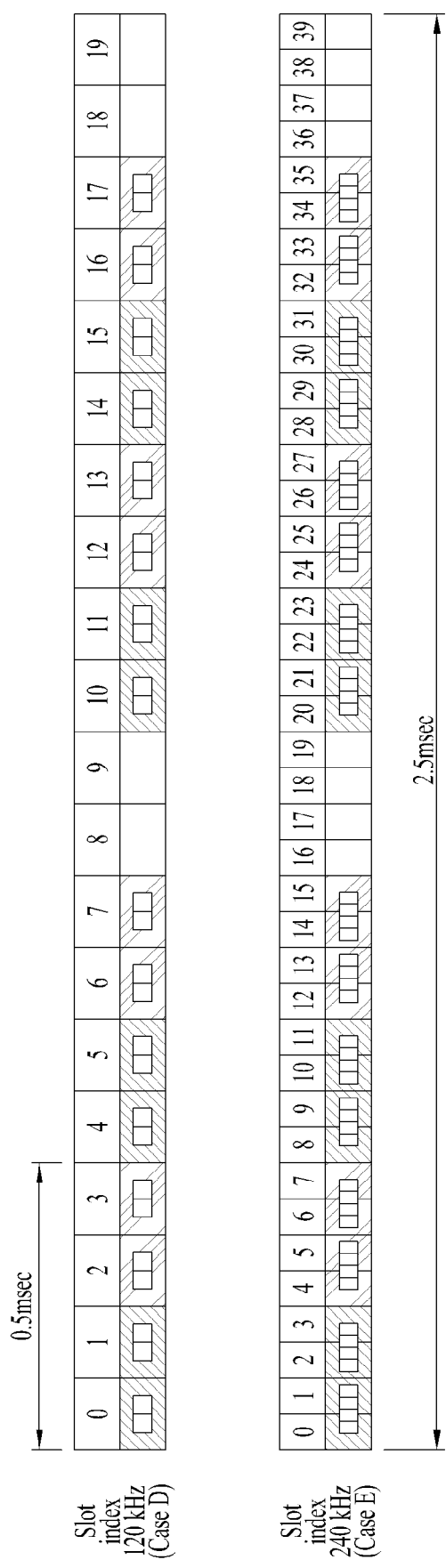
Figure 12C:
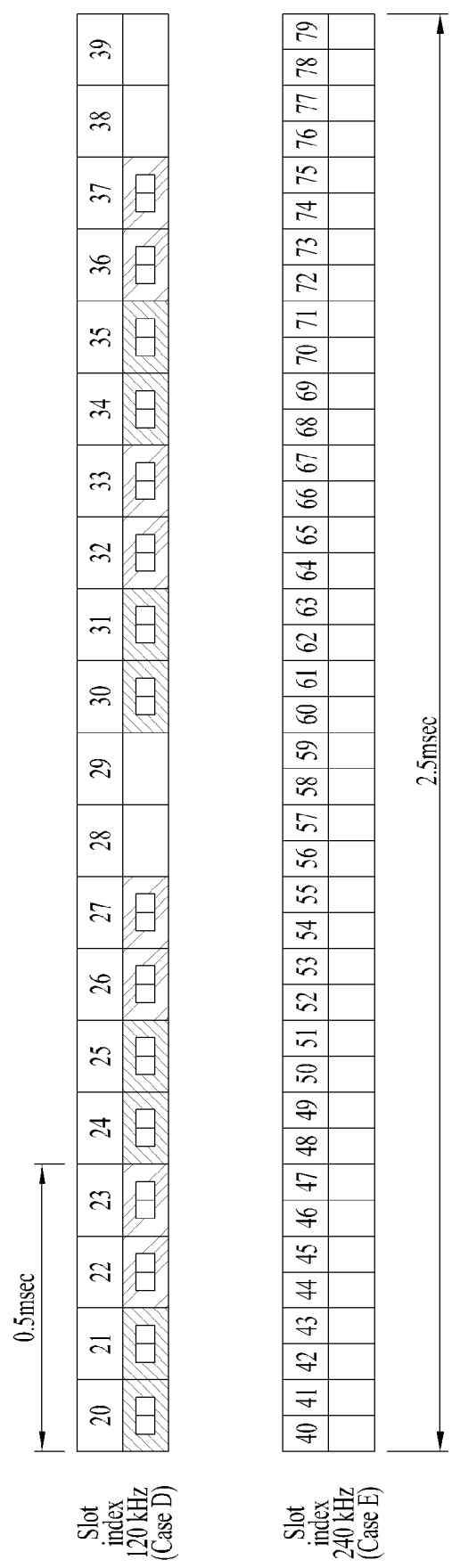

FIG. 11 illustrates SS/PBCH block transmission depending on each SCS at the symbol level in the time domain FIGS. 12(a) to 12(c) illustrates SS/PBCH block transmission depending on each SCS at the slot level in the time domain (in the conventional 3GPP Rel-15 NR system). Hereinafter, a window capable of SS/PBCH block transmission is defined as an S_window, and the S_window is assumed to be a window of 5 msec. However, depending on embodiments, the duration of the S_window may be set to other values (e.g., 0.5 msec, 1/2/3/4 msec, etc.) by the BS. Referring to FIG. 12(a), the 5 msec window may include a total of 40 slots for the 120 kHz SCS. SS/PBCH blocks may be transmitted in 8 consecutive slots 1200, and a gap of two slots 1201 (e.g., slots #8 and #9) may exist between 8 consecutive slots (e.g., slots #0 to #7 1200 or slots #10 to #17). In this case, as in the 120 kHz SCS case 1100 shown in FIG. 11, a maximum of four SS/PBCH blocks may be transmitted in two slots (e.g., slots #0 and #1 1202, slots #2 and #3, slots #4 and #5, and slots #6 and #7) among the 8 consecutive slots (e.g., slots #0 to #7) capable of SS/PBCH block transmission. Similarly, the 5 msec window may include a total of 80 slots for the 240 kHz SCS. SS/PBCH blocks may be transmitted in 16 consecutive slots 1210, and a gap of four slots 1211 (e.g., slots #16 to #19) may exist between 16 consecutive slots (e.g., slots #0 to #15 1210 and slots #20 to #35). In this case, as in the 240 kHz SCS case of FIG. 11, a maximum of 8 SS/PBCH blocks may be transmitted in four slots (e.g., slots #0 to 3 slots #4 to #7, slots #8 to #11, and slots #12 to #15) among the 16 consecutive slots 1210 capable of SS/PBCH block transmission (e.g., slots #0 to #15). That is, for the 120 kHz SCS and 240 kHz SCS, the maximum number of SS/PBCH block (candidate) indices allowed within the 5 msec window may be limited to 64. Which SS/PBCH blocks are transmitted among the maximum of 64 SS/PBCH block (candidate) indices may be configured by cell-specific signaling or UE-specific RRC signaling.

Even if the NR system is extended to operate in frequency bands of 60/70 GHz (for convenience, the 60/70 GHz band is hereinafter referred to as frequency range 3 (FR3)), the SCS of an SS/PBCH block may be applied as 120 or 240 kHz as defined in FR2. The present disclosure proposes methods of increasing SS/PBCH block transmission opportunities in U-bands in the above situation. In addition, the present disclosure proposes methods of obtaining a serving cell timing, obtaining a quasi-co-located (QCL) relationship between SS/PBCH blocks, or notifying actually transmitted SS/PBCH block (candidate) indices among a maximum of 64 SS/PBCH block candidates in the above situation. In this case, obtaining the serving cell timing may include obtaining information about the timing of the serving cell, and in some embodiments, it may be referred to as acquisition of time synchronization of the serving cell. For example, the timing information may include information about a timing boundary such as a frame, a subframe, a slot, and a symbol, but the timing information is not limited thereto. In addition, obtaining the QCL relationship between SS/PBCH blocks may mean obtaining information on SS/PBCH blocks in the QCL relationship among a plurality of SS/PBCH blocks. Further, the actually transmitted SS/PBCH block candidate index may mean the SS/PBCH block candidate index related to an SS/PBCH block actually transmitted by the BS.

In the present disclosure, when two SS/PBCH blocks are in the QCL relationship, the UE may assume that the two SS/PBCH blocks have the same (large-scale) channel characteristics (e.g., average gain, Doppler shift, Doppler spread, average delay, delay spread, spatial Rx parameter, etc.).

Although the methods proposed in the present disclosure are described based on operation in U-bands, the methods may be applied to operation in licensed bands depending on the proposal. In addition, the term "unlicensed band" may be interchanged with the term "shared spectrum".

1) Receiver (Entity A; For Example, UE)

[Method #1] When {SCS of SS/PBCH block, SCS of CORESET #0}={240, 240} kHz, the time-domain resource configuration and default PDSCH time domain resource allocation (TDRA) value of CORESET #0 (or CORESET index 0) corresponding to each SS/PBCH block are proposed.

Figure 13:
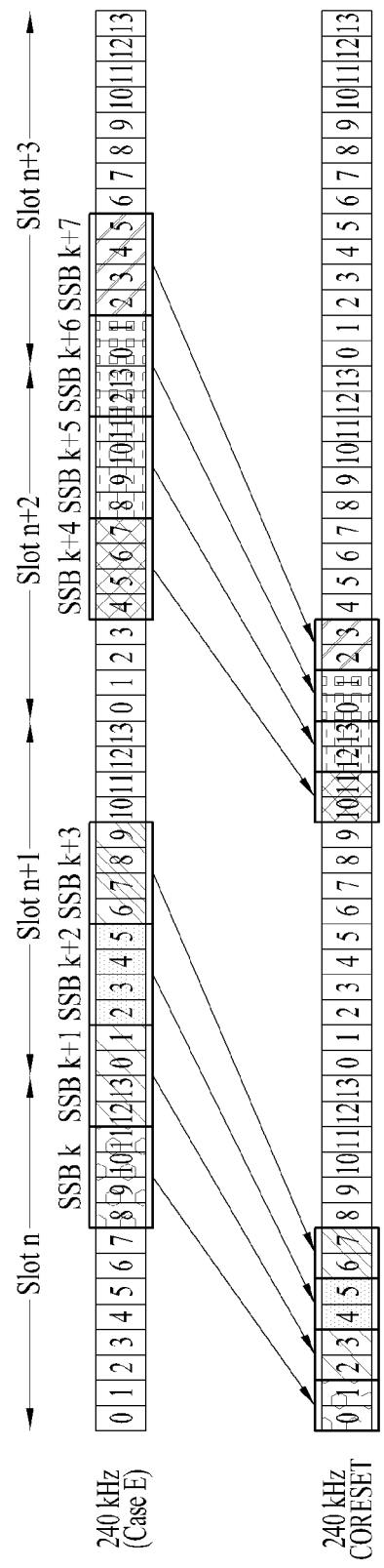
FIG. 13 is a diagram illustrating an example of configuring control resource set (CORESET) #0 according to [Method #1] proposed herein.

As shown in FIG. 13, CORESET #0 and Type0-PDCCH CSS set may be configured by a PBCH. For slot index n, n may be all or part of n that is '0' as a result of performing n modulo 4 operation (e.g., n=0, 4, 8, 12, . . . ). Hereinafter, a slot with slot index n is referred to as slot #n for convenience of description. CORESET #0 corresponding to SS/PBCH block #k (symbols #8/9/10/11 of slot #n) may be configured in symbols #0/1 of slot #n. SS/PBCH block #k may mean an SS/PBCH block with SS/PBCH block (candidate) index k. Hereinafter, CORESET #0 corresponding to an SS/PBCH block is interchangeable with CORESET #0 associated with an SS/PBCH block, CORESET #0 associated with an SS/PBCH block (candidate) index. In some embodiments, a one-symbol CORESET may be configured instead of a two-symbol CORESET shown in FIG. 13. The one-symbol CORESET may refer to a CORESET composed of one OFDM symbol, and the two-symbol CORESET may refer to a CORESET composed of two OFDM symbols. In addition, an SSB used in the drawings of the present disclosure may be interpreted to mean an SS/PBCH block. For example, when the one-symbol CORESET is configured, one-symbol CORESET #0 corresponding to SS/PBCH block #k may be configured in symbol #0 or #1 of slot #n. The same method may be applied to SS/PBCH block #(k+1) to SS/PBCH block #(k+7). The above-described method may be applied when the multiplexing pattern between an SS/PBCH block (SSB) and a CORESET is a time division multiplexing (TDM) pattern and/or a frequency division multiplexing (FDM) pattern. Thus, according to the proposed method, even when the multiplexing pattern is the TDM pattern, an SS/PBCH block and CORESET #0 corresponding to the SS/PBCH block may be transmitted in the same (continuous) SS/PBCH block burst, which may be advantageous for unlicensed bands where a channel needs to be occupied for a predetermined time after the CAP is completed (or after the CAP is successful).

Tables 7 and 8 below are extracted from 3GPP TS 38.214. Table 7 is a TDRA table applied after reception of UE-specific RRC signaling, and Table 8 is a default TDRA table used before reception of UE-specific RRC signaling. Before receiving UE-specific RRC signaling, the UE may check TDRA based on the default table shown in Table 8. For example, when the RNTI on a PDCCH is an SI-RNTI for receiving SIB1 or RMSI, if the multiplexing pattern between an SS/PBCH block and a CORESET is Pattern 1 (TDM between the SS/PBCH block and CORESET #0), the TDRA for the corresponding PDSCH (e.g., PDSCH including system information) may follow the Default A parameter set of Table 8. The TDRA method proposed in this section may be limitedly applied to a PDSCH scheduled by CORESET #0 before the UE receives SLIV related RRC signaling. In particular, the TDRA method may be limitedly applied to a PDSCH carrying (or including) system information (paging messages or random access response messages) (before reception of SLIV related RRC signaling).

TABLE 7

Table 5.1.2.1.1-1: Applicable PDSCH time domain resource allocation

| RNTI | PDCCH search space | SS/PBCH block and CORESET multiplexing pattern | pdsch-ConfigCommon includes pdsch-TimeDomain AllocationList | pdsch-Config includes pdsch-TimeDomain AllocationList | PDSCH time domain resource allocation to apply |
|---|---|---|---|---|---|
| SI-RNTI | Type0 common | 1 | — | — | Default A for normal CP |
|  |  | 2 | — | — | Default B |
|  |  | 3 | — | — | Default C |
| SI-RNTI | Type0A common | 1 | No | — | Default A |
|  |  | 2 | No | — | Default B |
|  |  | 3 | No | — | Default C |
|  |  | 1, 2, 3 | Yes | — | pdsch-TimeDomain AllocationList provided in pdsch-ConfigCommon |
| RA-RNTI; TC-RNTI | Type1 common | 1, 2, 3 | No | — | Default A |
|  |  | 1, 2, 3 | Yes | — | pdsch-TimeDomain AllocationList provided in pdsch-ConfigCommon |
| P-RNTI | Type2 common | 1 | No | — | Default A |
|  |  | 2 | No | — | Default B |
|  |  | 3 | No | — | Default C |
|  |  | 1, 2, 3 | Yes | — | pdsch-TimeDomain AllocationList provided in pdsch-ConfigCommon |
| C-RNTI, MCS-C-RNTI, CS-RNTI | Any common search space associated with CORESET 0 | 1, 2, 3 | No | — | Default A |
|  |  | 1, 2, 3 | Yes | — | pdsch-TimeDomain AllocationList provided in pdsch-ConfigCommon |
| C-RNTI, MCS-C-RNTI, CS-RNTI | Any common search space not associated with CORESET 0 | 1, 2, 3 | No | No | Default A |
|  |  | 1, 2, 3 | Yes | No | pdsch-TimeDomain AllocationList provided in pdsch-ConfigCommon |
|  | UE specific search space | 1, 2, 3 | No/Yes | Yes | pdsch-TimeDomain AllocationList provided in pdsch-Config |

TABLE 8

Table 5.1.2.1.1-2: Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
| 7 | 3 | Type B | 0 | 10 | 4 |
|  | 2 | Type B | 0 | 4 | 4 |
| 8 | 3 | Type B | 0 | 6 | 4 |
|  | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In the default TDRA table of Table 8, dmrs-TypeA-position may be signaled by a PBCH. If the value of dmrs-TypeA-position is 2, it may mean that the first DM-RS symbol of PDSCH mapping type A is the third symbol of a slot. If the value of dmrs-TypeA-position is 3, it may mean that the first DM-RS symbol of PDSCH mapping type A is the fourth symbol of a slot. In the case of PDSCH mapping type B, the first symbol of a PDSCH is basically a DM-RS symbol. When $K_0$ is 0, it means that a PDSCH and a PDCCH scheduling the corresponding PDSCH are located in the same slot, and S and L denote the starting symbol index of a PDSCH and the number of consecutive symbols in a slot.

Considering the characteristics of unlicensed bands that a channel needs to be occupied for a specific time after the CAP is successful, when an SS/PBCH block and CORESET #0 corresponding to the SS/PBCH block are transmitted as shown in FIG. 13, it may be advantageous that a PDSCH scheduled by a PDCCH in CORESET #0 is also scheduled to be included in the same (continuous) SS/PBCH block burst. To support the proposed method, a method of signaling all or some of the following values of $\{K_0, S, L\}$ through the default TDRA table may be introduced. For example, for licensed band operation, the default TDRA table may be used as it is. On the other hand, when an SS/PBCH block and CORESET #0 corresponding to the SS/PBCH block are transmitted in an unlicensed band, $\{K_0, S, L\}$ in a row index corresponding to PDSCH TDRA that does not belong to the same (continuous) SS/PBCH block burst in Table 8 may be replaced with the following values of $\{K_0, S, L\}$.

{0, 8, 2 or 4} (e.g., for SSB #k)
{0, 12, 2 or 4} (e.g., for SSB #(k+1))
{1, 2, 2 or 4} (e.g., for SSB #(k+2))
{1, 6, 2 or 4} (e.g., for SSB #(k+3))
{1, 4, 2 or 4} (e.g., for SSB #(k+4))
{1, 8, 2 or 4} (e.g., for SSB #(k+5))
{0, 10, 2 or 4} (e.g., for SSB #(k+6))
{1, 2, 2 or 4} (e.g., for SSB #(k+7))

[Method #2] When {SCS of SS/PBCH block, SCS of CORESET #0}={240, 240} kHz, and when the SS/PBCH block and CORESET #0 are frequency division multiplexed (FDMed), default PDSCH TDRA value and the time-domain resource configuration of CORESET #0 corresponding to each SS/PBCH block are proposed.

Figure 14:
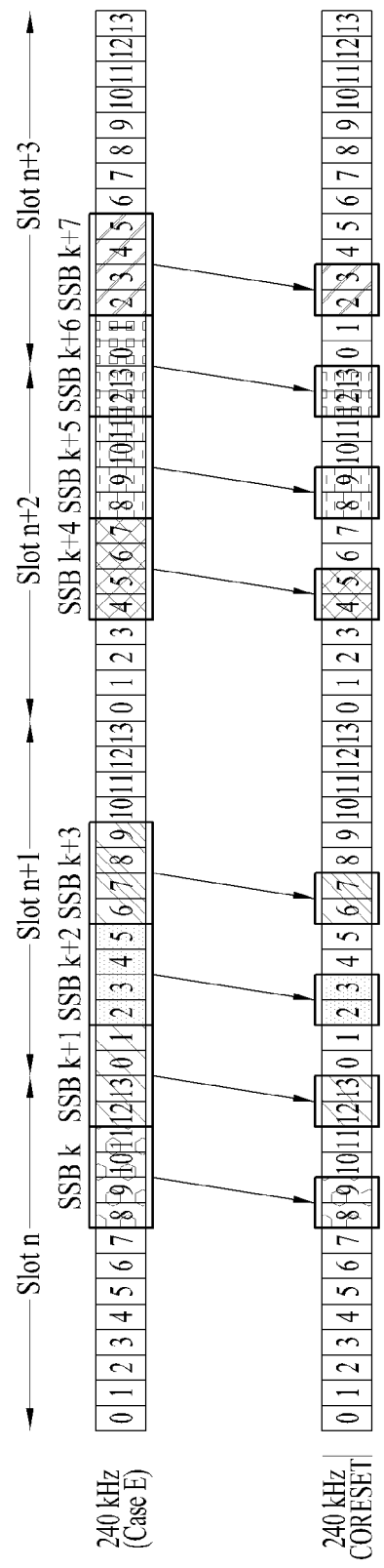
FIG. 14 is a diagram illustrating an example of configuring CORESET #0 according to [Method #2] proposed herein.

As shown in FIG. 14, CORESET #0 and Type0-PDCCH CSS set may be configured by a PBCH. For slot index n, n may have any value as long as n modulo 4 is '0' (e.g., n=0, 4, 8, 12, . . . ). CORESET #0 corresponding to SS/PBCH block #k (symbols #8/9/10/11 of slot #n) may be configured in symbols #8/9 of slot #n. In some embodiments, a one-symbol CORESET may be configured instead of a two-symbol CORESET shown in FIG. 14. For example, when the one-symbol CORESET is configured, one-symbol CORESET #0 corresponding to SS/PBCH block #k may be configured in symbol #8 or #9 of slot #n. This may be equally applied to SS/PBCH block #(k+1) to SS/PBCH block #(k+7). The proposed method may be applied when the multiplexing pattern between an SS/PBCH block (SSB) and a CORESET is the FDM pattern. According to the proposed method, if an SS/PBCH block and CORESET #0 corresponding to the SS/PBCH block are simultaneously transmitted based on FDM, the transmission beam directions of the BS may be unified.

When an SS/PBCH block and CORESET #0 corresponding to the SS/PBCH block are transmitted as shown in FIG. 14, it may be advantageous that a PDSCH scheduled by a PDCCH in CORESET #0 is also scheduled to be included in the same beam section. To support the proposed method, a method of signaling all or some of the following values of $\{K_0, S, L\}$ through the default TDRA table (e.g., Table 8) may be introduced. For example, for licensed band operation, the default TDRA table may be used as it is. On the other hand, when an SS/PBCH block and CORESET #0 corresponding to the SS/PBCH block are transmitted in an unlicensed band, $\{K_0, S, L\}$ in a row index corresponding to PDSCH TDRA that does not belong to the same beam section in Table 8 may be replaced with the following values of $\{K_0, S, L\}$.

{0, 12, 2 or 4} (e.g., for SSB #(k+1) or #(k+6))
{1, 0, 2} (e.g., for SSB #(k+1) or #(k+6))

[Method #3] When {SCS of SS/PBCH block, SCS of CORESET #0}={240, 480} kHz, the time-domain resource configuration and default PDSCH TDRA value of CORESET #0 corresponding to each SS/PBCH block are proposed.

Figure 15:
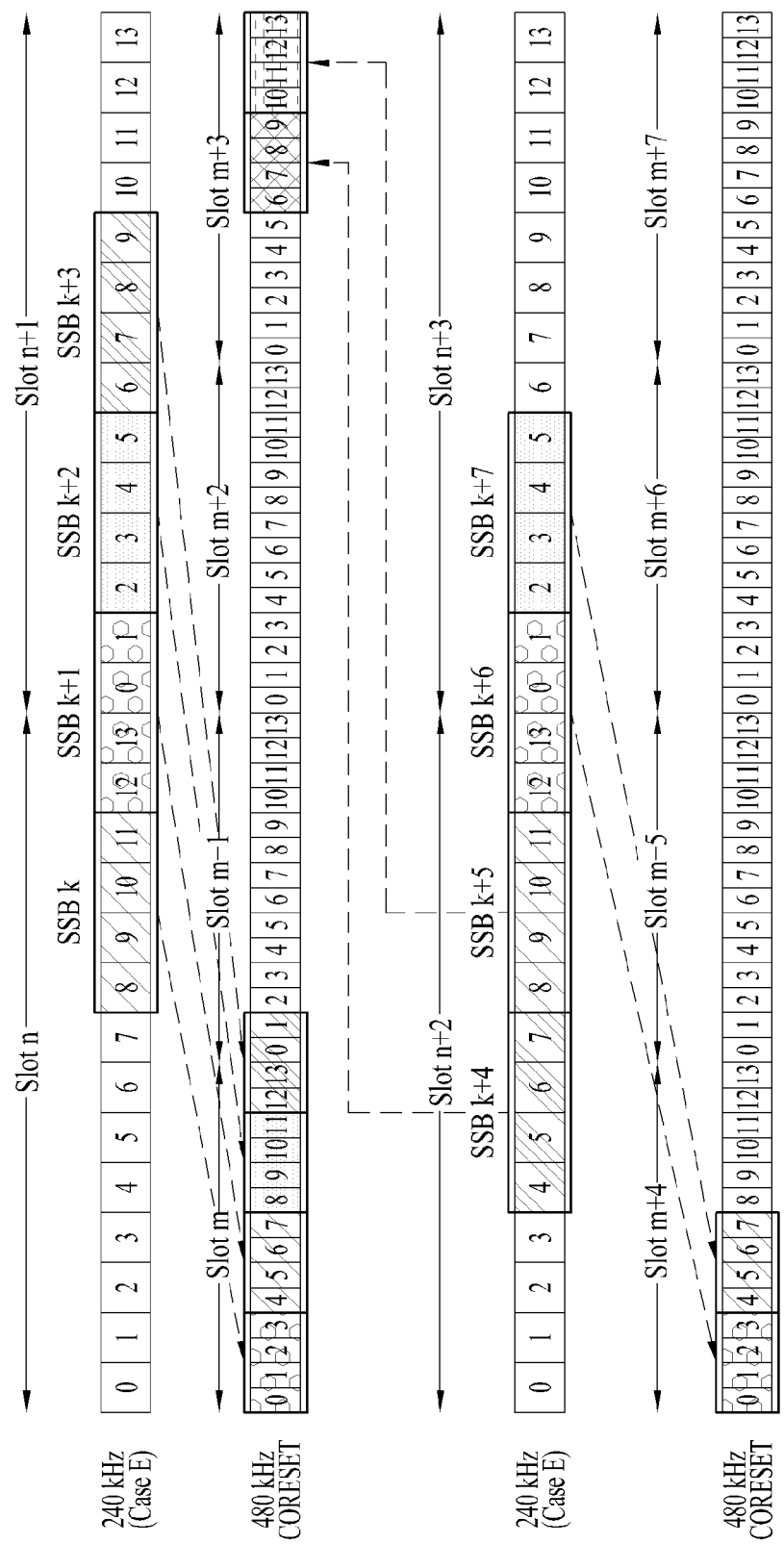
FIGS. 15 and 16 are diagrams illustrating an example of configuring CORESET #0 according to [Method #3] proposed herein.

As shown in FIG. 15, CORESET #0 and Type0-PDCCH CSS set may be configured by a PBCH. For slot index n, n may have any value as long as n modulo 4 is '0' n (e.g., n=0, 4, 8, 12, . . . ). For slot index m, m may have any value as long as m modulo 8 is '0' n (e.g., m=0, 8, 16, 24, . . . ). It is assumed that the slot boundaries of slot #n and slot #m/(m+1) are aligned in the time domain. CORESET #0 corresponding to SS/PBCH block #k (symbols #8/9/10/11 of slot #n) may be configured in symbols #0/1/2/3 of slot #m. CORESET #0 corresponding to SS/PBCH block #(k+4) (symbols #4/5/6/7 of slot #(n+2)) may be configured in symbols #6/7/8/9 of slot #(m+3). The same method may be applied to SS/PBCH block #(k+1) to SS/PBCH block #(k+7).

The beam switching delay of a transmitting BS and/or a receiving UE may be a time corresponding to a normal CP for a SCS of 480 kHz (which may be about 100 ns). Therefore, when a signal is transmitted and received after beam switching, there may be a difference in transmission/reception performance between adjacent symbols. In consideration of this, a three-symbol CORESET (i.e., a CORESET composed of three OFDM symbols) may be configured rather than a four-symbol CORESET (i.e., a CORESET composed of four OFDM symbols), and a one-symbol gap may be configured between CORESET #0s corresponding to different SS/PBCH block indices. As an example, when three-symbol CORESET #0 corresponding to SS/PBCH block #k is configured in symbols #0/1/2 of slot #n, and when three-symbol CORESET #0 corresponding to SS/PBCH block #(k+1) is configured in symbols #4/5/6 of slot #n, a one-symbol gap (e.g., symbol #3 of slot #n) may be configured between the two CORESETs. As another example, when two-symbol CORESET #0 corresponding to SS/PBCH block #k is configured in symbols #1/2 of slot #n, and when two-symbol CORESET #0 corresponding to SS/PBCH block #(k+1) is configured in symbols #5/6 of slot #n, a two-symbol gap (e.g., symbols #3/4 of slot #n) may be configured between the two CORESETs. In particular, since symbol #6 of slot #(m+3) among symbols included in CORESET #0 corresponding to SS/PBCH block #(k+4) is a symbol located immediately after the last symbol of SS/PBCH block #(k+3) (i.e., symbol #9 of slot #(n+1)), symbol #6 of slot #(m+3) may be defined to be always empty in consideration of beam switching. Alternatively, in some embodiments, it may be configured whether symbol #6 of slot #(m+3) is used for a CORESET. In general, all or some of the four symbols occupied by each CORESET #0 in FIG. 15 may be set as CORESET resources, and the same method may be applied to SSBs #(k+1) to #(k+7).

The proposed method may be applied when the multiplexing pattern between an SS/PBCH block (SSB) and a CORESET is the TDM and/or 1-DM pattern. In particular, in the case of the TDM pattern, an SS/PBCH block and CORESET #0 corresponding to the SS/PBCH block may be transmitted in the same (continuous) burst, which may be advantageous for unlicensed bands where a channel needs to be occupied for a predetermined time after the CAP is successful.

When an SS/PBCH block and CORESET #0 corresponding to the SS/PBCH block are transmitted as shown in FIG. 15, it may be advantageous that a PDSCH scheduled by a PDCCH in the CORESET is also scheduled to be included in the same (continuous) burst (particularly, considering the characteristics of unlicensed bands that a channel needs to be occupied for a specific time after the CAP is successful). To support the proposed method, a method of signaling all or some of the following values of {K$_0$, S, L} through the default TDRA table of Table 8 may be introduced. For example, for licensed band operation, the default TDRA table may be used as it is. On the other hand, when an SS/PBCH block and CORESET #0 corresponding to the SS/PBCH block are transmitted in an unlicensed band, {K$_0$, S, L} in a row index corresponding to PDSCH TDRA that does not belong to the same (continuous) burst in Table 8 may be replaced with the following values of {K$_0$, S, L}.

- {1, 2, integer less than or equal to 2 or 4 or 7 or 8} (e.g., for SSB #k)
- {1, 10, integer less than or equal to 2 or 4 or 7 or 8} (e.g., for SSB #(k+1))
- {2, 4, integer less than or equal to 2 or 4 or 7 or 8} (e.g., for SSB #(k+2))
- {2, 12, integer less than or equal to 2 or 4 or 7 or 8} (e.g., for SSB #(k+3))
- { 1, 8, integer less than or equal to 2 or 4 or 7 or 8} (e.g., for SSB #(k+4))
- {2, 2, integer less than or equal to 2 or 4 or 7 or 8} (e.g., for SSB #(k+5))
- {1, 10, integer less than or equal to 2 or 4 or 7 or 8} (e.g., for SSB #(k+6))
- {2, 4, integer less than or equal to 2 or 4 or 7 or 8} (e.g., for SSB #(k+7))

Figure 16:
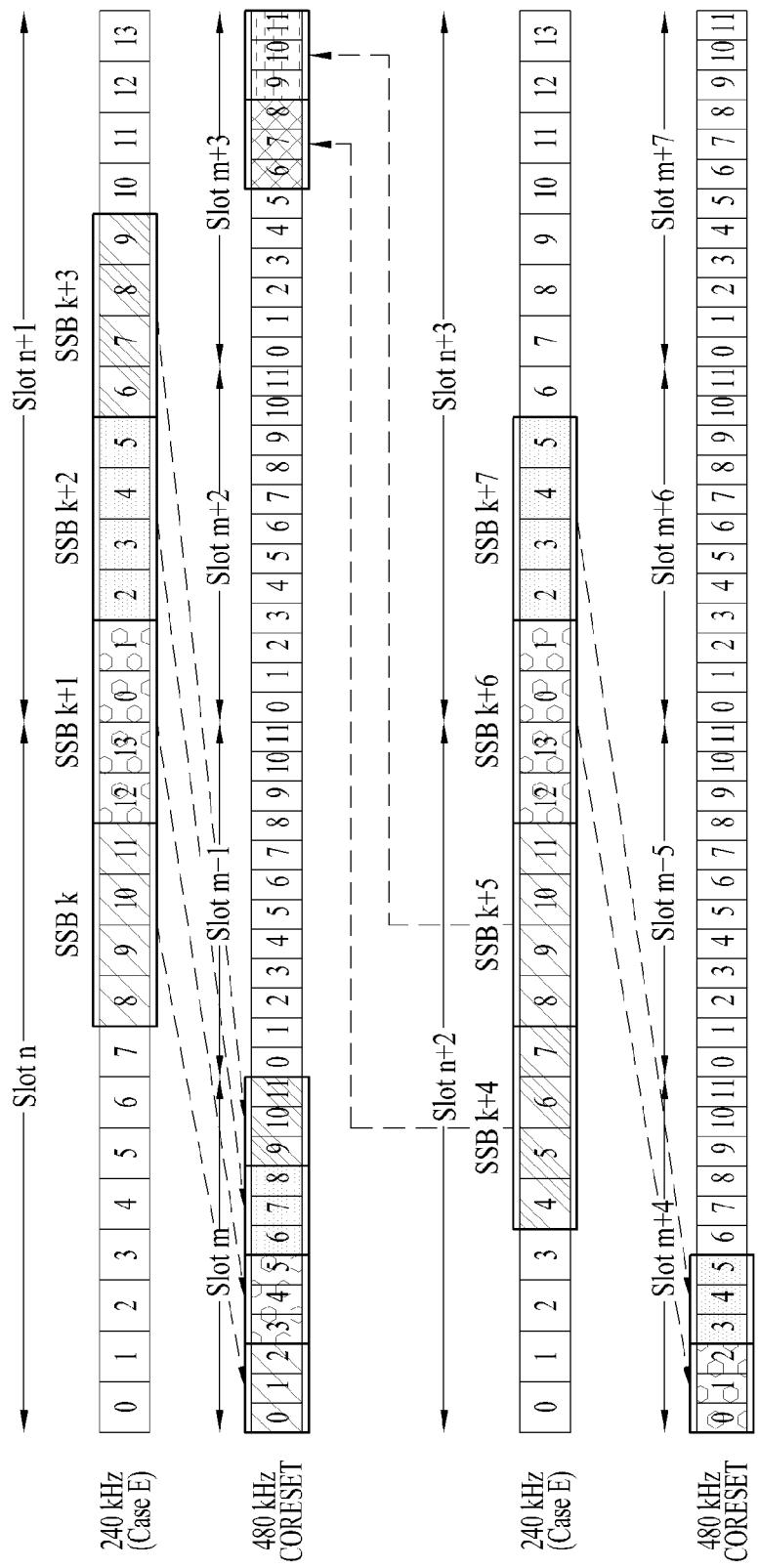

Hereinafter, a description will be given of a method of configuring time resources of CORESET #0 when an SCS of 480 kHz SCS and an extended CP are introduced. CORESET #0 and Type0-PDCCH CSS set may be configured by a PBCH as shown in FIG. 16. In this case, it is assumed that one slot with the extended CP includes 12 symbols. For slot index n, n may have any value as long as n modulo 4 is '0' n (e.g., n=0, 4, 8, 12, . . . ). For slot index m, m may have any value as long as m modulo 8 is '0' n (e.g., m=0, 8, 16, 24, . . . ). It is assumed that the slot boundaries of slot #n and slot #m/(m+1) are aligned in the time domain. CORESET #0 corresponding to SS/PBCH block #k (symbols #8/9/10/11 of slot #n) may be configured in symbols #0/1/2 of slot #m. CORESET #0 corresponding to SS/PBCH block #(k+4) (symbols #4/5/6/7 of slot #(n+2)) may be configured in symbols #6/7/8 of slot #(m+3). This may be applied to SS/PBCH block #(k+1) to SS/PBCH block #(k+7). In the case of the extended CP, since the extended CP is relatively larger than the beam switching delay of the transmitting BS and/or the receiving UE (about 100 ns) for the 480 kHz SCS, unlike a normal CP, the time resources of CORESET #0s associated with different SS/PBCH block indices may be set to consecutive symbols, instead of configuring a symbol gap between CORESET #0s.

[Method #4] An SCS of 480 and/or 960 kHz may be introduced in consideration of coexistence with the WiGig system with a bandwidth of 2 GHz (approximately, 2.16 GHz) and a 4096 fast Fourier transform (FFT) size (assumed in the Rel-15 NR system). In the following, the symbol position of CORESET #0 is proposed when an SS/PBCH block with an SCS of {120, 240, 480, 960} kHz and CORESET #0 with an SCS of 960 kHz are capable of being multiplexed. That is, the UE may receive CORESET #0 associated with a specific SS/PBCH block (candidate) index at the proposed symbol position.

Figure 17A:
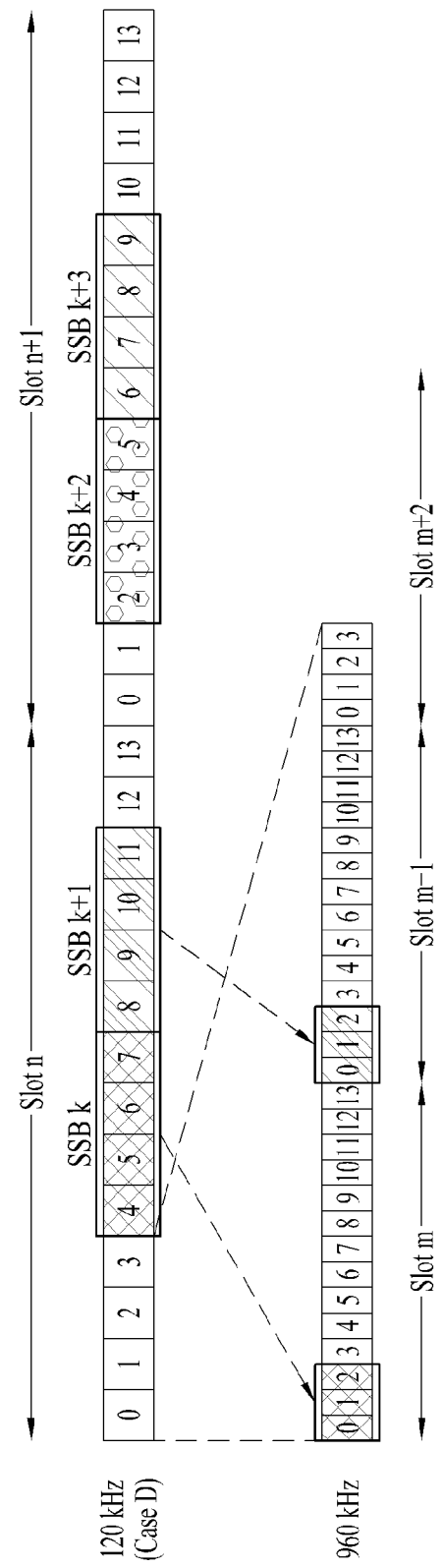
FIGS. 17(*a*) to 20(*b*) are diagrams illustrating an example of configuring CORESET #0 according to [Method #4] proposed herein.
Figure 17B:
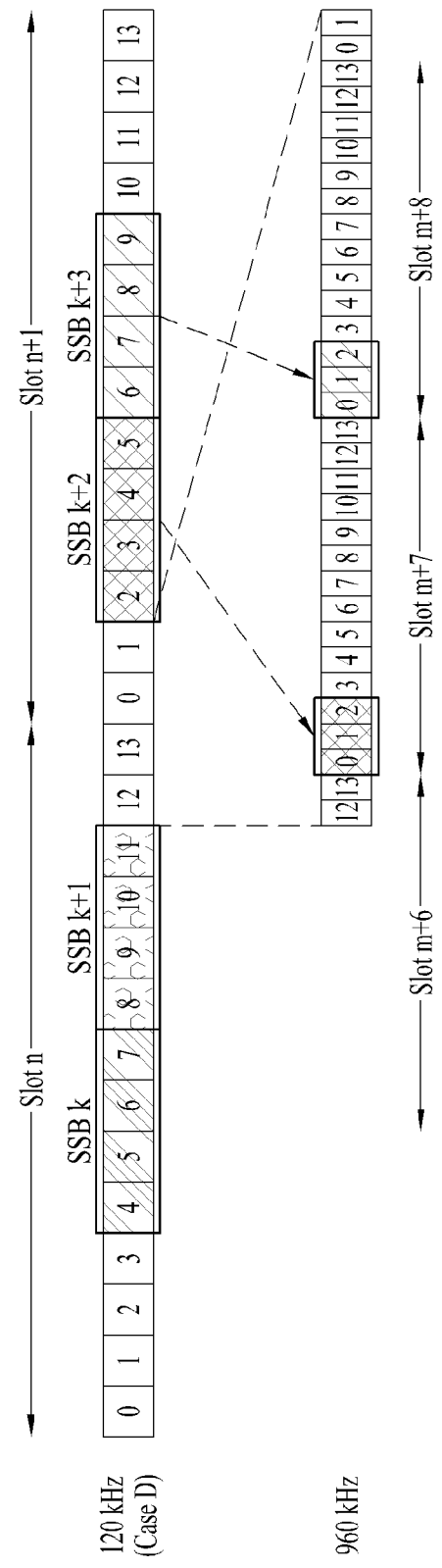

When {SCS of SS/PBCH block, SCS of CORESET #0}={120, 960} kHz, the positions (or transmission positions) of CORESET #0s associated with two SS/PBCH block (candidate) indices (or CORESET #0s associated with two SS/PBCH blocks (candidates)) need to be defined within 1) 32 symbols for the 960 kHz SCS corresponding to symbols #0/1/2/3 of slot #n and 2) 32 symbols for the 960 kHz SCS corresponding to symbols #12/13 of slot #n and symbols #0/1 of slot #(n+1). For example, as shown in FIGS. 17(a) and 17(b), the starting symbol of CORESET #0 associated with each SS/PBCH block (candidate) may be determined from each slot boundary, and the number of symbols of CORESET #0 spanning from the corresponding starting symbol may be additionally configured/defined. Specifically, CORESET #0 associated with SS/PBCH block (candidate) #k transmitted in symbols #4/5/6/7 of slot #n may span P symbols from symbol #0 of slot #m, (e.g., P=3), and the value of P may be predefined or configured by higher layer signaling (e.g., MIB). In this case, spanning P symbols from symbol #0 may mean that the P symbols are consecutive from symbol #0. Accordingly, that CORESET #0 spanning P symbols from symbol #0 of slot #m may mean that CORESET #0 includes the P symbols from symbol #0 of slot #m. Alternatively, to perform SIB1 transmission compactly, CORESET #0s associated with two SS/PBCH block (candidate) indices may be configured to be transmitted within one slot with the 960 kHz SCS. Specifically, the starting symbol of CORESET #0 associated with SS/PBCH block (candidate) #(k+1) may be defined/set as a symbol next to symbol #7 of slot #m or a symbol next to the last symbol of CORESET #0 associated with SS/PBCH block (candidate) #k (or a symbol after T symbols (e.g., T=1) from the last symbol of CORESET #0 associated with SS/PBCH block (candidate) #k in consideration of the beam switching time).

Figure 17C:
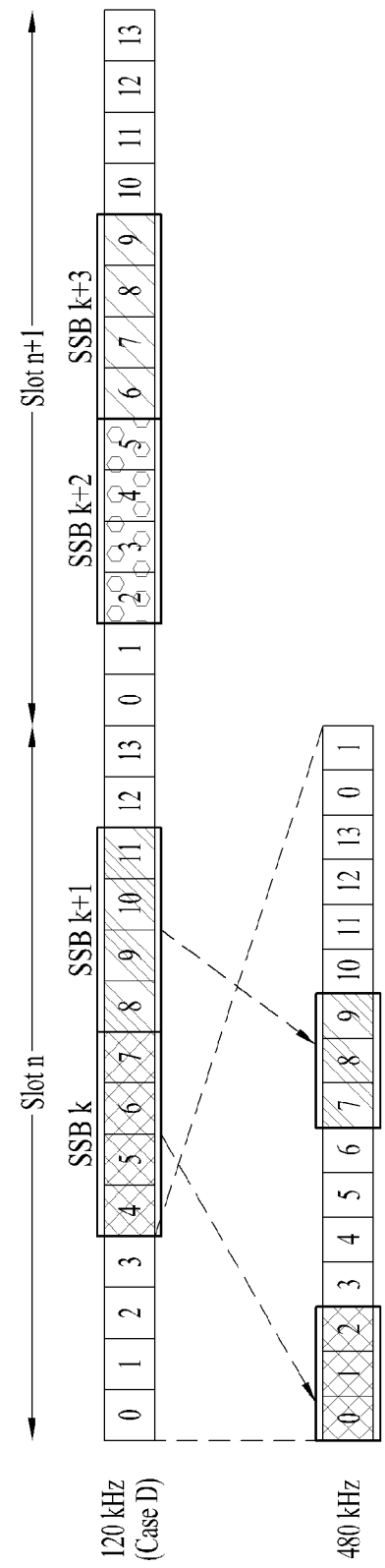
Figure 17D:
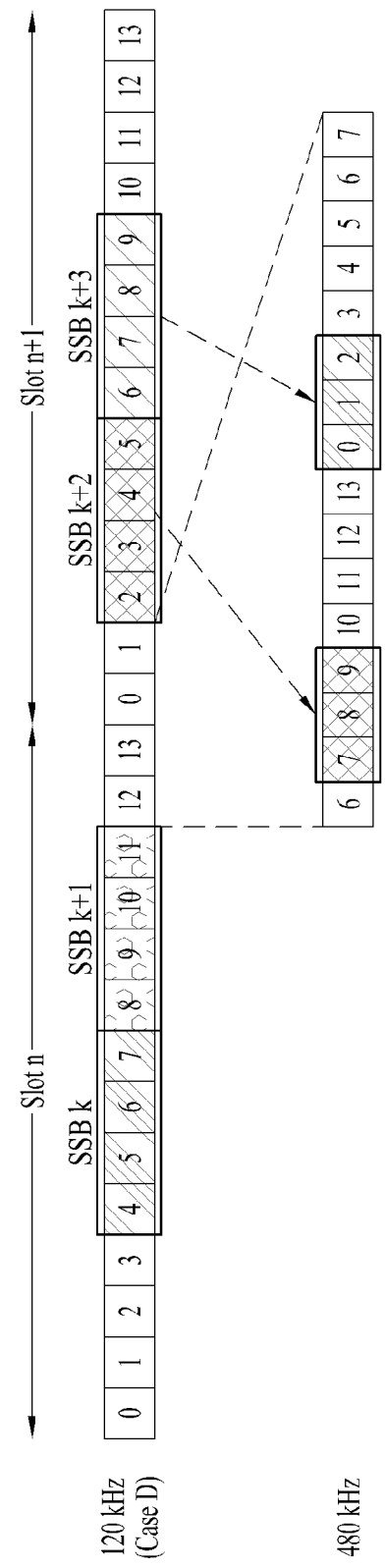

When {SCS of SS/PBCH block, SCS of CORESET #0}={120, 480} kHz, the positions of CORESET #0s associated with two SS/PBCH block (candidate) indices need to be defined within 1) 16 symbols for the 480 kHz SCS corresponding to symbols #0/1/2/3 of slot #n and 2) 16 symbols for the 480 kHz SCS corresponding to symbols #12/13 of slot #n and symbols #0/1 of slot #(n+1). For example, as shown in FIGS. 17(c) and 17(d), the starting symbol of CORESET #0 associated with each SS/PBCH block (candidate) may be determined from each half-slot boundary, and the number of symbols of CORESET #0 spanning from the corresponding starting symbol may be additionally configured/defined. Specifically, CORESET #0 associated with SS/PBCH block (candidate) #k transmitted in symbols #4/5/6/7 of slot #n may span P symbols from symbol #0 of slot #m, (e.g., P=3), and the value of P may be predefined or configured by higher layer signaling (e.g., MIB). The starting symbol of CORESET #0 associated with SS/PBCH block (candidate) #(k+1) may be defined/set as a symbol next to symbol #7 of slot #m or a symbol next to the last symbol of CORESET #0 associated with SS/PBCH block (candidate) #k (or a symbol after T symbols (e.g., T=1) from the last symbol of CORESET #0 associated with SS/PBCH block (candidate) #k in consideration of the beam switching time).

Figure 18A:
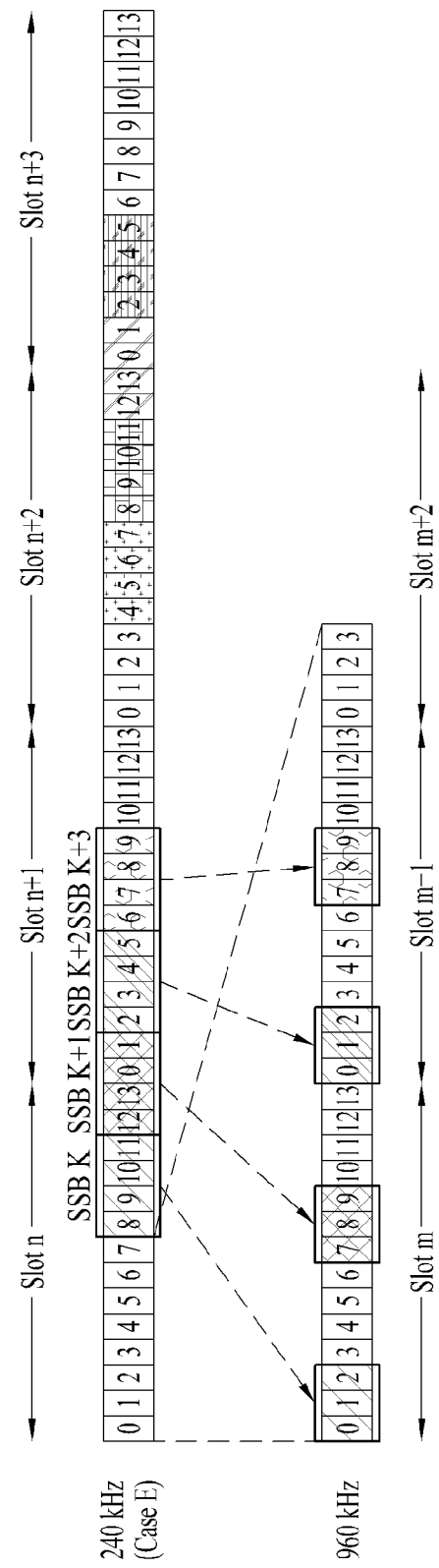
Figure 18B:
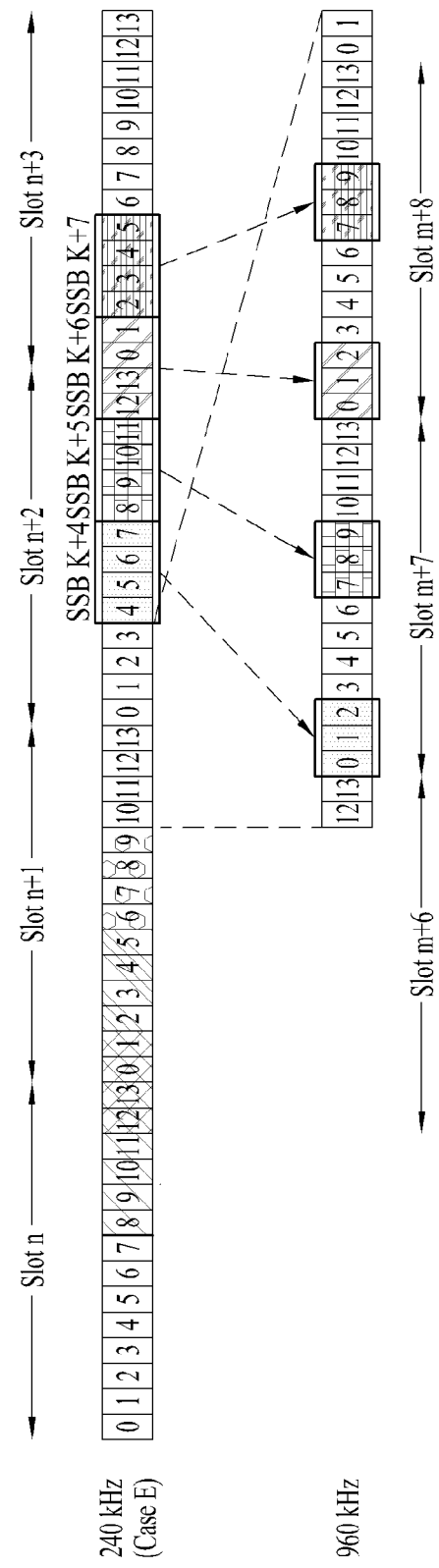

When {SCS of SS/PBCH block, SCS of CORESET #0}={240, 960} kHz, the transmission positions of CORESET #0s associated with four SS/PBCH block (candidate) indices need to be defined within 32 symbols for the 960 kHz SCS corresponding to symbols #0/1/2/3/4/5/6/7 of slot #n and 32 symbols for the 960 kHz SCS corresponding to symbols #10/11/12/13 of slot #n and symbols #0/1/2/3 of slot #(n+1). For example, the starting symbol of CORESET #0 associated with each SS/PBCH block (candidate) may be determined from each slot boundary and each half-slot boundary as shown in FIGS. 18(a) and 18(b), and the number of symbols of CORESET #0 spanning from the corresponding starting symbol may be additionally configured/defined. Specifically, CORESET #0 associated with SS/PBCH block (candidate) #k defined in symbols #8/9/10/11 of slot #n may span P symbols from symbol #0 of slot #m, (e.g., P=3), and the value of P may be predefined or configured by higher layer signaling (e.g., MIB). Alternatively, in some embodiments, CORESET #0s associated with two SS/PBCH block (candidate) indices may be configured to be transmitted continuously as much as possible within one slot with the 960 kHz SCS rather than at the slot boundary or half-slot boundary. Specifically, the starting symbol of CORESET #0 associated with SS/PBCH block (candidate) index #(k+1) may be defined/set as a symbol (e.g., symbol #3 or #4 of slot #m) next to the last symbol (e.g., symbol #2 of slot #m) of CORESET #0 associated with SS/PBCH block (candidate) index #k (or a symbol (e.g., symbol #3 of slot #m) after T symbols (e.g., T=1) from the last symbol of CORESET #0 associated with SS/PBCH block (candidate) #k in consideration of the beam switching time). Alternatively, to perform SIB1 transmission compactly, CORESET #0s associated with four SS/PBCH block (candidate) indices may be configured to be transmitted continuously as much as possible. Specifically, four CORESET #0s may be configured to be transmitted back to back from symbol #0 of slot #m. A gap between the starting symbol indices of adjacent CORESET #0s (or a gap between the starting symbols of adjacent CORESET #0s) may be determined as "the number of symbols in CORESET #0+T". In this case, the value of T may be determined in consideration of the beam switching interruption time, which may be predefined (e.g., T=1). The number of symbols of CORESET #0 may be predefined or configured by higher layer signaling (e.g., MIB). For example, when the starting symbol of first CORESET #0 in a slot is symbol #0, P=2, and T=1, four CORESET #0s may be defined/configured in {symbols #0/1}, {symbols #3/4}, {symbols #6/7}, and {symbols #9/10}, respectively.

When {SCS of SS/PBCH block, SCS of CORESET #0}={480, 960} kHz, the symbol position of an SS/PBCH block with the 480 kHz SCS may be determined in alignment with the predefined symbol position of an SS/PBCH block with an SCS of 120/240 kHz. In this case, the transmission positions of CORESET #0s associated with 8 SS/PBCH block (candidate) indices need to be defined within 32 symbols for the 960 kHz SCS. For example, as shown in FIGS. 19(*a*) and 19(*b*), 32 symbols may be divided into 8 equal parts, and the starting symbol of each CORESET #0 may be determined from the first symbol (or the second symbol) in each of the 8 divided parts. The number of symbols of CORESET #0 spanning from the corresponding starting symbol may be additionally configured/defined. Specifically, CORESET #0 associated with SS/PBCH block (candidate) index #k may span P symbols from symbol #0 of slot #m (e.g., P=3), and the value of P may be predefined or configured by higher layer signaling (e.g., MIB).

SS/PBCH block (candidate) indices may be in the QCL relationship. When N consecutive SS/PBCH block (candidate) indices are in the QCL relationship (that is, when SS/PBCH blocks (candidates) having N consecutive SS/PBCH block (candidate) indices are transmitted with the same beam), CORESET #0s corresponding to N consecutive SS/PBCH blocks (candidates) may be configured to be continuous without a gap (because no beam switching time is required). Alternatively, only the transmission position of CORESET #0 corresponding to one SS/PBCH block (candidate) representing the N SS/PBCH blocks (candidates) may be configured. As an example, if N=4, four three-symbol CORESET #0s may be defined/transmitted repeatedly and continuously within 12 symbols from symbol #0 of slot #m. As another example, if N=4, only CORESET #0 corresponding to SS/PBCH block (candidate) #k representing SS/PBCH blocks #k/k+1/k+2/k+3 may be defined/transmitted. As a further example, two CORESET #0s corresponding to two SS/PBCH blocks may be defined within 32 symbols as shown in FIG. 17(*a*). In this case, one region for CORESET #0 may correspond to SS/PBCH blocks #k/k+1/k+2/k+3, and the other region for CORESET #0 may correspond to SS/PBCH blocks #k+4/k+5/k+6/k+7.

Figure 20A:
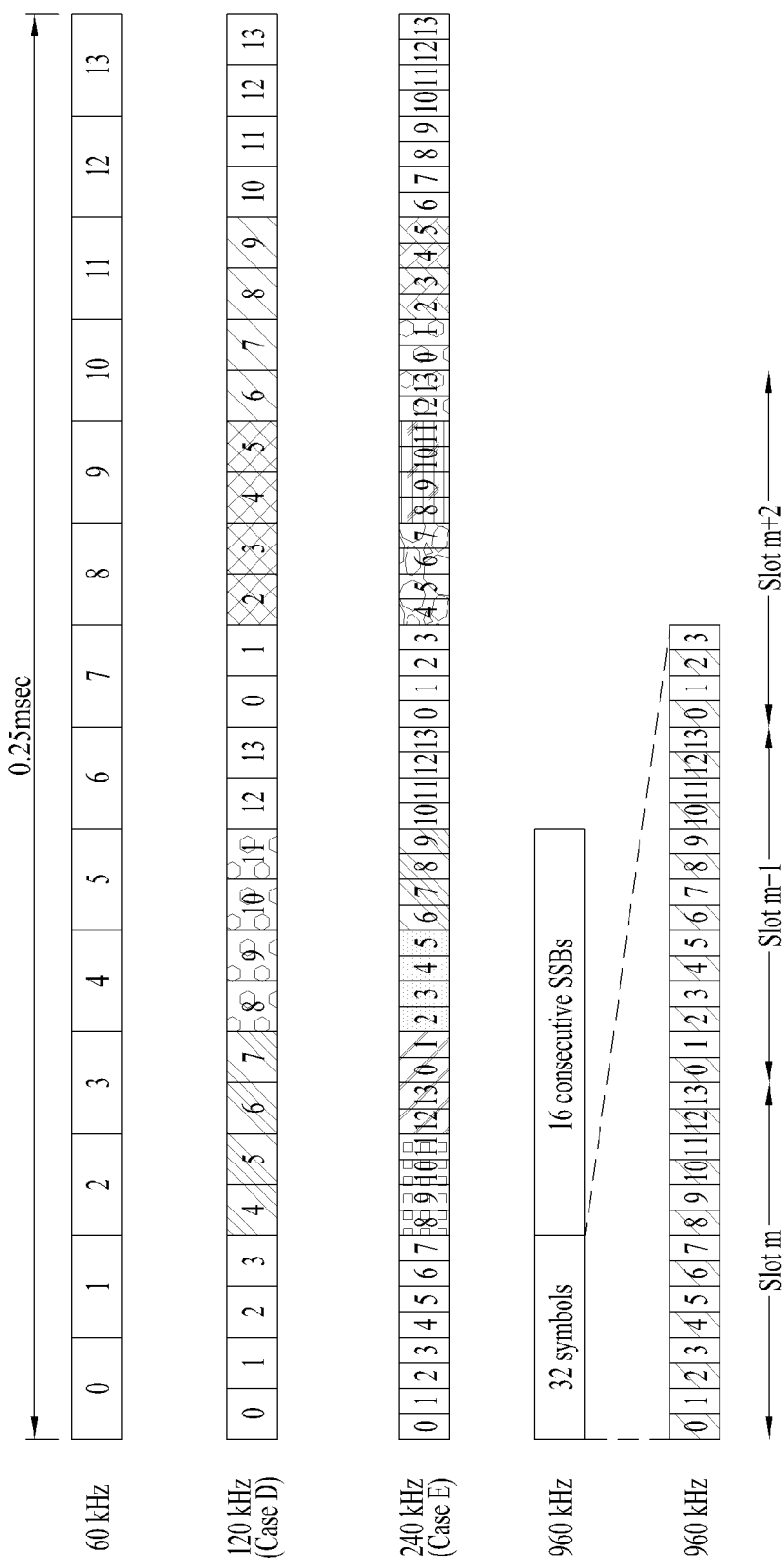
Figure 20B:
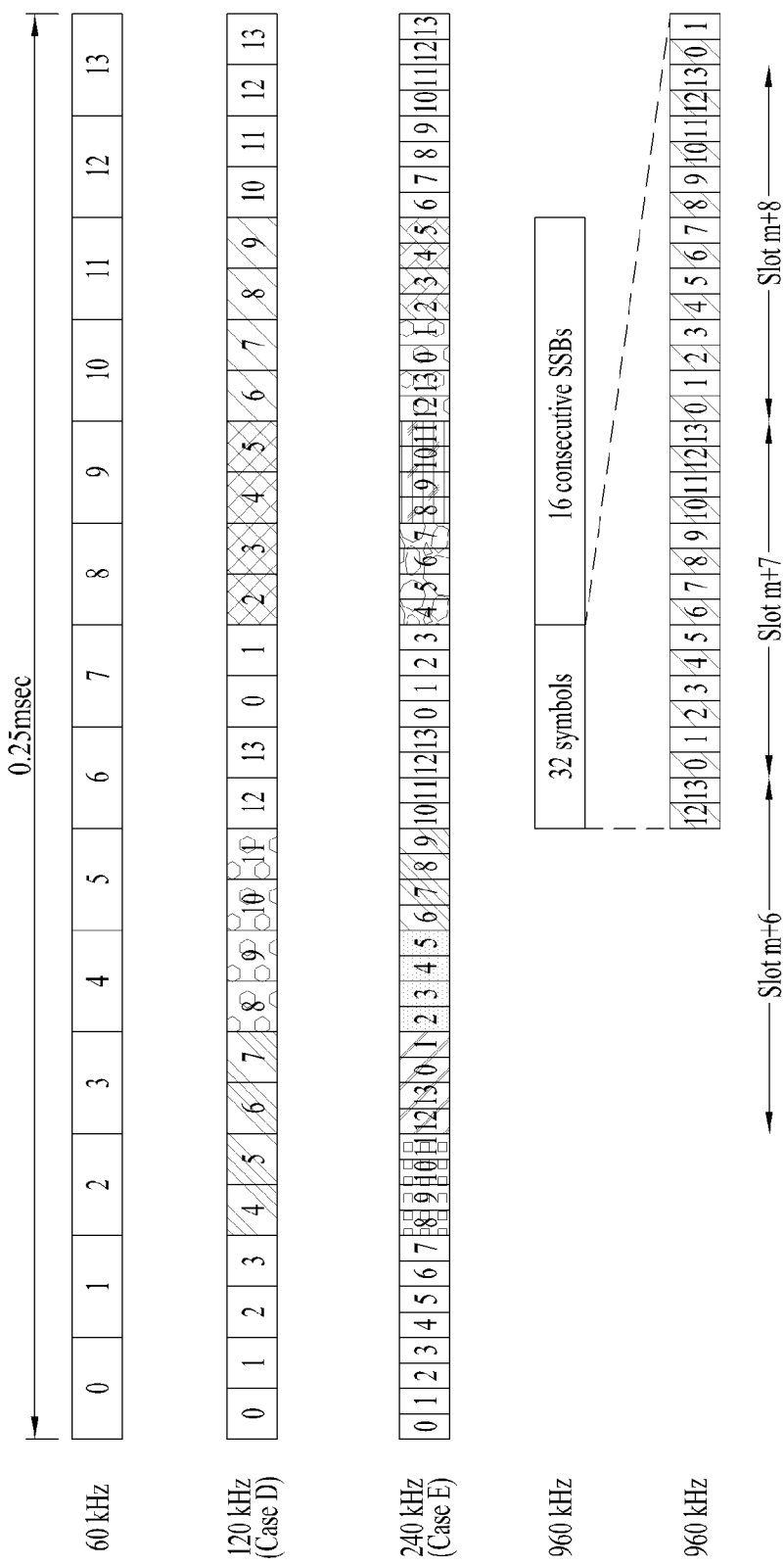

When {SCS of SS/PBCH block, SCS of CORESET #0}={960, 960} kHz, the symbol position of an SS/PBCH block with the 960 kHz SCS may be determined in alignment with the predefined symbol position of an SS/PBCH block with the 120/240 kHz SCS. In this case, the transmission positions of CORESET #0s associated with 16 SS/PBCH blocks (candidates) need to be defined within 32 symbols for the 960 kHz SCS. For example, 32 symbols may be divided into 16 equal parts as shown in FIGS. 20(*a*) and 20(*b*), and the starting symbol of each CORESET #0 may be determined from the first symbol (or the second symbol) in each of the 16 divided parts. The number of symbols of CORESET #0 spanning from the corresponding starting symbol may be predefined as 1. Specifically, CORESET #0 associated with SS/PBCH block (candidate) #k may be transmitted in symbol #0 of slot #m. The reason for this is that the corresponding beam switching time may be longer than the CP length when a beam switching time is required because different SS/PBCH blocks (candidates) are not in the QCL relationship.

SS/PBCH block (candidate) indices may be in the QCL relationship. When N consecutive SS/PBCH block (candidate) indices are in the QCL relationship (that is, when N SS/PBCH blocks (candidates) are transmitted with the same beam), CORESET #0s corresponding to N SS/PBCH blocks (candidates) may be configured to be continuous without a gap (because no beam switching time is required). Alternatively, in some embodiments, only the transmission position of CORESET #0 associated with one SS/PBCH block (candidate) representing the N SS/PBCH blocks (candidates) may be configured. As an example, if N=4, four one-symbol CORESET #0s may be continuously and repeatedly transmitted within four symbols from symbol #0 of slot #m. As another example, if N=4, only X-symbol CORESET #0 corresponding to SS/PBCH block (candidate) #k representing SS/PBCH blocks #k/k+1/k+2/k+3 may be transmitted (where the value of X may be predefined or preconfigured). As a further example, four CORESET #0s corresponding to four SS/PBCH blocks may be defined within 32 symbols as shown in FIG. 18(*a*). In this case, each of CORESET #0 (region) may correspond to SS/PBCH blocks #k/k+1/k+2/k+3, SS/PBCH blocks #k+4/k+5/k+6/k+7, SS/PBCH blocks #k+8/k+9/k+10/k+11, and SS/PBCH block #k+12/k+13/k+14/k+15.

[Method #5] An SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). In the following, the symbol position of CORESET #0 is proposed when an SS/PBCH block with an SCS of {120, 240, 480, 960} kHz and CORESET #0 with an SCS of 960 kHz where an extended CP (ECP) is applied are multiplexed. That is, the UE may receive CORESET #0 associated with a specific SS/PBCH block (candidate) index at the proposed symbol position.

Figure 21A:
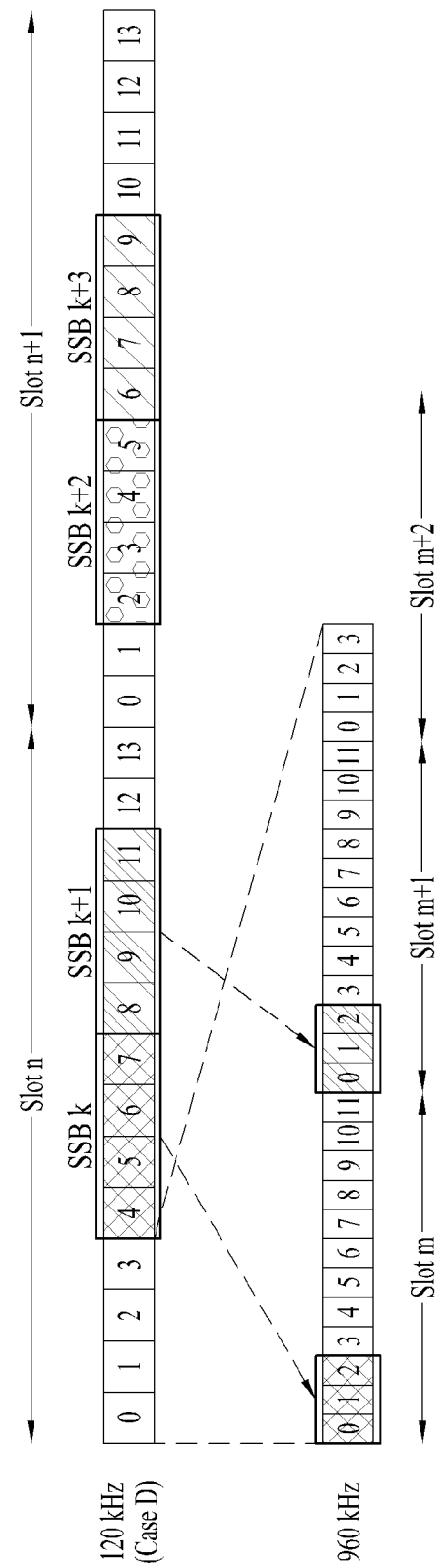
FIGS. 21(*a*) to 24(*b*) are diagrams illustrating an example of configuring CORESET #0 according to [Method #5] proposed herein.
Figure 21B:
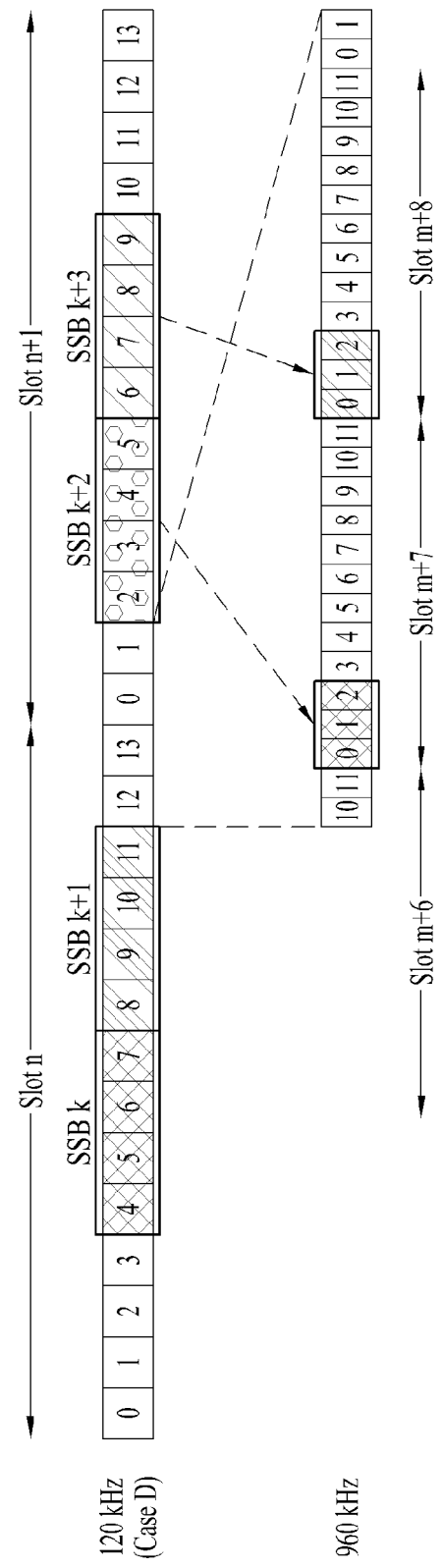

When {SCS of SS/PBCH block, SCS of CORESET #0}={120, 960-ECP} kHz, the transmission positions of CORESET #0s associated with two SS/PBCH block (candidate) indices need to be defined within 27 symbols for the 960 kHz SCS corresponding to symbols #0/1/2/3 of slot #n and 27 symbols for the 960 kHz SCS corresponding to symbols #12/13 of slot #n and symbol #0/1 of slot #(n+1) as shown in FIGS. 21(a) and 21(b). For example, the starting symbol of CORESET #0 associated with each SS/PBCH block (candidate) may be determined from each slot boundary as shown in FIGS. 21(a) and 21(b), and the number of symbols of CORESET #0 spanning from the corresponding starting symbol may be additionally configured/defined. Specifically, CORESET #0 associated with SS/PBCH block (candidate) #k defined in symbols #4/5/6/7 of slot #n may span P symbols from symbol #0 of slot #m with the 960 kHz SCS, (e.g., P=3). As shown in FIGS. 21(a) and 21(b), when P is 3, CORESET #0 associated with SS/PBCH block (candidate) #k may be defined in symbols #0/1/2 of slot #m, and the value of P may be predefined or configured by higher layer signaling (e.g., MIB).

Alternatively, to perform SIB1 transmission compactly, all CORESET #0s associated with two SS/PBCH blocks (candidates) may be configured to be transmitted within one slot with the 960 kHz SCS. Specifically, the starting symbol of CORESET #0 associated with SS/PBCH block (candidate) #(k+1) may be defined/set as a symbol next to symbol #6 of slot #m (e.g., half-slot boundary) or a symbol next to the last symbol of CORESET #0 associated with SS/PBCH block (candidate) #k (or a symbol after T symbols (e.g., T=1) in consideration of the beam switching time).

Figure 22A:
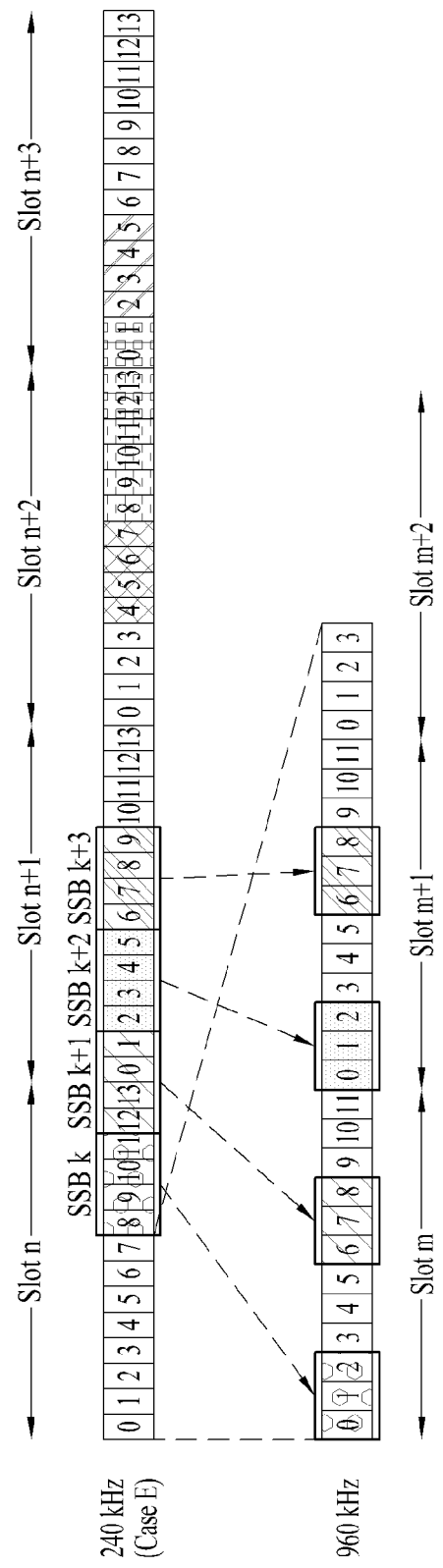
Figure 22B:
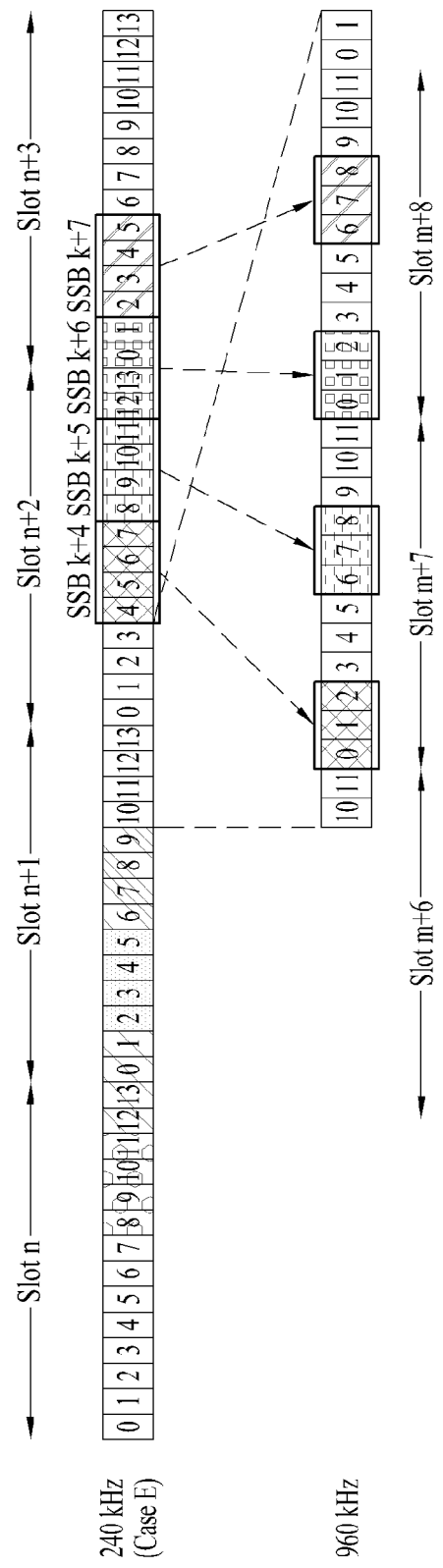

When {SCS of SS/PBCH block, SCS of CORESET #0}={240, 960-ECP} kHz, the transmission positions of CORESET #0s associated with four SS/PBCH blocks (candidates) need to be defined within 27 symbols for the 960 kHz SCS corresponding to symbols #0/1/2/3/4/5/6/7 of slot #n and 27 symbols for the 960 kHz SCS corresponding to symbols #10/11/12/13 of slot #(n+1) and symbols #0/1/2/3 of slot #(n+2). Referring to FIG. 22(a), four CORESET #0s associated with SS/PBCH blocks #k to #(k+3) may be defined within 27 symbols of slot #m (with the 960 kHz SCS) corresponding to symbols #0/1/2/3/4/5/6/7 of slot #n. In addition, referring to FIG. 22(b), four CORESETs #0 associated with SS/PBCH blocks #(k+4) to #(k+7) may be defined within 27 symbols of slot #m corresponding to symbols #10/11/12/13 of slot #(n+1) and symbols #0/1/2/3 of slot #(n+2). In this case, the starting symbol of CORESET #0 associated with each SS/PBCH block may be determined from each slot boundary and each half-slot boundary as shown in FIGS. 22(a) and 22(b), and the number of symbols of CORESET #0 spanning from the corresponding starting symbol may be additionally configured/defined. Specifically, CORESET #0 associated with SS/PBCH block (candidate) #k defined in symbols #8/9/10/11 of slot #n may span P symbols from symbol #0 of slot #m, (e.g., P=3), and the value of P may be predefined or configured by higher layer signaling (e.g., MIB).

Alternatively, CORESET #0s associated with two SS/PBCH blocks (candidates) may be configured to be transmitted continuously as much as possible within one slot with the 960 kHz SCS rather than at the slot boundary or half-slot boundary. Specifically, the starting symbol of CORESET #0 associated with SS/PBCH block (candidate) #(k+1) may be defined/set as a symbol next to the last symbol of CORESET #0 associated with SS/PBCH block (candidate) #k of slot #m (or a symbol after T symbols (e.g., T=1) in consideration of the beam switching time). Alternatively, to perform SIB1 transmission compactly, CORESET #0s associated with four SS/PBCH blocks (candidates) may be configured to be transmitted continuously as much as possible. Specifically, four CORESET #0s may be configured to be transmitted back to back from symbol #0 of slot #m. A gap between the starting symbol indices of adjacent CORESET #0s may be determined as "the number of symbols in CORESET #0+T". In this case, the value of T may be determined in consideration of the beam switching interruption time, which may be predefined (e.g., T=1). The number of symbols of CORESET #0 may be predefined or configured by higher layer signaling (e.g., MIB). For example, when the starting symbol of first CORESET #0 in a slot is symbol #0, P=2, and T=1, four CORESET #0s may be defined/configured in { symbols #0/1}, { symbols #3/4}, { symbols #6/7}, and {symbols #9/10}, respectively.

Figure 23B:
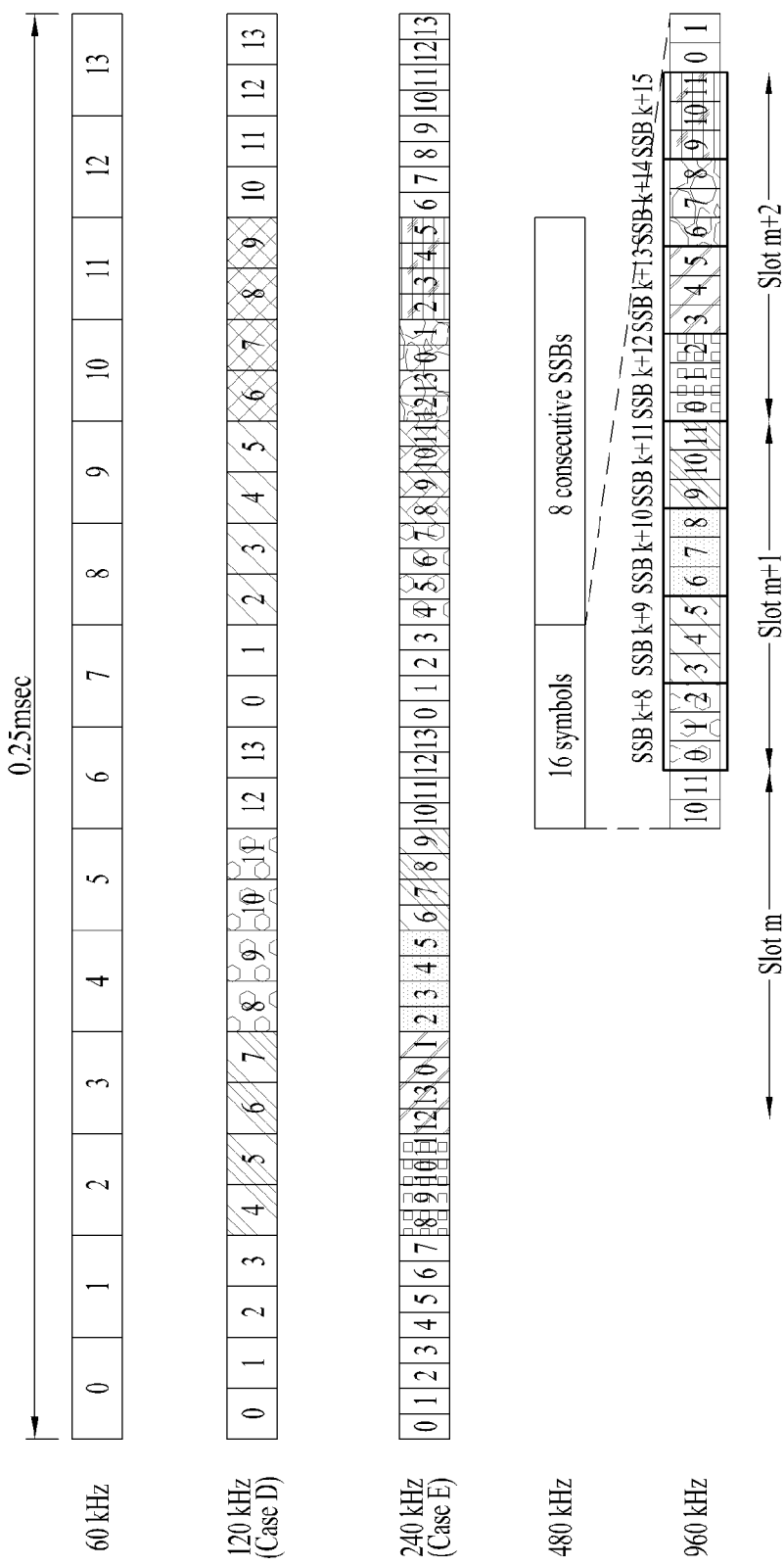

When {SCS of SS/PBCH block, SCS of CORESET #0}={480, 960-ECP} kHz, the symbol position of an SS/PBCH block with the 480 kHz SCS may be determined in alignment with the predefined symbol position of an SS/PBCH block with the 120/240 kHz SCS. In this case, the transmission positions of CORESET #0s associated with 8 SS/PBCH blocks (candidates) need to be defined within 27 symbols for the 960 kHz SCS. For example, the positions of 8 CORESET #0s associated with 8 SS/PBCH blocks (candidates): SS/PBCH blocks (candidates) #k to #(k+7) may be determined to be continuous as shown in FIGS. 23(a) and 23(b), and the number of symbols of CORESET #0 spanning from the corresponding starting symbol may be additionally configured/defined. Specifically, CORESET #0 associated with SS/PBCH block (candidate) #k may span P symbols from symbol #0 of slot #m, (e.g., P=3), and the value of P may be predefined or configured by higher layer signaling (e.g., MIB).

SS/PBCH block (candidate) indices may be in the QCL relationship. When N consecutive SS/PBCH block (candidate) indices are in the QCL relationship (that is, when N SS/PBCH blocks (candidates) are transmitted on the same beam), CORESET #0s corresponding to N SS/PBCH blocks (candidates) may be configured to be continuous without a gap (because no beam switching time is required). Alternatively, in some embodiments, only the position of CORESET #0 associated with one SS/PBCH block (candidate) representing the N SS/PBCH blocks (candidates) may be configured. As an example, if N=4, four three-symbol CORESET #0s may be defined/transmitted repeatedly and continuously within 12 symbols from symbol #0 of slot #m. As another example, if N=4, only CORESET #0 corresponding to SS/PBCH block (candidate) #k representing SS/PBCH blocks #k/k+1/k+2/k+3 may be defined/transmitted. As a further example, two CORESET #0s corresponding to two SS/PBCH blocks may be defined within 32 symbols (from symbol #0 of slot #m to symbol #3 of slot #(m+2)) as shown in FIG. 21(a). In this case, one region for CORESET #0 may correspond to SS/PBCH blocks #k/k+1/k+2/k+3, and the other region for CORESET #0 may correspond to SS/PBCH blocks #k+4/k+5/k+6/k+7.

Figure 24A:
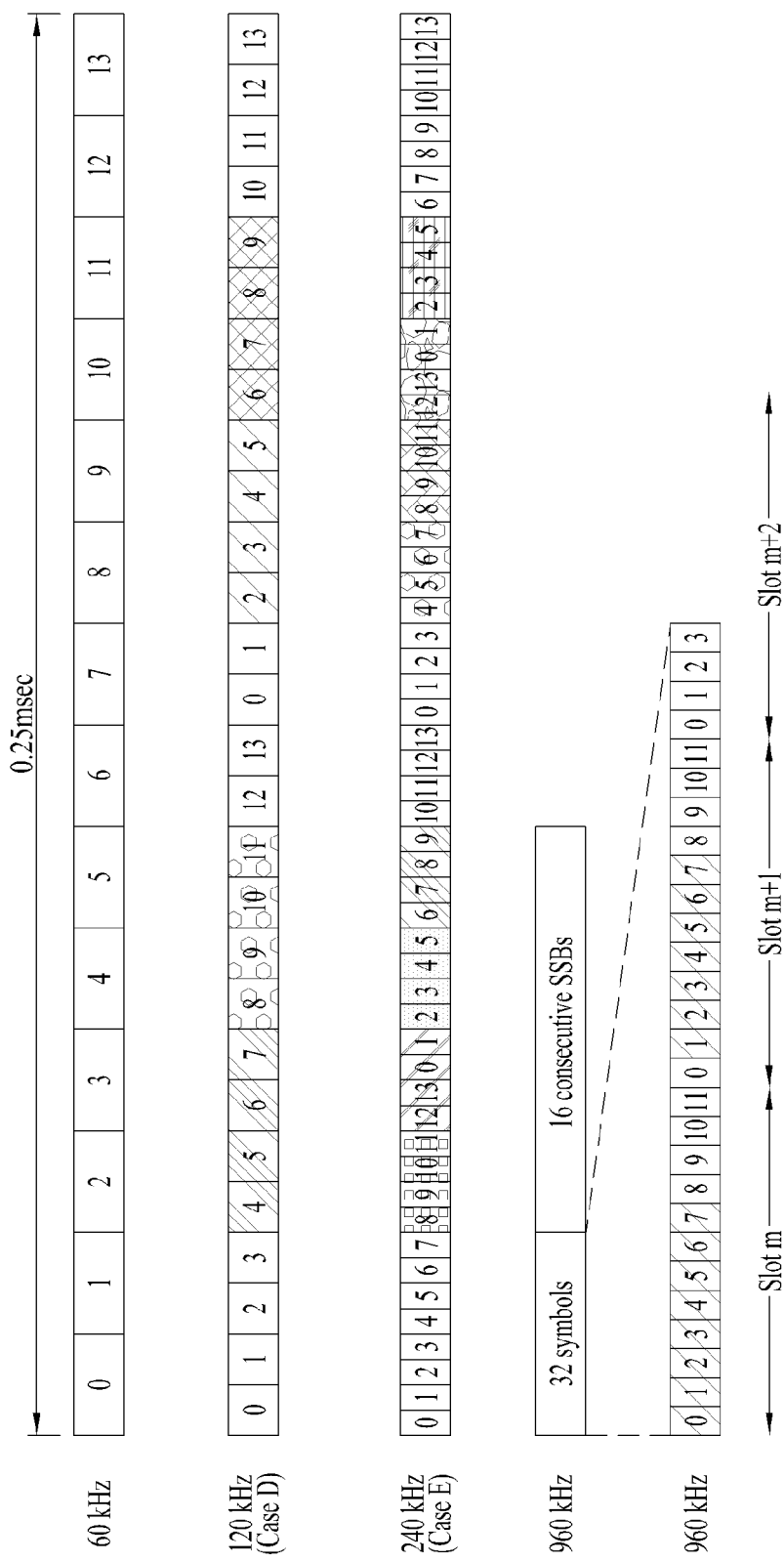
Figure 24B:
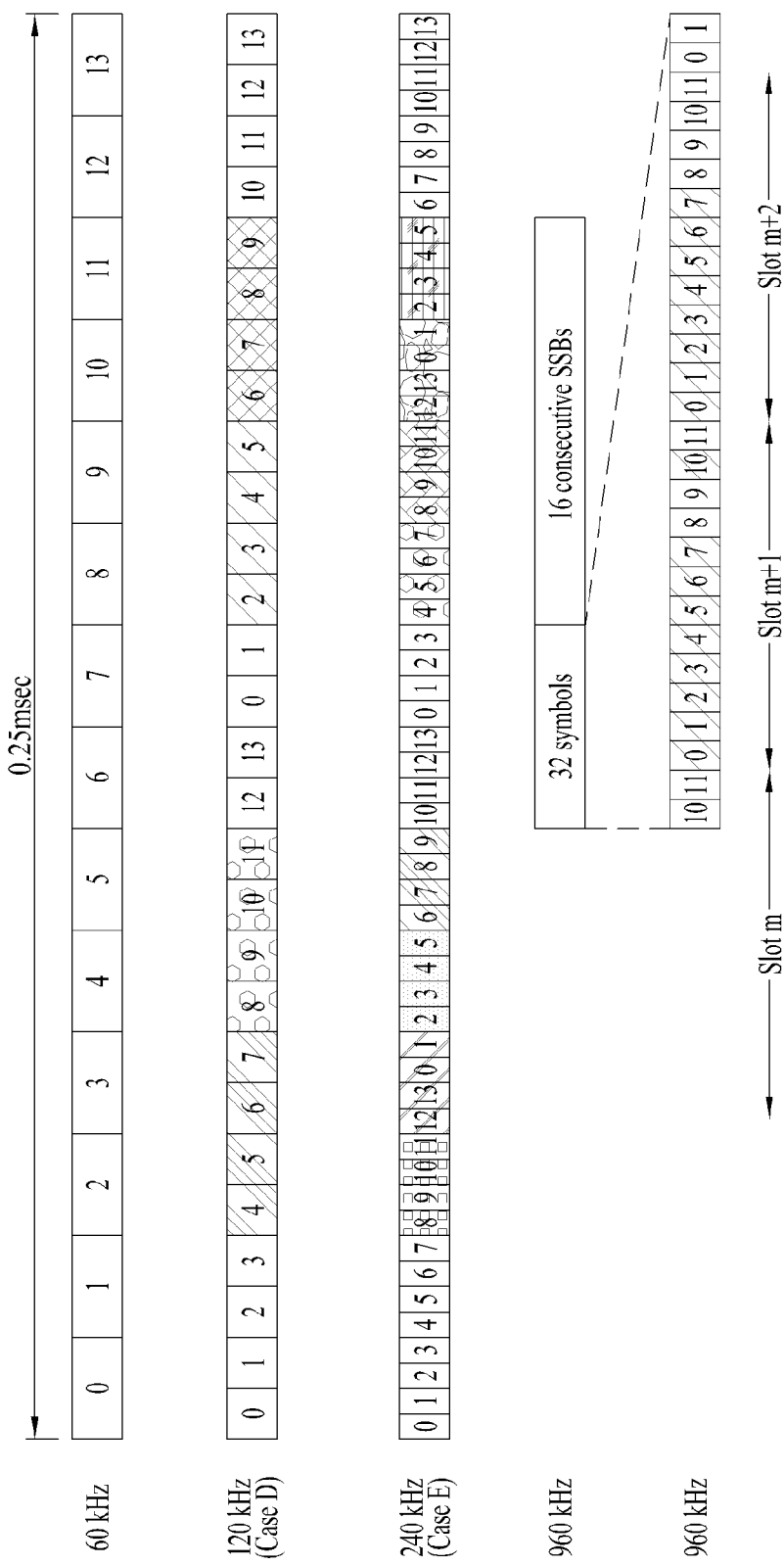

When {SCS of SS/PBCH block, SCS of CORESET #0}={960, 960-ECP} kHz, the symbol position of an SS/PBCH block with the 960 kHz SCS may be determined in alignment with the predefined symbol position of an SS/PBCH block with the 120/240 kHz SCS. In this case, the positions of CORESET #0s associated with 16 SS/PBCH blocks (candidates) need to be defined within 27 symbols for the 960 kHz SCS. For example, referring to FIG. 24(a), 16 CORESET #0s associated with 16 SS/PBCH blocks (candidates) may be defined within 27 symbols from symbol #0 of slot #m to symbol #2 of slot #(m+2) for the 960 kHz SCS. In this case, 16 one-symbol CORESET #0s may be continuously located from symbol #0 of slot #m of FIG. 24(a) (or slot #(m+7) of FIG. 24(b)). For example, 16 one-symbol CORESET #0s may be defined within 16 symbols (from symbol #0 of slot #m to symbol #3 of slot #(m+1) in FIG. 24(a)). As another example, 8 one-symbol CORESET #0s may be continuously located from each slot boundary as shown in FIGS. 24(a) and 24(b), and the number of symbols of CORESET #0 spanning from the corresponding starting symbol may be predefined as 1. Specifically, as shown in FIG. 24(a), 8 one-symbol CORESET #0s may be continuously located from symbol #0 of slot #m for the 960 kHz SCS, and 8 one-symbol CORESET #0s may be continuously located from symbol #0 of slot #(m+1). Specifically, CORESET #0 associated with SS/PBCH block (candidate) #k may be located in symbol #0 of slot #m. The reason for this is that when a beam switching time is required because different SS/PBCH blocks (candidates) are not in the QCL relationship, the corresponding beam switching time may be shorter than the ECP length.

SS/PBCH block (candidate) indices may be in the QCL relationship. When N consecutive SS/PBCH block (candidate) indices are in the QCL relationship (that is, when N SS/PBCH blocks (candidates) are transmitted on the same beam), CORESET #0s corresponding to N SS/PBCH blocks (candidates) may be configured to be continuous without a gap (because no beam switching time is required). Alternatively, in some embodiments, only the position of CORESET #0 associated with one SS/PBCH block (candidate) representing the N SS/PBCH blocks (candidates) may be configured. As an example, if N=4, four one-symbol CORESET #0s may be continuously and repeatedly transmitted within four symbols from symbol #0 of slot #m. As another example, if N=4, the position of only X-symbol CORESET #0 corresponding to SS/PBCH block (candidate) #k representing SS/PBCH blocks #k/k+1/k+2/k+3 may be configured (where the value of X may be predefined or preconfigured). As a further example, regions for four CORESET #0s corresponding to four SS/PBCH blocks may be defined as shown in FIG. 22(a). In this case, each region for CORESET #0 may correspond to SS/PBCH blocks #k/k+1/k+2/k+3, SS/PBCH blocks #k+4/k+5/k+6/k+7, SS/PBCH blocks #k+8/k+9/k+10/k+11, and SS/PBCH block #k+12/k+13/k+14/k+15.

When SS/PBCH blocks are transmitted at the same symbol index position and when the ratio between the SCS of the SS/PBCH block and the SCS of CORESET #0 is the same, it is obvious that CORESET #0 and default PDSCH TDRA proposed in this specification are applicable. For example, in [Method #3], if the SCS of an SS/PBCH block is 480 kHz, each SS/PBCH block may be transmitted at the same symbol index position as in FIG. 15. If the SCS of CORESET #0 is 960 kHz, the ratio between the SCS of the SS/PBCH block and the SCS of CORESET #0 is the same as that in [Method #3], and thus, CORESET #0 and default PDSCH TDRA may be configured at the same slot/symbol position as in FIG. 15.

[Method #6] Proposed are allowed combinations of {SCS of SS/PBCH block, SCS of CORESET #0}. In the Rel-15 NR system, the SCS of CORESET #0 (i.e., SCS assumed for system information, paging, random access procedures, etc.) is provided by one bit (e.g., subCarrierSpacingCommon) of the MIB, and thus, the maximum number of SCSs of CORESET #0 associated with the SCS of a specific SS/PBCH block may be limited to 2.

Assuming that the SCS of an SS/PBCH block is SCS1, and the SCS of CORESET #0 (SCS assumed for system information, paging, random access procedures, etc.) is SCS2, SCS2 indicated by the MIB may have one of the following values.

Option 1: SCS2=SCS1 or SCS2=SCS1/2 ("/" denotes division)

Option 2: SCS2=SCS1 or SCS2=SCS1*2 ("*" denotes multiplication

Option 3: SCS2=SCS1 or SCS2=960 kHz

In each option, one value may be the SCS of CORESET #0 indicated when the one-bit value of the (corresponding) MIB is '1', and the other value may be the SCS of CORESET #0 indicated when the one-bit value of the MIB is '0'. For example, in Option 1, when the one-bit value of the MIB is '0', it may mean that the SCS of CORESET #0 is SCS1. On the other hand, when the one-bit value of the MIB is '1', it may mean that the SCS of CORESET #0 is SCS1/2. The reason why the values of SCS1 and SCS2 differ only by a factor of two in Option 1 or 2 is that if the difference between SCSs becomes too large, multiplexing may be inefficient. The reason why signaling of the 960 kHz SCS is always allowed in Option 3 is that coexistence with the WiGig system at a bandwidth of 2 GHz (approximately 2.16 GHz) may be important.

In particular, when SCS1=240 kHz, the one-bit value of the MIB (e.g., subCarrierSpacingCommon) may be interpreted differently depending on the frequency band in which the MIB is transmitted (e.g., whether the MIB is transmitted in FR2 or FR3). For example, if the MIB is transmitted in FR2, whether the SCS of CORESET #0 is 60 kHz or 120 kHz may be provided by one bit of the MIB. However, if the MIB is transmitted in FR3, whether the SCS of CORESET #0 is 240 kHz may be provided by one bit of the MIB in Option 1 (whether the SCS of CORESET #0 is 240 kHz or 480 kHz may be provided in Option 2, and whether the SCS of CORESET #0 is 240 kHz or 960 kHz may be provided in Option 3).

For example, the definition of subCarrierSpacingCommon of the MIB may be changed as follows.

TABLE 9 subCarrierSpacingCommon

Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz.
If the UE acquires this MIB on an FR2 carrier frequency, the value scs15or60 corresponds to 60 kHz and the value scs30or120 corresponds to 120 kHz.
If the UE acquires this MIB on an FR3 carrier frequency, the value scs15or60 (or the value of a specific one bit (e.g., 0)) corresponds to SCS2 = SCS1 kHz and the value scs30or120 (or the value of the remaining one bit (e.g., 1)) corresponds to SCS2 = SCS1/2 kHz (Option 1).

* Option 1 may be replaced by Option 2 or Option 3.

[Method #7] When an SS/PBCH block with an SCS of 120 kHz is used for initial access and when an SS/PBCH block with an SCS of 480 or 960 kHz is used for ANR other than the initial access, information on the location of the SS/PBCH block with the 120 kHz SCS and/or CORESET #0 (and Type0-PDCCH CSS set) may be carried by a PBCH included in the SS/PBCH block with the 960 kHz SCS (to provide SIB1 information on the same cell).

Since the SS/PBCH block with the 480/960 kHz SCS is not used for the initial access, the SS/PBCH block with the 480/960 kHz SCS may be transmitted at a position other than a synchronization raster as the center frequency. For the SS/PBCH block that is not transmitted in the synchronization raster, the BS needs to provide information on frequency resources of CORESET #0 for the following reasons (motivations).

Since different operators may coexist in unlicensed bands or even the same operator may be in an unplanned deployment environment, the same (physical) cell ID may be used between cells in the same band. To solve the confusion of the UE, the BS may need to transmit information on CORESET #0 and Type0-PDCCH CSS set for higher layer signaling (e.g., SIB1) containing information on an operator ID, a PLMN ID, or a global cell ID (even for the SS/PBCH block that is not transmitted in the synchronization raster). The SS/PBCH block transmission for the above purpose is referred to as ANR.

Therefore, information on a frequency-domain offset (information on the number of REs and/or RBs or a synchronization raster index) between the SS/PBCH block with the 480/960 kHz SCS and the SS/PBCH block with the 120 kHz SCS may be transmitted by a PBCH payload included in the SS/PBCH block with the 480/960 kHz SCS. The corresponding offset information may be based on the 120 kHz SCS (or the SCS of the SS/PBCH block including the corresponding PBCH payload). For example, REs may be based on the SCS of the SS/PBCH block including the PBCH payload, and RBs may be based on the 120 kHz SCS. The UE may receive an SIB1 PDCCH/PDSCH based on the PBCH information included in the SS/PBCH block with the 120 kHz SCS. In this case, the SIB1 PDCCH/PDSCH may mean a PDCCH for scheduling a PDSCH carrying (or conveying) SIB1 and a PDSCH carrying SIB1 (scheduled by a PDCCH).

Alternatively, information on resources of CORESET #0 (and Type0-PDCCH CSS set) for the 120 kHz SCS may be transmitted directly by the PBCH payload included in the SS/PBCH block with the 480/960 kHz SCS. Accordingly, SIB1 PDCCH/PDSCH reception may be allowed without reception of the SS/PBCH block with the 120 kHz SCS. In this case, the information on CORESET #0 based on the 120 kHz SCS may include an RE/RB offset between the SS/PBCH block with the 480/960 kHz SCS and the CORESET (which may be based on the 120 kHz SCS or the SCS of the SS/PBCH block including the PBCH payload, and the reference SCS may vary depending on the REs/RBs) and a time/frequency region occupied by the CORESET (e.g., X RBs and Y symbols). In addition, information about Type0-PDCCH CSS set based on the 120 kHz SCS may include information on an SIB1 PDCCH monitoring occasion, for example, information on the number of occasions per slot and information on symbol positions on the occasion in the slot, etc.

In particular, the information on the location of the SS/PBCH block and/or CORESET #0 (and Type0-PDCCH CSS set), which is provided by the PBCH included in the SS/PBCH block with the 480 and/or 960 kHz SCS, may be information on the SS/PBCH block with the 120 kHz SCS and/or CORESET #0 (and Type0-PDCCH CSS set) (even if there is no separate indicator indicating an SCS in the PBCH payload).

Figure 25:
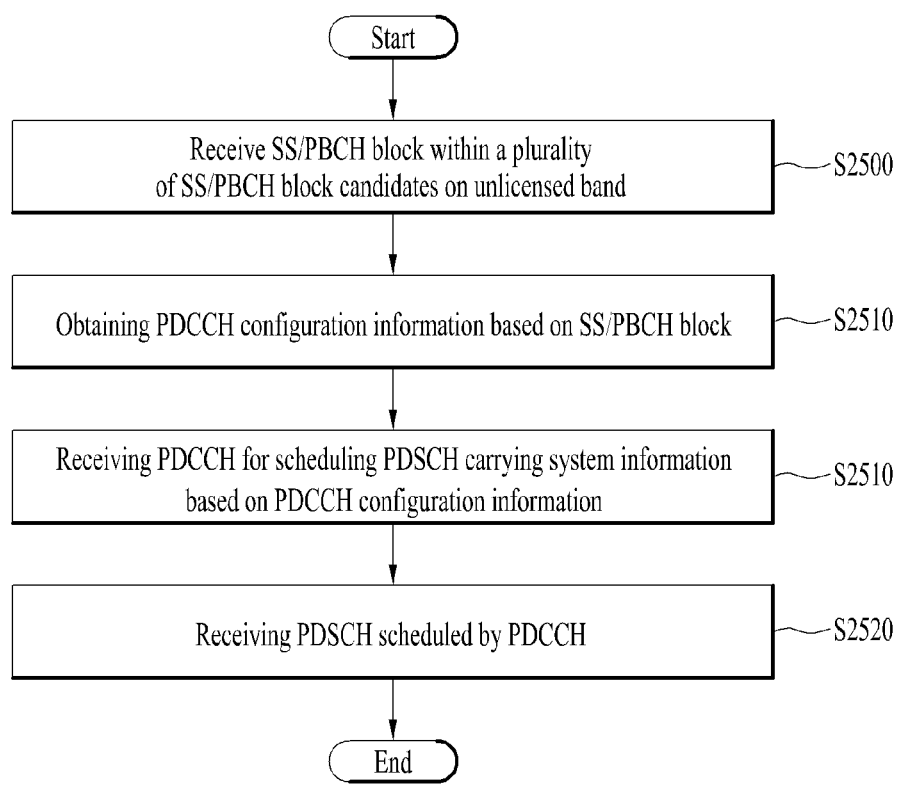
FIGS. 25 to 27 are flowcharts of a UE and a BS according to the proposed methods.

FIG. 25 is a flowchart illustrating operations of a UE according to the proposed method.

Referring to FIG. 25, the UE may receive an SS/PBCH block in a plurality of SS/PBCH block candidates in an unlicensed band (S2500). The UE may obtain PDCCH configuration information based on the received SS/PBCH block (S2510). In this case, the PDCCH configuration information may refer to configuration information on a PDCCH scheduling a PDSCH carrying system information. The PDCCH configuration information may include, for example, information on the SCS of a CORESET in which the PDCCH is transmitted. Specifically, the PDCCH scheduling the PDSCH carrying the system information may be transmitted in CORESET #0 described above. The PDCCH configuration information transmitted in the SS/PBCH block may include information on the SCS of CORESET #0. The PDCCH configuration information may be transmitted in an MIB of a PBCH payload included in the SS/PBCH block (e.g., a pdcch-ConfigSIB1 field included in the MIB).

The UE may receive the PDCCH scheduling the PDSCH carrying the system information based on the PDCCH configuration information (S2520). The PDCCH may be transmitted in the CORESET, and the PDCCH scheduling the PDSCH carrying the system information may be transmitted in CORESET #0 described above. The location of CORESET #0 in the time domain may vary depending on the SCS of the SS/PBCH block and the SCS of CORESET #0. For example, the location of CORESET #0 in the time domain may be determined by applying [Method #1] to [Method #5] described above depending on the SCS of the SS/PBCH block and the SCS of CORESET #0. The UE may receive the PDCCH at the determined location of CORESET #0. For example, CORESET #0 may be configured in a duration of consecutive symbols located in front of the plurality of SS/PBCH block candidates. The starting symbol of CORESET #0 may be determined from among 1) the first symbols of slots included in the symbol duration or 2) the first symbols of regions obtained by dividing the symbol duration by the number of SS/PBCH block candidates. For example, when the SCS of the SS/PBCH block is set to 120 kHz and when the SCS of CORESET #0 is set to 960 kHz, CORESET #0 may be configured as shown in FIGS. 17(*a*) and 17(*b*). Specifically, the SS/PBCH block may be received in one of two SS/PBCH block candidates, and CORESET #0 may be configured in a duration of consecutive 32 symbols having an SCS of 960 kHz and located in front of the two SS/PBCH block candidates (the duration corresponds to a duration of four symbols with an SCS of 120 kHz). In this case, the starting symbol of CORESET #0 may be determined from among the first symbols of slots included in the duration of the 32 symbols with the 960 kHz SCS. Alternatively, when the SCS of the SS/PBCH block is set to 480 kHz and when the SCS of CORESET #0 is set to 960 kHz, CORESET #0 may be configured as shown in FIGS. 19(*a*) and 19(*b*). Specifically, CORESET #0 may be configured in a duration of consecutive 32 symbols having an SCS of 960 kHz and located in front of 8 SS/PBCH block candidates. The starting symbol of CORESET #0 may be determined from among the first symbols of regions obtained by dividing the 32-symbol duration into 8 equal parts. In another embodiment, when both the SCS of the SS/PBCH block and the SCS of CORESET #0 are set to 960 kHz, the SS/PBCH block may be configured in a duration of consecutive 32 symbols having an SCS of 960 kHz and located in front of 16 SS/PBCH block candidates. The starting symbol of CORESET #0 may be determined from among the first symbols of regions obtained by dividing the 32-symbol duration into 16 equal parts.

The UE may receive the PDSCH scheduled by the PDCCH (S2530) and obtain the system information (e.g., SIB1) from the received PDSCH.

Additionally, the SCS of CORESET #0 may be provided by the SS/PBCH block. For example, the SS/PBCH block may indicate one of two values determined based on the SCS of the SS/PBCH block as the SCS of CORESET #0. Specifically, when the SCS of the SS/PBCH block is SCS1 and when the SCS of CORESET #0 is SCS2, SCS2 may be determined as either SCS1 or SCS1/2. In this case, the MIB included in the SS/PBCH block may indicate one of the two values as SCS2. For example, the indicated value may vary depending on the value of one bit of MIB1 (i.e., whether the one-bit value is '0' or '1'). Although SCS2 may be determined as either SCS1 or SCS1/2 as described above, SCS2 may be determined as either SCS1 or 2*SCS1 or as either SCS1 or 960 kHz in some embodiments.

2) Transmitter (Entity B; For Example, BS)

[Method #1A] When {SCS of SS/PBCH block, SCS of CORESET #0}={240, 240} kHz, the time-domain resource configuration and default PDSCH TDRA value of CORESET #0 corresponding to each SS/PBCH block are proposed.

As shown in FIG. 13, CORESET #0 and Type0-PDCCH CSS set may be configured by a PBCH. For slot index n, n may have any value as long as n modulo 4 is '0' n (e.g., n=0, 4, 8, 12, . . . ). CORESET #0 corresponding to SS/PBCH block #k (symbols #8/9/10/11 of slot #n) may be configured in symbols #0/1 of slot #n. In some embodiments, a one-symbol CORESET may be configured instead of a two-symbol CORESET shown in FIG. 13. For example, when the one-symbol CORESET is configured, one-symbol CORESET #0 corresponding to SS/PBCH block #k may be configured in symbol #0 or #1 of slot #n. The same method may be applied to SS/PBCH block #(k+1) to SS/PBCH block #(k+7). The above-described method may be applied when the multiplexing pattern between an SS/PBCH block (SSB) and a CORESET is the TDM pattern and/or the FDM pattern. Thus, according to the proposed method, even when the multiplexing pattern is the TDM pattern, an SS/PBCH block and CORESET #0 corresponding to the SS/PBCH block may be transmitted in the same (continuous) SS/PBCH block burst, which may be advantageous for unlicensed bands where a channel needs to be occupied for a predetermined time after the CAP is completed (or after the CAP is successful).

Preferably, a scheduled PDSCH scheduled may also be scheduled to be included in the same (continuous) SS/PBCH block burst. To support the proposed method, a method of signaling all or some of the following values of $\{K_0, S, L\}$ through the default TDRA table may be introduced. For example, for licensed band operation, the default TDRA table may be used as it is. On the other hand, when an SS/PBCH block and CORESET #0 corresponding to the SS/PBCH block are transmitted in an unlicensed band, $\{K_0, S, L\}$ in a row index corresponding to PDSCH TDRA that does not belong to the same (continuous) SS/PBCH block burst in Table 8 may be replaced with the following values of $\{K_0, S, L\}$.

{0, 8, 2 or 4} (e.g., for SSB #k)
{0, 12, 2 or 4} (e.g., for SSB #(k+1))
{1, 2, 2 or 4} (e.g., for SSB #(k+2))
{1, 6, 2 or 4} (e.g., for SSB #(k+3))
{1, 4, 2 or 4} (e.g., for SSB #(k+4))
{1, 8, 2 or 4} (e.g., for SSB #(k+5))
{0, 10, 2 or 4} (e.g., for SSB #(k+6))
{1, 2, 2 or 4} (e.g., for SSB #(k+7))

[Method #2A] When {SCS of SS/PBCH block, SCS of CORESET #0}={240, 240} kHz, and when the SS/PBCH block and CORESET #0 are FDMed, the time-domain resource configuration and default PDSCH TDRA value of CORESET #0 corresponding to each SS/PBCH block are proposed.

As shown in FIG. 14, CORESET #0 and Type0-PDCCH CSS set may be configured by a PBCH. For slot index n, n may have any value as long as n modulo 4 is '0' n (e.g., n=0, 4, 8, 12, . . . ). CORESET #0 corresponding to SS/PBCH block #k (symbols #8/9/10/11 of slot #n) may be configured in symbols #8/9 of slot #n. In some embodiments, a one-symbol CORESET may be configured instead of a two-symbol CORESET shown in FIG. 14. For example, when the one-symbol CORESET is configured, one-symbol CORESET #0 corresponding to SS/PBCH block #k may be configured in symbol #8 or #9 of slot #n. This may be equally applied to SS/PBCH block #(k+1) to SS/PBCH block #(k+7). The proposed method may be applied when the multiplexing pattern between an SS/PBCH block (SSB) and a CORESET is the FDM pattern. According to the proposed method, if an SS/PBCH block and CORESET #0 corresponding to the SS/PBCH block are simultaneously transmitted based on FDM, the transmission beam directions of the BS may be unified.

When an SS/PBCH block and CORESET #0 corresponding to the SS/PBCH block are transmitted as shown in FIG. 14, it may be advantageous that a PDSCH scheduled by a PDCCH in CORESET #0 is also scheduled to be included in the same beam section. To support the proposed method, a method of signaling all or some of the following values of $\{K_0, S, L\}$ through the default TDRA table (e.g., Table 8) may be introduced. For example, for licensed band operation, the default TDRA table may be used as it is. On the other hand, when an SS/PBCH block and CORESET #0 corresponding to the SS/PBCH block are transmitted in an unlicensed band, $\{K_0, S, L\}$ in a row index corresponding to PDSCH TDRA that does not belong to the same beam section in Table 8 may be replaced with the following values of $\{K_0, S, L\}$.

{0, 12, 2 or 4} (e.g., for SSB #(k+1) or #(k+6))
{1, 0, 2} (e.g., for SSB #(k+1) or #(k+6))

[Method #3A] When {SCS of SS/PBCH block, SCS of CORESET #0}={240, 480} kHz, the time-domain resource configuration and default PDSCH TDRA value of CORESET #0 corresponding to each SS/PBCH block are proposed.

As shown in FIG. 15, CORESET #0 and Type0-PDCCH CSS set may be configured by a PBCH. For slot index n, n may have any value as long as n modulo 4 is '0' n (e.g., n=0, 4, 8, 12, . . . ). For slot index m, m may have any value as long as m modulo 8 is '0' n (e.g., m=0, 8, 16, 24, . . . ). It is assumed that the slot boundaries of slot #n and slot #m/(m+1) are aligned in the time domain. CORESET #0 corresponding to SS/PBCH block #k (symbols #8/9/10/11 of slot #n) may be configured in symbols #0/1/2/3 of slot #m. CORESET #0 corresponding to SS/PBCH block #(k+4) (symbols #4/5/6/7 of slot #(n+2)) may be configured in symbols #6/7/8/9 of slot #(m+3). The same method may be applied to SS/PBCH block #(k+1) to SS/PBCH block #(k+7).

The beam switching delay of a transmitting BS and/or a receiving UE may be a time corresponding to a normal CP for an SCS of 480 kHz (which may be about 100 ns). Therefore, when a signal is transmitted and received after beam switching, there may be a difference in transmission/reception performance between adjacent symbols. In consideration of this, a three-symbol CORESET (i.e., a CORESET composed of three OFDM symbols) may be configured rather than a four-symbol CORESET (i.e., a CORESET composed of four OFDM symbols), and a one-symbol gap may be configured between CORESET #0s corresponding to different SS/PBCH block indices. As an example, when three-symbol CORESET #0 corresponding to SS/PBCH block #k is configured in symbols #0/1/2 of slot #n, and when three-symbol CORESET #0 corresponding to SS/PBCH block #(k+1) is configured in symbols #4/5/6 of slot #n, a one-symbol gap (e.g., symbol #3 of slot #n) may be configured between the two CORESETs. As another example, when two-symbol CORESET #0 corresponding to SS/PBCH block #k is configured in symbols #1/2 of slot #n, and when two-symbol CORESET #0 corresponding to SS/PBCH block #(k+1) is configured in symbols #5/6 of slot #n, a two-symbol gap (e.g., symbols #3/4 of slot #n) may be configured between the two CORESETs. In particular, since symbol #6 of slot #(m+3) among symbols included in CORESET #0 corresponding to SS/PBCH block #(k+4) is a symbol next to the last symbol of SS/PBCH block #(k+3) (i.e., symbol #9 of slot #(n+1)), symbol #6 of slot #(m+3) may be defined to be always empty in consideration of beam switching. Alternatively, in some embodiments, it may be configured whether symbol #6 of slot #(m+3) is used for a CORESET. In general, all or some of the four symbols occupied by each CORESET #0 in FIG. 15 may be set as CORESET resources, and the same method may be applied to SSBs #(k+1) to #(k+7).

The proposed method may be applied when the multiplexing pattern between an SS/PBCH block (SSB) and a CORESET is the TDM and/or FUM pattern. In particular, in the case of the TDM pattern, an SS/PBCH block and CORESET #0 corresponding to the SS/PBCH block may be transmitted in the same (continuous) burst, which may be advantageous for unlicensed bands where a channel needs to be occupied for a predetermined time after the CAP is successful.

When an SS/PBCH block and CORESET #0 corresponding to the SS/PBCH block are transmitted as shown in FIG. 15, it may be advantageous that a PDSCH scheduled by a PDCCH in the CORESET is also scheduled to be included in the same (continuous) burst (particularly, considering the characteristics of unlicensed bands that a channel needs to be occupied for a specific time after the CAP is successful). To support the proposed method, a method of signaling all or some of the following values of $\{K_0, S, L\}$ through the default TDRA table of Table 8 may be introduced. For example, for licensed band operation, the default TDRA table may be used as it is. On the other hand, when an SS/PBCH block and CORESET #0 corresponding to the SS/PBCH block are transmitted in an unlicensed band, $\{K_0, S, L\}$ in a row index corresponding to PDSCH TDRA that does not belong to the same (continuous) burst in Table 8 may be replaced with the following values of $\{K_0, S, L\}$.

{1, 2, integer less than or equal to 2 or 4 or 7 or 8} (e.g., for SSB #k)
{1, 10, integer less than or equal to 2 or 4 or 7 or 8} (e.g., for SSB #(k+1))
{2, 4, integer less than or equal to 2 or 4 or 7 or 8} (e.g., for SSB #(k+2))
{2, 12, integer less than or equal to 2 or 4 or 7 or 8} (e.g., for SSB #(k+3))
{1, 8, integer less than or equal to 2 or 4 or 7 or 8} (e.g., for SSB #(k+4))
{2, 2, integer less than or equal to 2 or 4 or 7 or 8} (e.g., for SSB #(k+5))
{1, 10, integer less than or equal to 2 or 4 or 7 or 8} (e.g., for SSB #(k+6))
{2, 4, integer less than or equal to 2 or 4 or 7 or 8} (e.g., for SSB #(k+7))

Hereinafter, a description will be given of a method of configuring time resources of CORESET #0 when an SCS of 480 kHz SCS and an ECP are introduced. CORESET #0 and Type0-PDCCH CSS set may be configured by a PBCH as shown in FIG. 16. In this case, it is assumed that one slot with the ECP includes 12 symbols. For slot index n, n may have any value as long as n modulo 4 is '0' n (e.g., n=0, 4, 8, 12, . . . ). For slot index m, m may have any value as long as m modulo 8 is '0' n (e.g., m=0, 8, 16, 24, . . . ). It is assumed that the slot boundaries of slot #n and slot #m/(m+1) are aligned in the time domain. CORESET #0 corresponding to SS/PBCH block #k (symbols #8/9/10/11 of slot #n) may be configured in symbols #0/1/2 of slot #m. CORESET #0 corresponding to SS/PBCH block #(k+4) (symbols #4/5/6/7 of slot #(n+2)) may be configured in symbols #6/7/8 of slot #(m+3). This may be applied to SS/PBCH block #(k+1) to SS/PBCH block #(k+7). In the case of the ECP, since the ECP is relatively larger than the beam switching delay of the transmitting BS and/or the receiving UE (about 100 ns) for the 480 kHz SCS, unlike a normal CP, the time resources of CORESET #0s associated with different SS/PBCH block indices may be set to consecutive symbols, instead of configuring a symbol gap between CORESET #0s.

[Method #4A] An SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). In the following, the symbol position of CORESET #0 is proposed when an SS/PBCH block with an SCS of {120, 240, 480, 960} kHz and CORESET #0 with an SCS of 960 kHz are capable of being multiplexed. That is, the BS may transmit CORESET #0 associated with a specific SS/PBCH block (candidate) index at the proposed symbol position.

When {SCS of SS/PBCH block, SCS of CORESET #0}={120, 960} kHz, the positions of CORESET #0s associated with two SS/PBCH block (candidate) indices (or CORESET #0s associated with two SS/PBCH blocks (candidates)) need to be defined within 1) 32 symbols for the 960 kHz SCS corresponding to symbols #0/1/2/3 of slot #n and 2) 32 symbols for the 960 kHz SCS corresponding to symbols #12/13 of slot #n and symbols #0/1 of slot #(n+1). For example, the starting symbol of CORESET #0 associated with each SS/PBCH block (candidate) may be determined from each slot boundary as shown in FIGS. 17(a) and 17(b), and the number of symbols of CORESET #0 spanning from the corresponding starting symbol may be additionally configured/defined. Specifically, CORESET #0 associated with SS/PBCH block (candidate) #k transmitted in symbols #4/5/6/7 of slot #n may span P symbols from symbol #0 of slot #m, (e.g., P=3), and the value of P may be predefined or configured by higher layer signaling (e.g., MIB). Alternatively, to perform SIB1 transmission compactly, CORESET #0s associated with two SS/PBCH block (candidate) indices may be configured to be transmitted within one slot with the 960 kHz SCS. Specifically, the starting symbol of CORESET #0 associated with SS/PBCH block (candidate) #(k+1) may be defined/set as a symbol next to symbol #7 of slot #m or a symbol next to the last symbol of CORESET #0 associated with SS/PBCH block (candidate) #k (or a symbol after T symbols (e.g., T=1) from the last symbol of CORESET #0 associated with SS/PBCH block (candidate) #k in consideration of the beam switching time).

When {SCS of SS/PBCH block, SCS of CORESET #0}={120, 480} kHz, the positions of CORESET #0s associated with two SS/PBCH block (candidate) indices need to be defined within 1) 16 symbols for the 480 kHz SCS corresponding to symbols #0/1/2/3 of slot #n and 2) 16 symbols for the 480 kHz SCS corresponding to symbols #12/13 of slot #n and symbols #0/1 of slot #(n+1). For example, the starting symbol of CORESET #0 associated with each SS/PBCH block (candidate) may be determined from each half-slot boundary as shown in FIGS. 17(c) and 17(d), and the number of symbols of CORESET #0 spanning from the corresponding starting symbol may be additionally configured/defined. Specifically, CORESET #0 associated with SS/PBCH block (candidate) #k transmitted in symbols #4/5/6/7 of slot #n may span P symbols from symbol #0 of slot #m, (e.g., P=3), and the value of P may be predefined or configured by higher layer signaling (e.g., MIB). The starting symbol of CORESET #0 associated with SS/PBCH block (candidate) #(k+1) may be defined/set as a symbol next to symbol #7 of slot #m or a symbol next to the last symbol of CORESET #0 associated with SS/PBCH block (candidate) #k (or a symbol after T symbols (e.g., T=1) from the last symbol of CORESET #0 associated with SS/PBCH block (candidate) #k in consideration of the beam switching time).

When {SCS of SS/PBCH block, SCS of CORESET #0}={240, 960} kHz, the transmission positions of CORESET #0s associated with four SS/PBCH block (candidate) indices need to be defined within 32 symbols for the 960 kHz SCS corresponding to #0/1/2/3/4/5/6/7 of slot #n and 32 symbols for the 960 kHz SCS corresponding to symbols #10/11/12/13 of slot #n and symbols #0/1/2/3 of slot #(n+1). For example, the starting symbol of CORESET #0 associated with each SS/PBCH block (candidate) may be determined from each slot boundary and each half-slot boundary as shown in FIGS. 18(a) and 18(b), and the number of symbols of CORESET #0 spanning from the corresponding starting symbol may be additionally configured/defined. Specifically, CORESET #0 associated with SS/PBCH block (candidate) #k defined in symbols #8/9/10/11 of slot #n may span P symbols from symbol #0 of slot #m, (e.g., P=3), and the value of P may be predefined or configured by higher layer signaling (e.g., MIB). Alternatively, in some embodiments, CORESET #0s associated with two SS/PBCH block (candidate) indices may be configured to be transmitted continuously as much as possible within one slot with the 960 kHz SCS rather than at the slot boundary or half-slot boundary. Specifically, the starting symbol of CORESET #0 associated with SS/PBCH block (candidate) index #(k+1) may be defined/set as a symbol (e.g., symbol #3 or #4 of slot #m) next to the last symbol (e.g., symbol #2 of slot #m) of CORESET #0 associated with SS/PBCH block (candidate) index #k (or a symbol (e.g., symbol #3 of slot #m) after T symbols (e.g., T=1) from the last symbol of CORESET #0 associated with SS/PBCH block (candidate) #k in consideration of the beam switching time). Alternatively, to perform SIB1 transmission compactly, CORESET #0s associated with four SS/PBCH block (candidate) indices may be configured to be transmitted continuously as much as possible. Specifically, four CORESET #0s may be configured to be transmitted back to back from symbol #0 of slot #m. A gap between the starting symbol indices of adjacent CORESET #0s (or a gap between the starting symbols of adjacent CORESET #0s) may be determined as "the number of symbols in CORESET #0+T". In this case, the value of T may be determined in consideration of the beam switching interruption time, which may be predefined (e.g., T=1). The number of symbols of CORESET #0 may be predefined or configured by higher layer signaling (e.g., MIB). For example, when the starting symbol of first CORESET #0 in a slot is symbol #0, P=2, and T=1, four CORESET #0s may be defined/configured in {symbols #0/1}, {symbols #3/4}, {symbols #6/7}, and {symbols #9/10}, respectively.

Figure 19A:
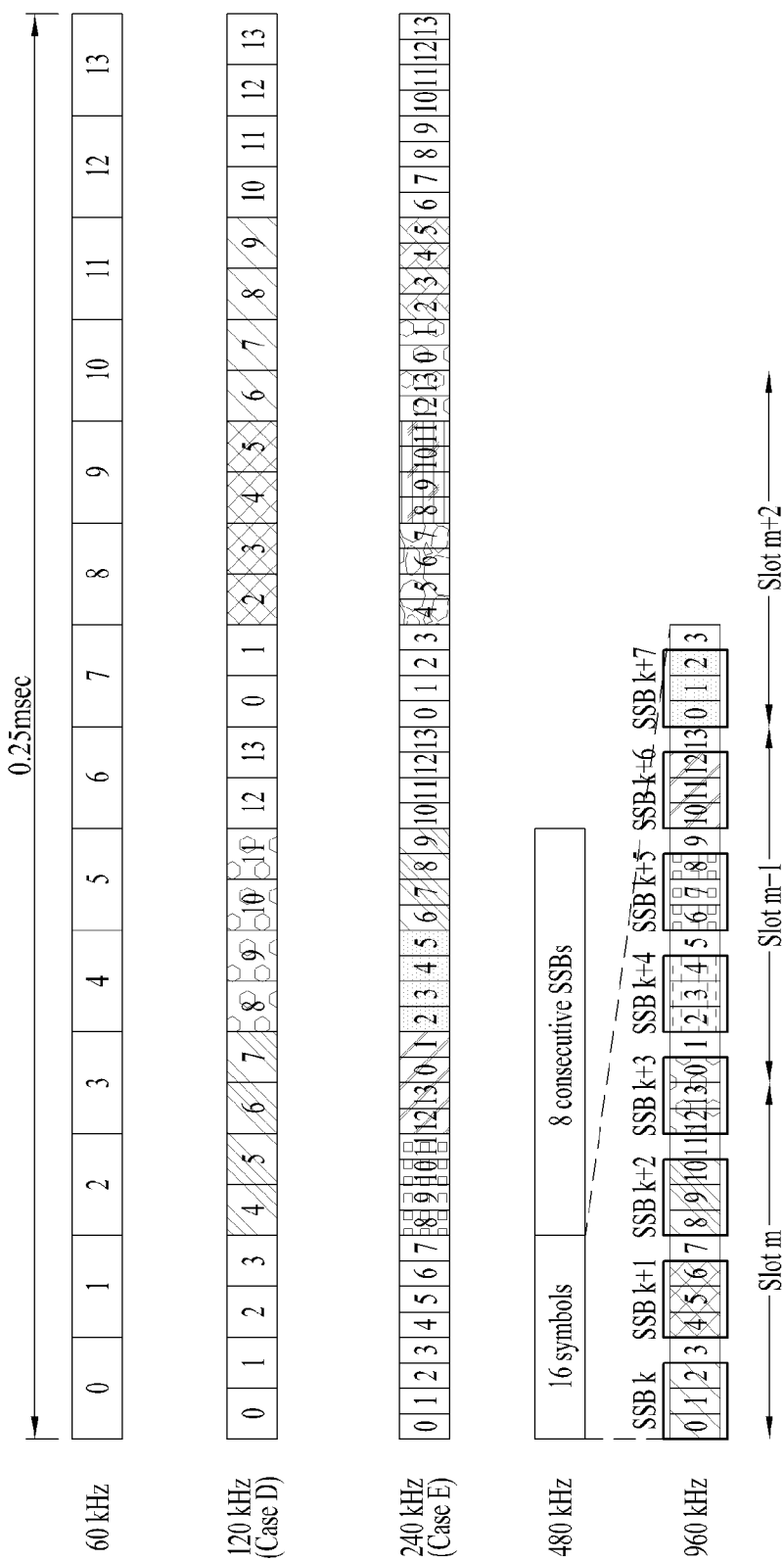
Figure 19B:
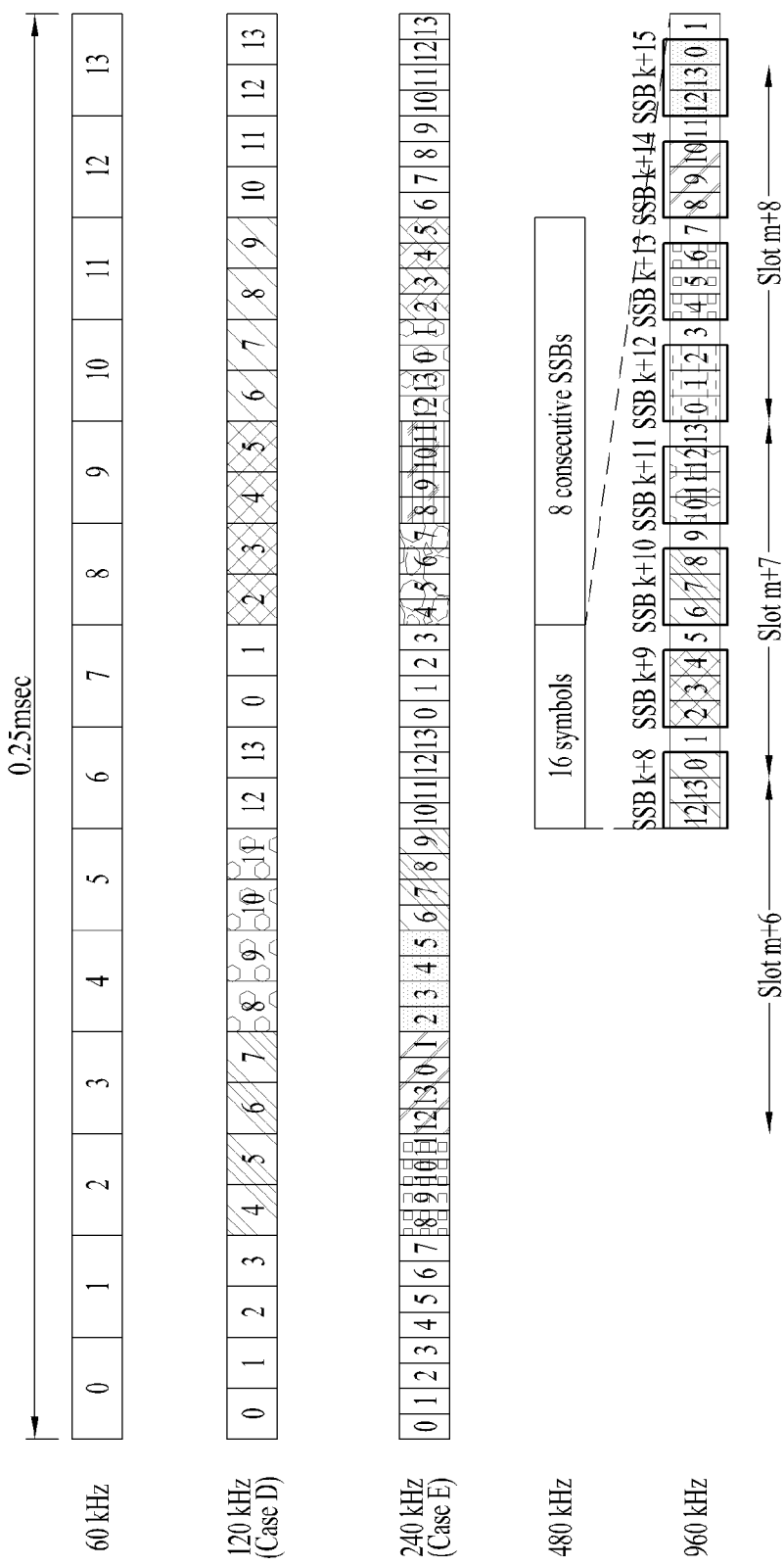

When {SCS of SS/PBCH block, SCS of CORESET #0}={480, 960} kHz, the symbol position of an SS/PBCH block with the 480 kHz SCS may be determined in alignment with the predefined symbol position of an SS/PBCH block with an SCS of 120/240 kHz. In this case, the transmission positions of CORESET #0s associated with 8 SS/PBCH block (candidate) indices need to be defined within 32 symbols for the 960 kHz SCS. For example, as shown in FIGS. 19(a) and 19(b), 32 symbols may be divided into 8 equal parts, and the starting symbol of each CORESET #0 may be determined from the first symbol (or the second symbol) in each of the 8 divided parts. The number of symbols of CORESET #0 spanning from the corresponding starting symbol may be additionally configured/defined. Specifically, CORESET #0 associated with SS/PBCH block (candidate) index #k may span P symbols from symbol #0 of slot #m (e.g., P=3), and the value of P may be predefined or configured by higher layer signaling (e.g., MIB).

SS/PBCH block (candidate) indices may be in the QCL relationship. When N consecutive SS/PBCH block (candidate) indices are in the QCL relationship (that is, when SS/PBCH blocks (candidates) having N consecutive SS/PBCH block (candidate) indices are transmitted on the same beam), CORESET #0s corresponding to N consecutive SS/PBCH blocks (candidates) may be configured to be continuous without a gap (because no beam switching time is required). Alternatively, only the transmission position of CORESET #0 corresponding to one SS/PBCH block (candidate) representing the N SS/PBCH blocks (candidates) may be configured. As an example, if N=4, four three-symbol CORESET #0s may be defined/transmitted repeatedly and continuously within 12 symbols from symbol #0 of slot #m. As another example, if N=4, only CORESET #0 corresponding to SS/PBCH block (candidate) #k representing SS/PBCH blocks #k/k+1/k+2/k+3 may be defined/transmitted. As a further example, two CORESET #0s corresponding to two SS/PBCH blocks may be defined within 32 symbols as shown in FIG. 17(a). In this case, one region for CORESET #0 may correspond to SS/PBCH blocks #k/k+1/k+2/k+3, and the other region for CORESET #0 may correspond to SS/PBCH blocks #k+4/k+5/k+6/k+7.

When {SCS of SS/PBCH block, SCS of CORESET #0}={960, 960} kHz, the symbol position of an SS/PBCH block with the 960 kHz SCS may be determined in alignment with the predefined symbol position of an SS/PBCH block with the 120/240 kHz SCS. In this case, the transmission positions of CORESET #0s associated with 16 SS/PBCH blocks (candidates) need to be defined within 32 symbols for the 960 kHz SCS. For example, 32 symbols may be divided into 16 equal parts as shown in FIGS. 20(*a*) and 20(*b*), and the starting symbol of each CORESET #0 may be determined from the first symbol (or the second symbol) in each of the 16 divided parts. The number of symbols of CORESET #0 spanning from the corresponding starting symbol may be predefined as 1. Specifically, CORESET #0 associated with SS/PBCH block (candidate) #k may be transmitted in symbol #0 of slot #m. The reason for this is that when a beam switching time is required because different SS/PBCH blocks (candidates) are not in the QCL relationship, the corresponding beam switching time may be longer than the CP length.

SS/PBCH block (candidate) indices may be in the QCL relationship. When N consecutive SS/PBCH block (candidate) indices are in the QCL relationship (that is, when N SS/PBCH blocks (candidates) are transmitted on the same beam), CORESET #0s corresponding to N SS/PBCH blocks (candidates) may be configured to be continuous without a gap (because no beam switching time is required). Alternatively, in some embodiments, only the transmission position of CORESET #0 associated with one SS/PBCH block (candidate) representing the N SS/PBCH blocks (candidates) may be configured. As an example, if N=4, four one-symbol CORESET #0s may be continuously and repeatedly transmitted within four symbols from symbol #0 of slot #m. As another example, if N=4, only X-symbol CORESET #0 corresponding to SS/PBCH block (candidate) #k representing SS/PBCH blocks #k/k+1/k+2/k+3 may be transmitted (where the value of X may be predefined or preconfigured). As a further example, four CORESET #0s corresponding to four SS/PBCH blocks may be defined within 32 symbols as shown in FIG. 18(*a*). In this case, each region for CORESET #0 may correspond to SS/PBCH blocks #k/k+1/k+2/k+3, SS/PBCH blocks #k+4/k+5/k+6/k+7, SS/PBCH blocks #k+8/k+9/k+10/k+11, and SS/PBCH block #k+12/k+13/k+14/k+15.

[Method #5A] An SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). In the following, the symbol position of CORESET #0 is proposed when an SS/PBCH block with an SCS of {120, 240, 480, 960} kHz and CORESET #0 with an SCS of 960 kHz where an ECP is applied are multiplexed. That is, the BS may transmit CORESET #0 associated with a specific SS/PBCH block (candidate) index at the proposed symbol position.

When {SCS of SS/PBCH block, SCS of CORESET #0}={120, 960-ECP} kHz, the transmission positions of CORESET #0s associated with two SS/PBCH block (candidate) indices need to be defined within 27 symbols for the 960 kHz SCS corresponding to symbols #0/1/2/3 of slot #n and 27 symbols for the 960 kHz SCS corresponding to symbols #12/13 of slot #n and symbol #0/1 of slot #(n+1) as shown in FIGS. 21(*a*) and 21(*b*). For example, the starting symbol of CORESET #0 associated with each SS/PBCH block (candidate) may be determined from each slot boundary as shown in FIGS. 21(*a*) and 21(*b*), and the number of symbols of CORESET #0 spanning from the corresponding starting symbol may be additionally configured/defined. Specifically, CORESET #0 associated with SS/PBCH block (candidate) #k defined in symbols #4/5/6/7 of slot #n may span P symbols from symbol #0 of slot #m with the 960 kHz SCS, (e.g., P=3). As shown in FIGS. 21(*a*) and 21(*b*), when P is 3, CORESET #0 associated with SS/PBCH block (candidate) #k may be defined in symbols #0/1/2 of slot #m, and the value of P may be predefined or configured by higher layer signaling (e.g., MIB).

Alternatively, to perform SIB1 transmission compactly, all CORESET #0s associated with two SS/PBCH blocks (candidates) may be configured to be transmitted within one slot with the 960 kHz SCS. Specifically, the starting symbol of CORESET #0 associated with SS/PBCH block (candidate) #(k+1) may be defined/set as a symbol next to symbol #6 of slot #m or a symbol next to the last symbol of CORESET #0 associated with SS/PBCH block (candidate) #k (or a symbol after T symbols (e.g., T=1) in consideration of the beam switching time).

When {SCS of SS/PBCH block, SCS of CORESET #0}={240, 960-ECP} kHz, the transmission positions of CORESET #0s associated with four SS/PBCH blocks (candidates) need to be defined within 27 symbols for the 960 kHz SCS corresponding to symbols #0/1/2/3/4/5/6/7 of slot #n and 27 symbols for the 960 kHz SCS corresponding to symbols #10/11/12/13 of slot #(n+1) and symbols #0/1/2/3 of slot #(n+2). Referring to FIG. 22(*a*), four CORESET #0s associated with SS/PBCH blocks #k to #(k+3) may be defined within 27 symbols of slot #m (with the 960 kHz SCS) corresponding to symbols #0/1/2/3/4/5/6/7 of slot #n. In addition, referring to FIG. 22(*b*), four CORESETs #0 associated with SS/PBCH blocks #(k+4) to #(k+7) may be defined within 27 symbols of slot #m corresponding to symbols #10/11/12/13 of slot #(n+1) and symbols #0/1/2/3 of slot #(n+2). In this case, the starting symbol of CORESET #0 associated with each SS/PBCH block may be determined from each slot boundary and each half-slot boundary as shown in FIGS. 22(*a*) and 22(*b*), and the number of symbols of CORESET #0 spanning from the corresponding starting symbol may be additionally configured/defined. Specifically, CORESET #0 associated with SS/PBCH block (candidate) #k defined in symbols #8/9/10/11 of slot #n may span P symbols from symbol #0 of slot #m, (e.g., P=3), and the value of P may be predefined or configured by higher layer signaling (e.g., MIB).

Alternatively, CORESET #0s associated with two SS/PBCH blocks (candidates) may be configured to be transmitted continuously as much as possible within one slot with the 960 kHz SCS rather than at the slot boundary or half-slot boundary. Specifically, the starting symbol of CORESET #0 associated with SS/PBCH block (candidate) #(k+1) may be defined/set as a symbol next to the last symbol of CORESET #0 associated with SS/PBCH block (candidate) #k of slot #m (or a symbol after T symbols (e.g., T=1) in consideration of the beam switching time). Alternatively, to perform SIB1 transmission compactly, CORESET #0s associated with four SS/PBCH blocks (candidates) may be configured to be transmitted continuously as much as possible. Specifically, four CORESET #0s may be configured to be transmitted back to back from symbol #0 of slot #m. A gap between the starting symbol indices of adjacent CORESET #0s may be determined as "the number of symbols in CORESET #0+T". In this case, the value of T may be determined in consideration of the beam switching interruption time, which may be predefined (e.g., T=1). The number of symbols of CORESET #0 may be predefined or configured by higher layer signaling (e.g., MIB). For example, when the starting symbol of first CORESET #0 in a slot is symbol #0, P=2, and T=1, four CORESET #0s may be defined/configured in { symbols #0/1}, { symbols #3/4}, { symbols #6/7}, and {symbols #9/10}, respectively.

When {SCS of SS/PBCH block, SCS of CORESET #0}={480, 960-ECP} kHz, the symbol position of an SS/PBCH block with the 480 kHz SCS may be determined in alignment with the predefined symbol position of an SS/PBCH block with the 120/240 kHz SCS. In this case, the transmission positions of CORESET #0s associated with 8 SS/PBCH blocks (candidates) need to be defined within 27 symbols for the 960 kHz SCS. For example, the positions of 8 CORESET #0s associated with 8 SS/PBCH blocks (candidates): SS/PBCH blocks (candidates) #k to #(k+7) may be determined to be continuous as shown in FIGS. 23(*a*) and 23(*b*), and the number of symbols of CORESET #0 spanning from the corresponding starting symbol may be additionally configured/defined. Specifically, CORESET #0 associated with SS/PBCH block (candidate) #k may span P symbols from symbol #0 of slot #m, (e.g., P=3), and the value of P may be predefined or configured by higher layer signaling (e.g., MIB).

SS/PBCH block (candidate) indices may be in the QCL relationship. When N consecutive SS/PBCH block (candidate) indices are in the QCL relationship (that is, when N SS/PBCH blocks (candidates) are transmitted on the same beam), CORESET #0s corresponding to N SS/PBCH blocks (candidates) may be configured to be continuous without a gap (because no beam switching time is required). Alternatively, in some embodiments, only the position of CORESET #0 associated with one SS/PBCH block (candidate) representing the N SS/PBCH blocks (candidates) may be configured. As an example, if N=4, four three-symbol CORESET #0s may be defined/transmitted repeatedly and continuously within 12 symbols from symbol #0 of slot #m. As another example, if N=4, only CORESET #0 corresponding to SS/PBCH block (candidate) #k representing SS/PBCH blocks #k/k+1/k+2/k+3 may be defined/transmitted. As a further example, two CORESET #0s corresponding to two SS/PBCH blocks may be defined within 32 symbols (from symbol #0 of slot #m to symbol #3 of slot #(m+2)) as shown in FIG. 21(*a*). In this case, one region for CORESET #0 may correspond to SS/PBCH blocks #k/k+1/k+2/k+3, and the other region for CORESET #0 may correspond to SS/PBCH blocks #k+4/k+5/k+6/k+7.

When {SCS of SS/PBCH block, SCS of CORESET #0}={960, 960-ECP} kHz, the symbol position of an SS/PBCH block with the 960 kHz SCS may be determined in alignment with the predefined symbol position of an SS/PBCH block with the 120/240 kHz SCS. In this case, the positions of CORESET #0s associated with 16 SS/PBCH blocks (candidates) need to be defined within 27 symbols for the 960 kHz SCS. For example, referring to FIG. 24(*a*), 16 CORESET #0s associated with 16 SS/PBCH blocks (candidates) may be defined within 27 symbols from symbol #0 of slot #m to symbol #2 of slot #(m+2) for the 960 kHz SCS. In this case, 16 one-symbol CORESET #0s may be continuously located from symbol #0 of slot #m of FIG. 24(*a*) (or slot #(m+7) of FIG. 24(*b*)). For example, 16 one-symbol CORESET #0s may be defined within 16 symbols (from symbol #0 of slot #m to symbol #3 of slot #(m+1) in FIG. 24(*a*)). As another example, 8 one-symbol CORESET #0s may be continuously located from each slot boundary as shown in FIGS. 24(*a*) and 24(*b*), and the number of symbols of CORESET #0 spanning from the corresponding starting symbol may be predefined as 1. Specifically, as shown in FIG. 24(*a*), 8 one-symbol CORESET #0s may be continuously located from symbol #0 of slot #m for the 960 kHz SCS, and 8 one-symbol CORESET #0s may be continuously located from symbol #0 of slot #(m+1). Specifically, CORESET #0 associated with SS/PBCH block (candidate) #k may be located in symbol #0 of slot #m. The reason for this is that when a beam switching time is required because different SS/PBCH blocks (candidates) are not in the QCL relationship, the corresponding beam switching time may be shorter than the ECP length.

SS/PBCH block (candidate) indices may be in the QCL relationship. When N consecutive SS/PBCH block (candidate) indices are in the QCL relationship (that is, when N SS/PBCH blocks (candidates) are transmitted on the same beam), CORESET #0s corresponding to N SS/PBCH blocks (candidates) may be configured to be continuous without a gap (because no beam switching time is required). Alternatively, in some embodiments, only the position of CORESET #0 associated with one SS/PBCH block (candidate) representing the N SS/PBCH blocks (candidates) may be configured. As an example, if N=4, four one-symbol CORESET #0s may be continuously and repeatedly transmitted within four symbols from symbol #0 of slot #m. As another example, if N=4, the position of only X-symbol CORESET #0 corresponding to SS/PBCH block (candidate) #k representing SS/PBCH blocks #k/k+1/k+2/k+3 may be configured (where the value of X may be predefined or preconfigured). As a further example, regions for four CORESET #0s corresponding to four SS/PBCH blocks may be defined as shown in FIG. 22(*a*). In this case, each region for CORESET #0 may correspond to SS/PBCH blocks #k/k+1/k+2/k+3, SS/PBCH blocks #k+4/k+5/k+6/k+7, SS/PBCH blocks #k+8/k+9/k+10/k+11, and SS/PBCH block #k+12/k+13/k+14/k+15.

When SS/PBCH blocks are transmitted at the same symbol index position and when the ratio between the SCS of the SS/PBCH block and the SCS of CORESET #0 is the same, it is obvious that CORESET #0 and default PDSCH TDRA proposed in this specification are applicable. For example, if the SCS of the SS/PBCH block in [Method #3] is 480 kHz, each SS/PBCH block may be transmitted at the same symbol index position as in FIG. 15. If the SCS of CORESET #0 is 960 kHz, the ratio between the SCS of the SS/PBCH block and the SCS of CORESET #0 is the same as [Method #3], CORESET #0 and default PDSCH TDRA may be configured at the same slot/symbol position as in FIG. 15.

[Method #6A] Proposed are allowed combinations of {SCS of SS/PBCH block, SCS of CORESET #0}. In the Rel-15 NR system, the SCS of CORESET #0 (i.e., SCS assumed for system information, paging, random access procedures, etc.) is provided by one bit (e.g., subCarrierSpacingCommon) of the MIB, and thus, the maximum number of SCSs of CORESET #0 associated with the SCS of a specific SS/PBCH block may be limited to 2.

Assuming that the SCS of an SS/PBCH block is SCS1, and the SCS of CORESET #0 (SCS assumed for system information, paging, random access procedures, etc.) is SCS2, SCS2 indicated by the MIB may have one of the following values.

Option 1: SCS2=SCS1 or SCS2=SCS1/2 "/" denotes division)

Option 2: SCS2=SCS1 or SCS2=SCS1*2 ("*" denotes multiplication

Option 3: SCS2=SCS1 or SCS2=960 kHz

In each option, one value may be the SCS of CORESET #0 indicated when the one-bit value of the (corresponding) MIB is '1', and the other value may be the SCS of CORESET #0 indicated when the one-bit value of the MIB is '0'. For example, in Option 1, when the one-bit value of the MIB is '0', it may mean that the SCS of CORESET #0 is SCS1. On the other hand, when the one-bit value of the MIB is '1', it may mean that the SCS of CORESET #0 is SCS1/2. The reason why the values of SCS1 and SCS2 differ only by a factor of two in Option 1 or 2 is that if the difference between SCSs becomes too large, multiplexing may be inefficient. The reason why signaling of the 960 kHz SCS is always allowed in Option 3 is that coexistence with the WiGig system at a bandwidth of 2 GHz (approximately 2.16 GHz) may be important.

In particular, when SCS1=240 kHz, the one-bit value of the MIB (e.g., subCarrierSpacingCommon) may be interpreted differently depending on the frequency band in which the MIB is transmitted (e.g., whether the MIB is transmitted in FR2 or FR3). For example, if the MIB is transmitted in FR2, whether the SCS of CORESET #0 is 60 kHz or 120 kHz may be provided by one bit of the MIB. However, if the MIB is transmitted in FR3, whether the SCS of CORESET #0 is 240 kHz may be provided by one bit of the MIB in Option 1 (whether the SCS of CORESET #0 is 240 kHz or 480 kHz may be provided in Option 2, and whether the SCS of CORESET #0 is 240 kHz or 960 kHz may be provided in Option 3).

For example, the definition of subCarrierSpacingCommon of the MIB may be changed as follows.

TABLE 10 subCarrierSpacingCommon

Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz.
If the UE acquires this MIB on an FR2 carrier frequency, the value scs15or60 corresponds to 60 kHz and the value scs30or120 corresponds to 120 kHz.
If the UE acquires this MIB on an FR3 carrier frequency, the value scs15or60 (or the value of a specific one bit (e.g., 0)) corresponds to SCS2 = SCS1 kHz and the value scs30or120 (or the value of the remaining one bit (e.g., 1)) corresponds to SCS2 = SCS1/2 kHz (Option 1).

* Option 1 may be replaced by Option 2 or Option 3.

[Method #7A] When an SS/PBCH block with an SCS of 120 kHz is used for initial access and when an SS/PBCH block with an SCS of 480 or 960 kHz is used for ANR other than the initial access, information on the location of the SS/PBCH block with the 120 kHz SCS and/or CORESET #0 (and Type0-PDCCH CSS set) may be carried by a PBCH included in the SS/PBCH block with the 960 kHz SCS (to provide SIB1 information on the same cell).

Since the SS/PBCH block with the 480/960 kHz SCS is not used for the initial access, the SS/PBCH block with the 480/960 kHz SCS may be transmitted at a position other than a synchronization raster as the center frequency. For the SS/PBCH block that is not transmitted in the synchronization raster, the BS needs to provide information on frequency resources of CORESET #0 for the following reasons (motivations).

Since different operators may coexist in unlicensed bands or even the same operator may be in an unplanned deployment environment, the same (physical) cell ID may be used between cells in the same band. To solve the confusion of the UE, the BS may need to transmit information on CORESET #0 and Type0-PDCCH CSS set for higher layer signaling (e.g., SIB1) containing information on an operator ID, a PLMN ID, or a global cell ID (even for the SS/PBCH block that is not transmitted in the synchronization raster). The SS/PBCH block transmission for the above purpose is referred to as ANR.

Therefore, information on a frequency-domain offset (information on the number of REs and/or RBs or a synchronization raster index) between the SS/PBCH block with the 480/960 kHz SCS and the SS/PBCH block with the 120 kHz SCS may be transmitted by a PBCH payload included in the SS/PBCH block with the 480/960 kHz SCS. The corresponding offset information may be based on the 120 kHz SCS (or the SCS of the SS/PBCH block including the corresponding PBCH payload). For example, REs may be based on the SCS of the SS/PBCH block including the PBCH payload, and RBs may be based on the 120 kHz SCS. The UE may receive an SIB1 PDCCH/PDSCH based on the PBCH information included in the SS/PBCH block with the 120 kHz SCS. In this case, the SIB1 PDCCH/PDSCH may mean a PDCCH for scheduling a PDSCH carrying (or conveying) SIB1 and a PDSCH carrying SIB1 (scheduled by a PDCCH).

Alternatively, information on resources of CORESET #0 (and Type0-PDCCH CSS set) for the 120 kHz SCS may be transmitted directly by the PBCH payload included in the SS/PBCH block with the 480/960 kHz SCS. Accordingly, SIB1 PDCCH/PDSCH reception may be allowed without reception of the SS/PBCH block with the 120 kHz SCS. In this case, the information on CORESET #0 based on the 120 kHz SCS may include an RE/RB offset between the SS/PBCH block with the 480/960 kHz SCS and the CORESET (which may be based on the 120 kHz SCS or the SCS of the SS/PBCH block including the PBCH payload, and the reference SCS may vary depending on the REs/RBs) and a time/frequency region occupied by the CORESET (e.g., X RBs and Y symbols). In addition, information about Type0-PDCCH CSS set based on the 120 kHz SCS may include information on an SIB1 PDCCH monitoring occasion, for example, information on the number of occasions per slot and information on symbol positions on the occasion in the slot, etc.

In particular, the information on the location of the SS/PBCH block and/or CORESET #0 (and Type0-PDCCH CSS set), which is provided by the PBCH included in the SS/PBCH block with the 480 and/or 960 kHz SCS, may be information on the SS/PBCH block with the 120 kHz SCS and/or CORESET #0 (and Type0-PDCCH CSS set) (even if there is no separate indicator indicating an SCS in the PBCH payload).

Figure 26:
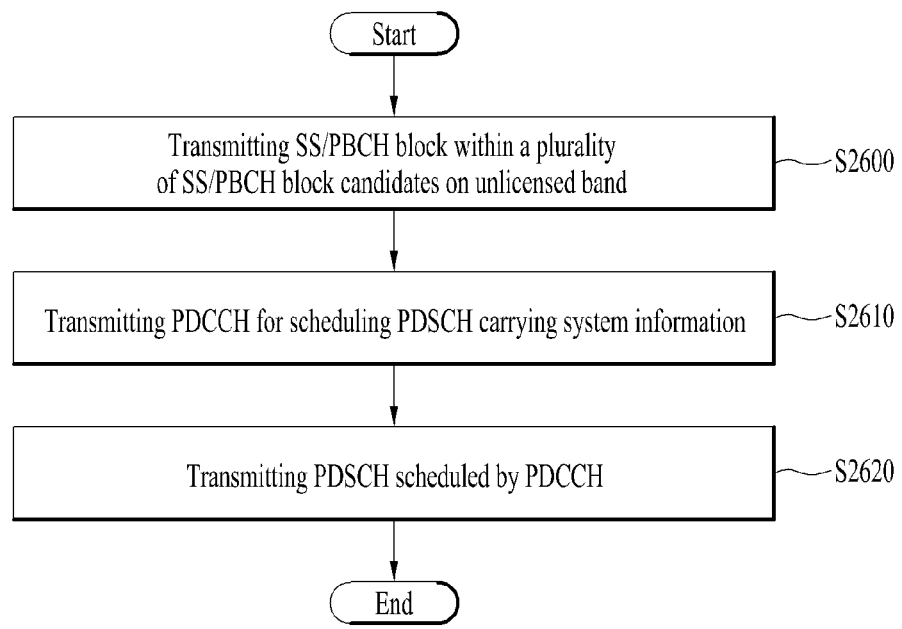

FIG. 26 is a flowchart illustrating operations of a BS according to the proposed method.

Referring to FIG. 26, the BS may transmit an SS/PBCH block in a plurality of SS/PBCH block candidates in an unlicensed band (S2600). In this case, the SS/PBCH block may include PDCCH configuration information, and the PDCCH configuration information may refer to configuration information on a PDCCH scheduling a PDSCH carrying system information. The PDCCH configuration information may include, for example, information on the SCS of a CORESET in which the PDCCH is transmitted. Specifically, the PDCCH scheduling the PDSCH carrying the system information may be transmitted in CORESET #0 described above. The PDCCH configuration information transmitted in the SS/PBCH block may include information on the SCS of CORESET #0. The PDCCH configuration information may be transmitted in an MIB of a PBCH payload included in the SS/PBCH block (e.g., a pdcch-ConfigSIB1 field included in the MIB).

The BS may transmit the PDCCH scheduling the PDSCH carrying the system information (S2610). In this case, the PDCCH may be transmitted in CORESET #0, and the location of CORESET #0 in the time domain may vary depending on the SCS of the SS/PBCH block and the SCS of CORESET #0. For example, the location of CORESET #0 in the time domain may be determined by applying [Method #1A] to [Method #5A] described above depending on the SCS of the SS/PBCH block and the SCS of CORESET #0. The BS may transmit the PDCCH at the determined location of CORESET #0. For example, CORESET #0 may be configured in a duration of consecutive symbols located in front of the plurality of SS/PBCH block candidates. The starting symbol of CORESET #0 may be determined from among 1) the first symbols of slots included in the symbol duration or 2) the first symbols of regions obtained by dividing the symbol duration by the number of SS/PBCH block candidates. For example, when the SCS of the SS/PBCH block is set to 120 kHz and when the SCS of CORESET #0 is set to 960 kHz, CORESET #0 may be configured as shown in FIGS. 17(*a*) and 17(*b*). Specifically, the SS/PBCH block may be received in one of two SS/PBCH block candidates, and CORESET #0 may be configured in a duration of consecutive 32 symbols having an SCS of 960 kHz and located in front of the two SS/PBCH block candidates (the duration corresponds to a duration of four symbols with an SCS of 120 kHz). In this case, the starting symbol of CORESET #0 may be determined from among the first symbols of slots included in the duration of the 32 symbols with the 960 kHz SCS. Alternatively, when the SCS of the SS/PBCH block is set to 480 kHz and when the SCS of CORESET #0 is set to 960 kHz, CORESET #0 may be configured as shown in FIGS. 19(*a*) and 19(*b*). Specifically, CORESET #0 may be configured in a duration of consecutive 32 symbols having an SCS of 960 kHz and located in front of 8 SS/PBCH block candidates. The starting symbol of CORESET #0 may be determined from among the first symbols of regions obtained by dividing the 32-symbol duration into 8 equal parts. In another embodiment, when both the SCS of the SS/PBCH block and the SCS of CORESET #0 are set to 960 kHz, the SS/PBCH block may be configured in a duration of consecutive 32 symbols having an SCS of 960 kHz and located in front of 16 SS/PBCH block candidates. The starting symbol of CORESET #0 may be determined from among the first symbols of regions obtained by dividing the 32-symbol duration into 16 equal parts.

The BS may transmit the PDSCH scheduled by the PDCCH (S2620). In this case, the PDSCH may carry the system information (e.g., SIB1), and the UE may obtain the system information by receiving the PDSCH.

Additionally, the SCS of CORESET #0 may be provided by the SS/PBCH block. For example, the SS/PBCH block may indicate one of two values determined based on the SCS of the SS/PBCH block as the SCS of CORESET #0. Specifically, when the SCS of the SS/PBCH block is SCS1 and when the SCS of CORESET #0 is SCS2, SCS2 may be determined as either SCS1 or SCS1/2. In this case, the MIB included in the SS/PBCH block may indicate one of the two values as SCS2. For example, the indicated value may vary depending on the value of one bit of MIB1 (i.e., whether the one-bit value is '0' or '1'). Although SCS2 may be determined as either SCS1 or SCS1/2 as described above, SCS2 may be determined as either SCS1 or 2*SCS1 or as either SCS1 or 960 kHz in some embodiments.

3) Receiver & Transmitter (Between Receiver and Transmitter)

Figure 27:
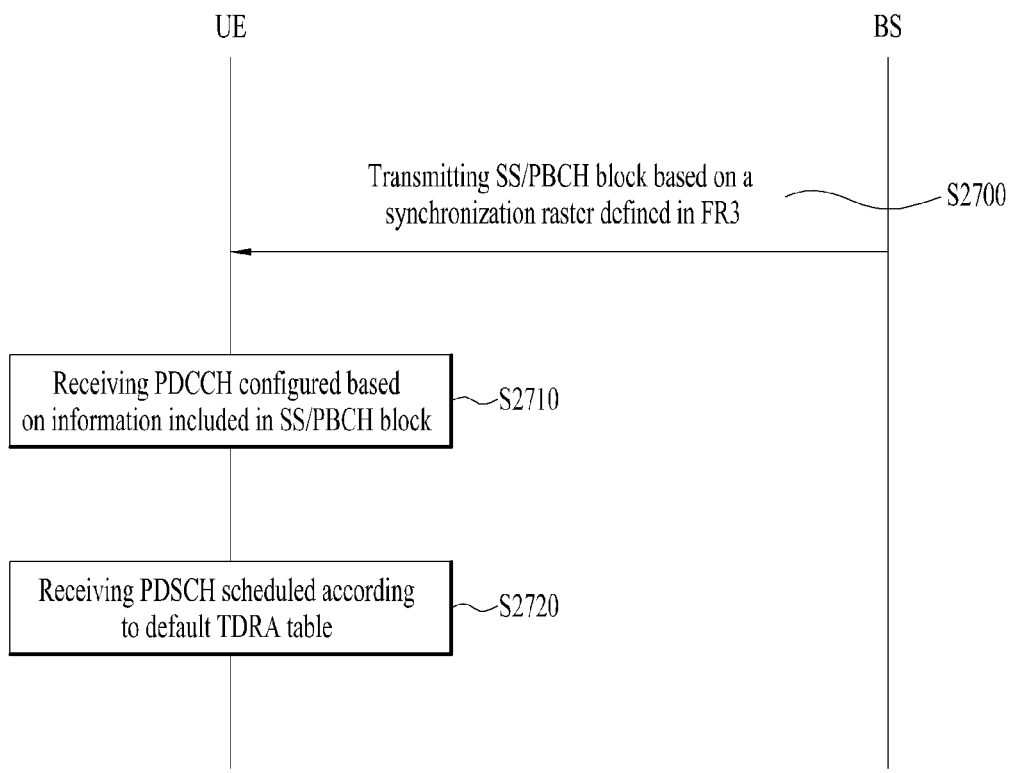

Referring to FIG. 27, when a BS operates in FR3, the BS may transmit an SS/PBCH block using a synchronization raster defined in the corresponding band as the center frequency (according to the present disclosure) (S2700). When the SCS of the SS/PBCH block is 240 kHz, and when the SCS of a related PDCCH and PDSCH is 240 kHz or 480 kHz, the UE may receive the corresponding channels (i.e., PDCCH and PDSCH) on resources determined based on the SCS of the PDCCH and PDSCH as proposed in [Methods #1/2/3]. Specifically, referring to FIG. 27, the UE may receive the configured PDCCH based on information included in the SS/PBCH block (S2710). In this case, the UE may acquire PDCCH configuration information based on the information included in the SS/PBCH block. For example, the PDCCH configuration information may include information on time/frequency resources of a CORESET in which the PDCCH is transmitted. Here, the PDCCH may refer to a PDCCH scheduling a PDSCH including system information, and the CORESET in which the PDCCH is transmitted may refer to CORESET #0. In addition, the UE may receive the PDSCH scheduled by the PDCCH according to a default TDRA table (S2720). Before receiving UE-specific RRC signaling, the UE may check TDRA for the PDSCH according to the default TDRA table. Accordingly, the UE may receive the PDSCH scheduled by the PDSCH according to the default TDRA table and then obtain the system information from the received PDSCH. In addition, the BS may transmit the corresponding channels (i.e., PDCCH and PDSCH) to the UE on resources determined based on the SCS of the PDCCH and PDSCH, as described in [Methods #1A/2A/3A].

In addition, whether [Methods #1 to 3/#1A to 3A] are applied may be determined based on whether the UE/BS operates is a licensed or unlicensed band. In this case, the synchronization raster capable of SS/PBCH block transmission may be defined differently to notify which method is applied.

For example, when synchronization raster set #1 (e.g., a set related to licensed bands) and a synchronization raster set #2 (e.g., a set related to unlicensed bands) are defined in FR3, if the UE detects an SS/PBCH block based on a synchronization raster belonging to synchronization raster set #1, the UE may recognize that the SS/PBCH block is the same SS/PBCH block as FR2 (see FIGS. 12(*a*) to 12(*c*)). In this case, the same SS/PBCH block as FR2 may mean an SS/PBCH block defined in FR2. On the other hand, if the UE detects an SS/PBCH block based on a synchronization raster belonging to synchronization raster set #2, the UE may recognize that the SS/PBCH block is an enhanced SS/PBCH block in FR3 (which is different from that in FR2) as described in [Methods #1 to 3/#1A to 3A]. In this case, the enhanced SS/PBCH block in FR3 may mean an SS/PBCH block to which [Method #1] to [Method #3] or [Method CA] to [Method #3A] are applied. Different frequency offsets and/or different intervals may be applied to synchronization raster set #1 and synchronization raster set #2. The various details, functions, procedures, proposals, methods, and/or operational flowcharts described in this document may be applied to a variety of fields that require wireless communication/connections (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
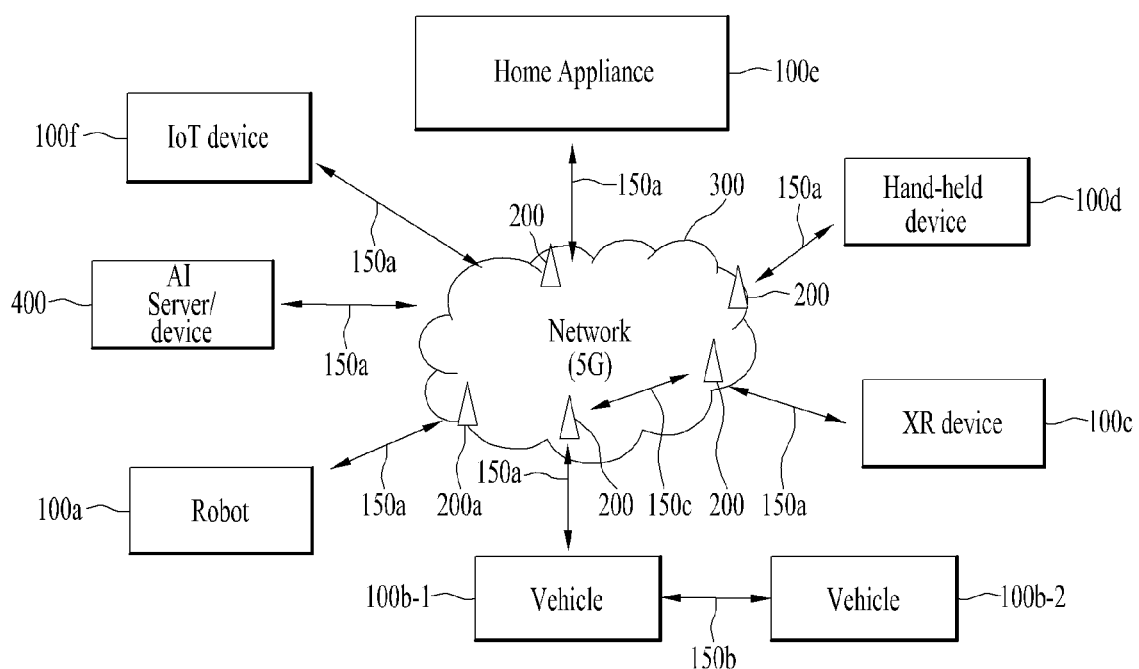
FIGS. 28 to 31 illustrate a communication system and wireless devices, which are applied to the present disclosure.

FIG. 28 illustrates a communication system 1 applied to the present disclosure.

Referring to FIG. 28, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 29:
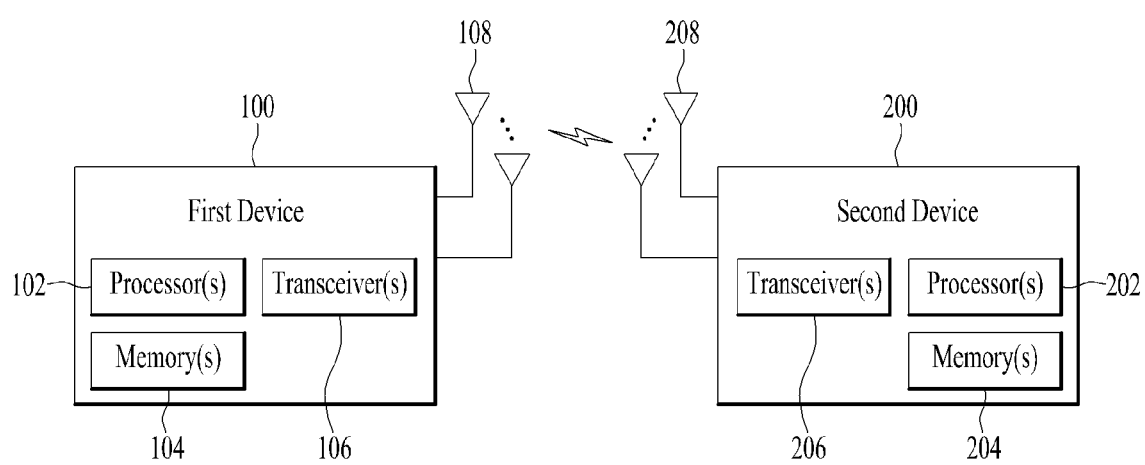

FIG. 29 illustrates wireless devices applicable to the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

Figure 30:
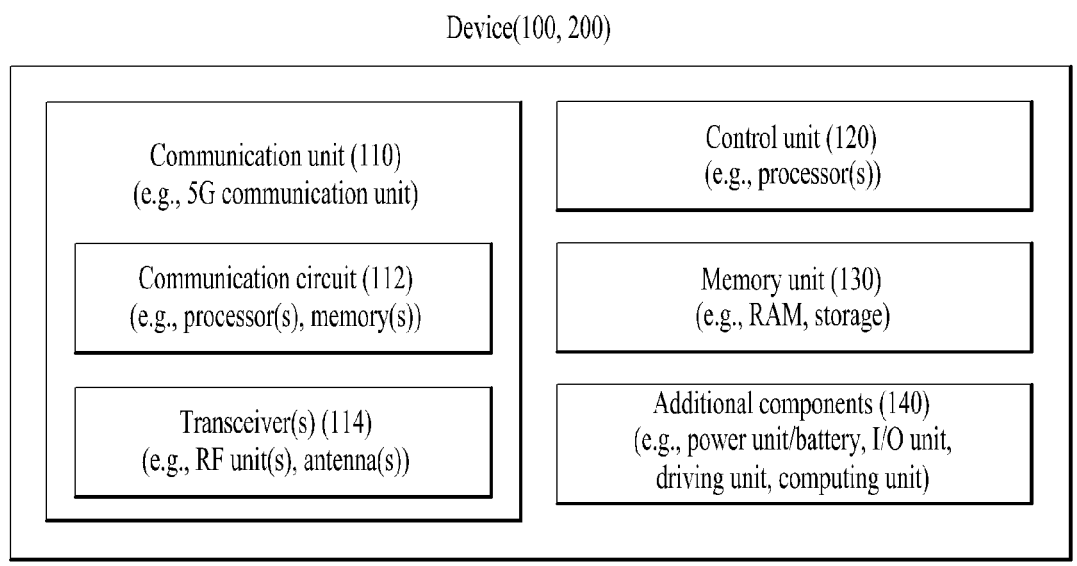

FIG. 30 illustrates another example of a wireless device applied to the present disclosure. The wireless device may be implemented in various forms according to a use-case/service (refer to FIG. 28).

Referring to FIG. 30, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

The wireless communication technology implemented in the wireless devices 100 and 200 of the present specification may include narrowband Internet of Things (NB-IoT) for low-power communication as well as LTE, NR, and 6G. For example, NB-IoT technology may be an example of low power wide area network (LPWAN) and implemented by standards such as LTE Cat NB1 and/or LTE Cat NB2, not limited to the above-mentioned names. Additionally or alternatively, the wireless communication technology implemented in the wireless devices 100 and 200 of the present disclosure may perform communication based on LTE-M. For example, LTE-M may be an example of LPWAN and called by various names such as enhanced machine type communication (eMTC). For example, LTE-M may be implemented by at least one of various standards such as 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M, not limited to these names Additionally or alternatively, the wireless communication technology implemented in the wireless devices 100 and 200 of the present disclosure may include at least one of ZigBee, Bluetooth, and low power wide area network (LPWAN) in consideration of low power communication, not limited to these names. For example, ZigBee may create a personal area network (PAN) related to small/low-power digital communication based on various standards such as IEEE 802.15.4, and may be called by various names.

Figure 31:
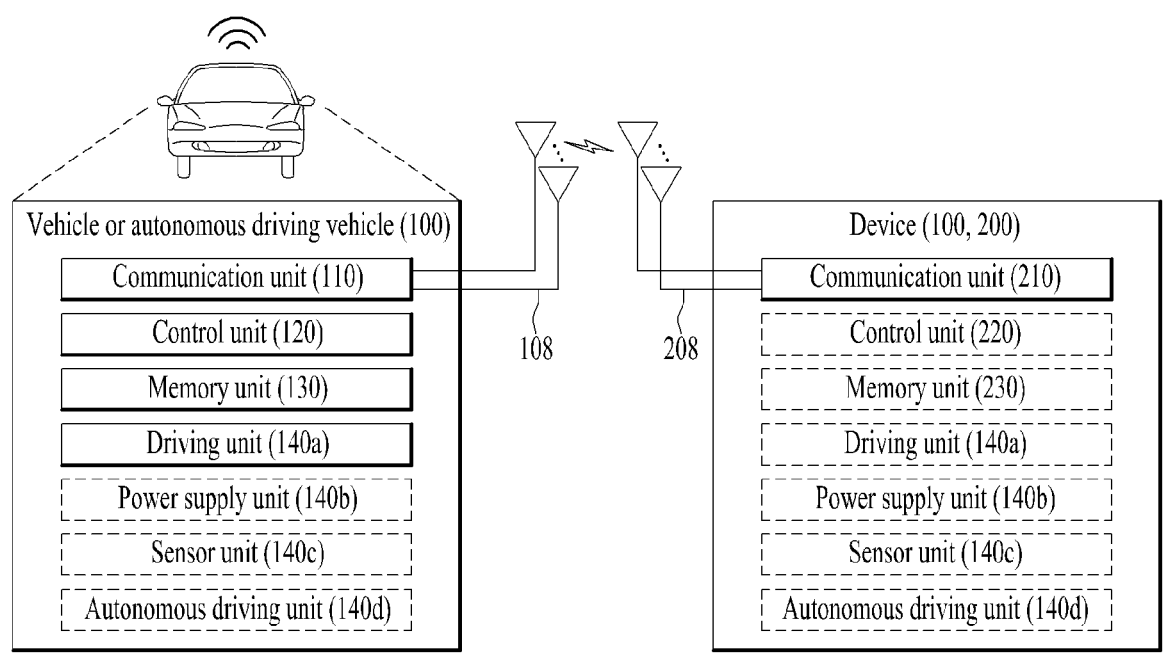

FIG. 31 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 31, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 30, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. In addition, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to a user equipment (UE), a base station (BS), or other devices in a wireless mobile communication system.

The invention claimed is:

1. A method performed by a user equipment (UE), the method comprising:
   receiving a synchronization signal/physical broadcast channel (SS/PBCH) block in a plurality of SS/PBCH block candidates on an unlicensed band;
   obtaining physical downlink control channel (PDCCH) configuration information based on the SS/PBCH block; and
   based on the PDCCH configuration information, receiving a PDCCH scheduling a physical downlink shared channel (PDSCH) carrying system information and the PDSCH scheduled by the PDCCH,
   wherein the PDCCH configuration information includes information on a subcarrier spacing of a control resource set (CORESET) in which the PDCCH is received,
   wherein the CORESET is configured in a duration of consecutive symbols located in front of the plurality of SS/PBCH block candidates,
   wherein a starting symbol of the CORESET is determined from among 1) first symbols of slots or half-slots included in the duration of consecutive symbols or 2) first symbols of regions obtained by dividing the duration of consecutive symbols by a number of the SS/PBCH block candidates, and
   wherein one of two values determined based on a subcarrier spacing of the SS/PBCH block is indicated as the subcarrier spacing of the CORESET through the SS/PBCH block.

2. The method of claim 1,
   wherein based on that a subcarrier spacing of the SS/PBCH block is set to 120 kHz and the subcarrier spacing of the CORESET is set to 960 kHz:
   the SS/PBCH block is received in one of two SS/PBCH block candidates;
   the CORESET is configured in a duration of consecutive 32 symbols which has a subcarrier spacing of 960 kHz and is located in front of the two SS/PBCH block candidates; and
   the starting symbol of the CORESET is determined from among first symbols of slots included in the duration of the 32 symbols.

3. The method of claim 1,
   wherein based on that a subcarrier spacing of the SS/PBCH block is set to 480 kHz and the subcarrier spacing of the CORESET is set to 960 kHz:
   the SS/PBCH block is received in one of 8 SS/PBCH block candidates;
   the CORESET is configured in a duration of consecutive 32 symbols which has a subcarrier spacing of 960 kHz and is located in front of the 8 SS/PBCH block candidates; and
   the starting symbol of the CORESET is determined from among first symbols of regions obtained by dividing the duration of the 32 symbols into 8 equal parts.

4. The method of claim 1,
wherein based on that a subcarrier spacing of the SS/PBCH block is set to 960 kHz and the subcarrier spacing of the CORESET is set to 960 kHz:
the SS/PBCH block is received in one of 16 SS/PBCH block candidates;
the CORESET is configured in a duration of consecutive 32 symbols which has a subcarrier spacing of 960 kHz and is located in front of the 16 SS/PBCH block candidates; and
the starting symbol of the CORESET is determined from among first symbols of regions obtained by dividing the duration of the 32 symbols into 16 equal parts.

5. The method of claim 1,
wherein based on that a subcarrier spacing of the SS/PBCH block is set to 120 kHz and the subcarrier spacing of the CORESET is set to 480 kHz:
the SS/PBCH block is received in one of two SS/PBCH block candidates;
the CORESET is configured in a duration of consecutive 16 symbols which has a subcarrier spacing of 480 kHz and is located in front of the two SS/PBCH block candidates; and
the starting symbol of the CORESET is determined from among first symbols of slots or half-slots included in the duration of the 16 symbols.

6. A user equipment (UE) comprising:
at least one radio frequency (RF) unit;
at least one processor; and
at least one computer memory operably connected to the at least one processor and configured to, when executed, cause the at least one processor to perform operations comprising:
receiving a synchronization signal/physical broadcast channel (SS/PBCH) block in a plurality of SS/PBCH block candidates on an unlicensed band;
obtaining physical downlink control channel (PDCCH) configuration information based on the SS/PBCH block; and
based on the PDCCH configuration information, receiving a PDCCH scheduling a physical downlink shared channel (PDSCH) carrying system information and the PDSCH scheduled by the PDCCH,
wherein the PDCCH configuration information includes information on a subcarrier spacing of a control resource set (CORESET) in which the PDCCH is received,
wherein the CORESET is configured in a duration of consecutive symbols located in front of the plurality of SS/PBCH block candidates,
wherein a starting symbol of the CORESET is determined from among 1) first symbols of slots included in the duration of consecutive symbols or 2) first symbols of regions obtained by dividing the duration of consecutive symbols by a number of the SS/PBCH block candidates, and
wherein one of two values determined based on a subcarrier spacing of the SS/PBCH block is indicated as the subcarrier spacing of the CORESET through the SS/PBCH block.

7. The UE of claim 6,
wherein based on that a subcarrier spacing of the SS/PBCH block is set to 120 kHz and the subcarrier spacing of the CORESET is set to 960 kHz:
the SS/PBCH block is received in one of two SS/PBCH block candidates;
the CORESET is configured in a duration of consecutive 32 symbols which has a subcarrier spacing of 960 kHz and is located in front of the two SS/PBCH block candidates; and
the starting symbol of the CORESET is determined from among first symbols of slots included in the duration of the 32 symbols.

8. The UE of claim 6,
wherein based on that a subcarrier spacing of the SS/PBCH block is set to 480 kHz and the subcarrier spacing of the CORESET is set to 960 kHz:
the SS/PBCH block is received in one of 8 SS/PBCH block candidates;
the CORESET is configured in a duration of consecutive 32 symbols which has a subcarrier spacing of 960 kHz and is located in front of the 8 SS/PBCH block candidates; and
the starting symbol of the CORESET is determined from among first symbols of regions obtained by dividing the duration of the 32 symbols into 8 equal parts.

9. The UE of claim 6,
wherein based on that a subcarrier spacing of the SS/PBCH block is set to 960 kHz and the subcarrier spacing of the CORESET is set to 960 kHz:
the SS/PBCH block is received in one of 16 SS/PBCH block candidates;
the CORESET is configured in a duration of consecutive 32 symbols which has a subcarrier spacing of 960 kHz and is located in front of the 16 SS/PBCH block candidates; and
the starting symbol of the CORESET is determined from among first symbols of regions obtained by dividing the duration of the 32 symbols into 16 equal parts.

10. The UE of claim 6,
wherein based on that a subcarrier spacing of the SS/PBCH block is set to 120 kHz and the subcarrier spacing of the CORESET is set to 480 kHz:
the SS/PBCH block is received in one of two SS/PBCH block candidates;
the CORESET is configured in a duration of consecutive 16 symbols which has a subcarrier spacing of 480 kHz and is located in front of the two SS/PBCH block candidates; and
the starting symbol of the CORESET is determined from among first symbols of slots or half-slots included in the duration of the 16 symbols.

11. A method performed by a base station, the method comprising:
transmitting a synchronization signal/physical broadcast channel (SS/PBCH) block in a plurality of SS/PBCH block candidates on an unlicensed band;
transmitting a physical downlink control channel (PDCCH) scheduling a physical downlink shared channel (PDSCH) carrying system information; and
transmitting the PDSCH scheduled by the PDCCH,
wherein the SS/PBCH block includes information on a subcarrier spacing of a control resource set (CORESET) in which the PDCCH is transmitted,
wherein the CORESET is configured in a duration of consecutive symbols located in front of the plurality of SS/PBCH block candidates,
wherein a starting symbol of the CORESET is determined from among 1) first symbols of slots included in the duration of consecutive symbols or 2) first symbols of regions obtained by dividing the duration of consecutive symbols by a number of the SS/PBCH block candidates, and wherein one of two values determined based on a subcarrier spacing of the SS/PBCH block is indicated as the subcarrier spacing of the CORESET through the SS/PBCH block.

\* \* \* \* \*